(12) United States Patent
Cullen, III

(10) Patent No.: US 8,515,823 B2
(45) Date of Patent: Aug. 20, 2013

(54) SYSTEM AND METHOD FOR ENABLING AND MAINTAINING VENDOR QUALIFICATION

(75) Inventor: Andrew A. Cullen, III, Succasunna, NJ (US)

(73) Assignee: Volt Information Sciences, Inc., Orange, CA (US)

(*) Notice: Subject to any disclaimer, the term of this patent is extended or adjusted under 35 U.S.C. 154(b) by 0 days.

(21) Appl. No.: 12/342,116

(22) Filed: Dec. 23, 2008

(65) Prior Publication Data

US 2009/0157524 A1 Jun. 18, 2009

Related U.S. Application Data

(63) Continuation of application No. 10/141,801, filed on May 9, 2002, now abandoned.

(51) Int. Cl.
*G06Q 30/00* (2012.01)
*G06Q 40/00* (2012.01)
*G06Q 99/00* (2006.01)

(52) U.S. Cl.
USPC .......................... 705/26.35; 37/317

(58) Field of Classification Search
None
See application file for complete search history.

(56) References Cited

U.S. PATENT DOCUMENTS

| | | | |
|---|---|---|---|
| 4,646,250 A | 2/1987 | Childress | |
| 4,799,156 A | 1/1989 | Shavit et al. | |
| 4,937,743 A | 6/1990 | Rassman et al. | |
| 4,992,940 A | 2/1991 | Dworkin | |
| 5,117,353 A | 5/1992 | Stipanovich et al. | |
| 5,164,897 A | 11/1992 | Clark et al. | |
| 5,291,397 A | 3/1994 | Powell | |
| 5,381,332 A | 1/1995 | Wood | |
| 5,416,694 A | 5/1995 | Parrish et al. | |
| 5,493,490 A | 2/1996 | Johnson | |
| 5,592,375 A | 1/1997 | Salmon et al. | |
| 5,600,554 A | 2/1997 | Williams | |
| 5,664,115 A | 9/1997 | Fraser | |
| 5,715,402 A | 2/1998 | Popolo | |
| 5,740,421 A | 4/1998 | Palmon | |
| 5,758,328 A | 5/1998 | Giovannoli | |
| 5,794,212 A | 8/1998 | Mistr, Jr. | |

(Continued)

FOREIGN PATENT DOCUMENTS

| | | |
|---|---|---|
| EP | 1195676 A2 | 4/2002 |
| JP | 09-223008 A | 8/1997 |

(Continued)

OTHER PUBLICATIONS

U.S. Appl. No. 11/351,835, Cullen et al.

(Continued)

*Primary Examiner* — Asfand Sheikh
(74) *Attorney, Agent, or Firm* — Winstead PC

(57) ABSTRACT

A computer system and method is disclosed for pre-qualifying vendors for buyers and/or industries using vendor criteria information associated with buyers and/or industries and vendor qualification information associated with vendors. Vendors and buyers enter the vendor qualification information and vendor criteria information, respectively, into a database in a hierarchical and relational manner. The computer system compares entered vendor qualification information to stored vendor criteria information to pre-qualify vendors for buyers and/or industries. The computer system further monitors the stored vendor qualification information and requests updated vendor qualification information from the vendors to maintain vendor qualification on a per industry and/or per buyer basis.

29 Claims, 29 Drawing Sheets

(56) References Cited

U.S. PATENT DOCUMENTS

| | | | |
|---|---|---|---|
| 5,802,493 A | 9/1998 | Sheflott et al. |
| 5,842,178 A | 11/1998 | Giovannoli |
| 5,862,223 A | 1/1999 | Walker et al. |
| 5,907,490 A | 5/1999 | Oliver |
| 5,913,202 A | 6/1999 | Motoyama |
| 5,915,086 A | 6/1999 | Buzsaki et al. |
| 5,960,407 A | 9/1999 | Vivona |
| 5,970,475 A | 10/1999 | Barnes et al. |
| 5,978,768 A | 11/1999 | McGovern et al. |
| 5,987,464 A | 11/1999 | Schneider |
| 5,991,735 A | 11/1999 | Gerace |
| 5,995,951 A | 11/1999 | Ferguson |
| 6,014,644 A | 1/2000 | Erickson |
| 6,038,547 A | 3/2000 | Casto |
| 6,041,303 A | 3/2000 | Mathews |
| 6,049,776 A | 4/2000 | Donnelly et al. |
| 6,058,373 A | 5/2000 | Blinn et al. |
| 6,058,379 A | 5/2000 | Odom et al. |
| 6,070,143 A | 5/2000 | Barney et al. |
| 6,088,678 A | 7/2000 | Shannon |
| 6,092,050 A | 7/2000 | Lungren et al. |
| 6,092,060 A | 7/2000 | Guinta et al. |
| 6,092,197 A | 7/2000 | Coueignoux |
| 6,112,189 A | 8/2000 | Rickard et al. |
| 6,115,642 A | 9/2000 | Brown et al. |
| 6,131,087 A | 10/2000 | Luke et al. |
| 6,141,653 A | 10/2000 | Conklin et al. |
| 6,157,808 A | 12/2000 | Hollingsworth |
| 6,158,044 A | 12/2000 | Tibbetts |
| 6,161,099 A | 12/2000 | Harrington et al. |
| 6,167,385 A | 12/2000 | Hartley-Urquhart |
| 6,189,003 B1 | 2/2001 | Leal |
| 6,199,050 B1 | 3/2001 | Alaia et al. |
| 6,213,780 B1 | 4/2001 | Ho et al. |
| 6,266,659 B1 | 7/2001 | Nadkarni |
| 6,272,467 B1 | 8/2001 | Durand et al. |
| 6,275,812 B1 | 8/2001 | Haq et al. |
| 6,289,340 B1 | 9/2001 | Puram et al. |
| 6,302,695 B1 | 10/2001 | Rtischev et al. |
| 6,324,522 B2 | 11/2001 | Peterson et al. |
| 6,349,238 B1 | 2/2002 | Gabbita et al. |
| 6,356,909 B1 | 3/2002 | Spencer |
| 6,370,510 B1 | 4/2002 | McGovern et al. |
| 6,385,620 B1 | 5/2002 | Kurzius et al. |
| 6,408,337 B1 | 6/2002 | Dietz et al. |
| 6,442,528 B1 | 8/2002 | Notani et al. |
| 6,480,857 B1 | 11/2002 | Chandler |
| 6,529,909 B1 | 3/2003 | Bowman-Amuah |
| 6,556,976 B1 | 4/2003 | Callen |
| 6,647,300 B1 | 11/2003 | Balasubramanian et al. |
| 6,658,400 B2 | 12/2003 | Perell et al. |
| 6,662,194 B1 | 12/2003 | Joao |
| 6,922,676 B2 | 7/2005 | Alnwick |
| 6,980,962 B1 | 12/2005 | Arganbright et al. |
| 7,054,821 B1 | 5/2006 | Rosenthal et al. |
| 7,089,203 B1 | 8/2006 | Crookshanks |
| 7,103,567 B2 * | 9/2006 | Smukowski ............... 705/26 |
| 7,107,268 B1 | 9/2006 | Zawadzki et al. |
| 7,275,039 B2 | 9/2007 | Setteducati |
| 7,302,431 B1 | 11/2007 | Apollonsky et al. |
| 7,305,392 B1 | 12/2007 | Abrams et al. |
| 7,349,868 B2 * | 3/2008 | Tenorio ............... 705/26.62 |
| 7,386,475 B2 | 6/2008 | Parasnis et al. |
| 7,430,523 B1 | 9/2008 | Khalidi |
| 7,437,304 B2 | 10/2008 | Barnard et al. |
| 7,451,106 B1 * | 11/2008 | Gindlesperger ............ 705/37 |
| 7,457,764 B1 | 11/2008 | Bullock et al. |
| 7,523,045 B1 | 4/2009 | Walker et al. |
| 7,533,033 B1 | 5/2009 | Unite et al. |
| 7,653,583 B1 | 1/2010 | Leeb et al. |
| 7,805,382 B2 | 9/2010 | Rosen et al. |
| 2001/0044768 A1 | 11/2001 | Wares |
| 2001/0047311 A1 | 11/2001 | Singh |
| 2001/0051913 A1 | 12/2001 | Vashistha et al. |
| 2002/0002479 A1 | 1/2002 | Almog et al. |
| 2002/0042752 A1 | 4/2002 | Chaves |
| 2002/0046147 A1 | 4/2002 | Livesay et al. |
| 2002/0055870 A1 | 5/2002 | Thomas |
| 2002/0072946 A1 | 6/2002 | Richardson |
| 2002/0073082 A1 | 6/2002 | Duvillier et al. |
| 2002/0087382 A1 | 7/2002 | Tiburcio |
| 2002/0103687 A1 | 8/2002 | Kipling |
| 2002/0152133 A1 | 10/2002 | King et al. |
| 2002/0156668 A1 | 10/2002 | Morrow et al. |
| 2002/0161619 A1 | 10/2002 | Ham et al. |
| 2002/0198766 A1 | 12/2002 | Magrino et al. |
| 2002/0198818 A1 | 12/2002 | Scott et al. |
| 2003/0004850 A1 | 1/2003 | Li et al. |
| 2003/0018481 A1 | 1/2003 | Zhou et al. |
| 2003/0037032 A1 | 2/2003 | Neece et al. |
| 2003/0055694 A1 | 3/2003 | Menninger |
| 2003/0055754 A1 | 3/2003 | Sullivan |
| 2003/0083910 A1 | 5/2003 | Sayal et al. |
| 2003/0101114 A1 | 5/2003 | Delapass et al. |
| 2003/0101127 A1 | 5/2003 | Cornelius |
| 2003/0135401 A1 | 7/2003 | Parr |
| 2003/0145006 A1 | 7/2003 | Dalfsen et al. |
| 2003/0177051 A1 | 9/2003 | Driscoll et al. |
| 2003/0200150 A1 | 10/2003 | Westcott et al. |
| 2003/0200168 A1 | 10/2003 | Cullen, III et al. |
| 2003/0204439 A1 | 10/2003 | Cullen, III |
| 2003/0208434 A1 | 11/2003 | Posner |
| 2003/0212604 A1 | 11/2003 | Cullen, III |
| 2003/0216986 A1 | 11/2003 | Hassan |
| 2004/0030566 A1 | 2/2004 | Rix |
| 2004/0030590 A1 | 2/2004 | Swan et al. |
| 2004/0039681 A1 | 2/2004 | Cullen, III et al. |
| 2004/0068728 A1 | 4/2004 | Blevins |
| 2004/0093583 A1 | 5/2004 | McAnaney et al. |
| 2004/0107125 A1 | 6/2004 | Guheen et al. |
| 2004/0107405 A1 | 6/2004 | Schein |
| 2004/0158513 A1 | 8/2004 | Musacchio |
| 2004/0186852 A1 | 9/2004 | Rosen |
| 2004/0205519 A1 | 10/2004 | Chapel et al. |
| 2004/0210490 A1 | 10/2004 | Almstead et al. |
| 2004/0210510 A1 | 10/2004 | Cullen, III et al. |
| 2004/0215467 A1 | 10/2004 | Coffman et al. |
| 2004/0236598 A1 | 11/2004 | Thomsen |
| 2004/0260601 A1 | 12/2004 | Brief |
| 2004/0267606 A1 | 12/2004 | Brishke et al. |
| 2005/0114829 A1 | 5/2005 | Robin |
| 2005/0120039 A1 | 6/2005 | Amys et al. |
| 2005/0144129 A1 | 6/2005 | Coolman et al. |
| 2005/0262008 A1 | 11/2005 | Cullen, III et al. |
| 2005/0288993 A1 | 12/2005 | Weng et al. |
| 2006/0173775 A1 | 8/2006 | Cullen et al. |
| 2006/0259476 A1 | 11/2006 | Kadayam et al. |
| 2007/0124196 A1 | 5/2007 | Brief et al. |
| 2007/0198968 A1 | 8/2007 | Shenfield et al. |
| 2008/0004890 A1 | 1/2008 | Hargroder |
| 2009/0248482 A1 | 10/2009 | Knyphausen et al. |
| 2010/0241482 A1 | 9/2010 | Knyphausen et al. |

FOREIGN PATENT DOCUMENTS

| | | |
|---|---|---|
| JP | 11-345259 A | 12/1999 |
| JP | 2002-041835 A | 2/2002 |
| JP | 2002-149959 A | 5/2002 |
| JP | 2002-531890 A | 9/2002 |
| JP | 2002-366763 A | 12/2002 |
| JP | 2003-067188 A | 3/2003 |
| JP | 2003-532201 A | 10/2003 |
| JP | 2004-086757 A | 3/2004 |
| JP | 2004-252951 A | 9/2004 |
| JP | 2004-264880 A | 9/2004 |
| JP | 2004-527805 A | 9/2004 |
| JP | 2005-018327 A | 1/2005 |
| RU | 2165679 C1 | 4/2001 |
| WO | WO-00/33187 A1 | 6/2000 |
| WO | WO-/00/50970 | 8/2000 |
| WO | WO-0108067 A1 | 2/2001 |
| WO | WO-01/14962 A1 | 3/2001 |
| WO | WO-01/48656 | 7/2001 |

| WO | WO-02/08868 | 1/2002 |
| WO | WO-02/25544 | 3/2002 |
| WO | WO-02/41270 A1 | 5/2002 |

OTHER PUBLICATIONS

U.S. Appl. No. 11/354,367, Cullen, III et al.
U.S. Appl. No. 11/885,090, Cullen et al.
www.marketing.ebreviate.com; "Overview"; Company Information of eBreviate; Feb. 11, 2002; pp. 1-16.
www.chimes.net; "Chimes Streamlines & Digitizes RFP Administration and Project Management with Launch of Chimes PM"; Press Release from Chimes, Inc.; Feb. 25, 2002; pp. 1-4.
www.chimes.net; "Chimes, Inc. Extends Human Capital Management Solution Beyond Contingent Workforce with Launch of Centralized Applicant Management—CAM—Program"; News Room from Chimes, Inc.; Jun. 28, 2001; pp. 1-2.
www.emptoris.com; "Overview"; Company Overview of Emptoris; Apr. 15, 2002; pp. 1-18.
Screenshots of Volt Information Sciences, www.volt.com, Feb. 21, 1999, pp. 1-24, retrieved from: Google.com and archive.org.
Torres, Giselle; "High-Voltage Staffing Service Arrives in Puerto Rico"; Caribbean Business; Oct. 23, 1997, p. 1 (retrived from: Dialog, file 16).
"Volt Information Sciences—Facilities & Equipment", Annual Report, 1989, p. 1 (retrieved from : Dialog, file 160.
"Volt Information Sciences to Purchase Portions of Two Lucent Technologies Subsidiaries", PR Newswire, Nov. 17, 1999, pp. 1-3, (retrieved from: Dialog, file 16.
marketing.ebreviate.com; "Overview"; Company Information of eBreviate; Feb. 11, 2002; pp. 1-16.
Consol (www. procurestaff.com via http://web.archive.org, copyright 2003) pp. 1-31.
Cullen, Andrew A. III, "Declaration of Andrew A. Cullen III" , 41 pages, Jun. 18, 2008.
Leipold et al., "The World Bank e-Procurement for the Selection of Consultants: Challenges and Lessons Learned" Journal of Public Procurement, vol. 4, Issue 3, pp. 319-339.
Dysart, J., "The Data Exchange,"DG Review, vol. 11, No. 9, p. 37, Mar. 11, 1991.
Anon., "Primavera Systems; Primavera, PurchasePro.Com Create E-Commerce Marketplace for Construction Industry," M2 Presswire, Sep. 22, 1999.
Rawdon, S., "Online Bidding Options May Be Web's Best Secret," Business First-Columbus, vol. 18, No. 33, p. B11, Apr. 5, 2002.

"nextSource Announces Launch of its Multiple Listing Staffing Association." Business Wire, p. 2196, Apr. 16, 2002.
Definition of prose from Dictionary.com, retrieved from [http://dictionary.reference.com/browse/prose] on Aug. 7, 2008.
Herman, Susan J., Hiring Right: A Practical Guide. SAGE. 1994. pp. 23-25.
Cullen, A., Suppliers of Technical Nonpayroll Workers, (2 pages), Dec. 31, 1997.
Cullen, A., Skills Questionnaire, (5 pages), May 21, 1998.
Cullen, A., Skills Environment, (1 page), Jul. 2, 1998.
Cullen, A., Jobs Listing, (31 pages), Feb. 24, 1999.
Brief, V., Overview of Volt's HRP Application, (3 pages), Feb. 1999.
U.S. Appl. No. 12/492,438, Cullen.
U.S. Appl. No. 12/692,937, Cullen.
Bajari et al. (Bajari), "Incentives versus transaction cost: a theory of procurement contracts", RAND Journal of Economics, vol. 32, No. 3, Autumn 2001, pp. 387-407.
Cullen, III, et al., U.S. Appl. No. 13/017,760, filed Jan. 31, 2011.
U.S. Appl. No. 12/855,532, Wasicek.
U.S. Appl. No. 12/871,725, Shaw.
Brief, Victor, U.S. Appl. No. 13/460,979, filed May 1, 2012.
Young, Lee W., "International Search Report" for PCT/US10/47176 as mailed Oct. 14, 2010, 3 pages.
Web Archive of "nextSource" web page, "People Blue Book™, Introducing the nextSource People Blue Book" retrieved from [URL: http://web.archive.org/web/20020206061453/http://nextsource.com/services/people_blue . . . ], archived on Feb. 6, 2002, 1 page.
U.S. Bureau of Labor Statistics, "2000 Standard Occupational Classification (SOC) User Guide", retrieved from [URL: http://data.bls.gov/cgi-bin/print.pl/soc/socguide.htm] on Dec. 27, 2011, 5 pages.
Copenheaver, Blaine R., "International Search Report" for PCT/US2010/045349 as mailed Oct. 6, 2010 (4 pages).
U.S. Appl. No. 12/773,130, Cullen.
Tate, L., "Preparing RFPs, RFQs and Negotiating Contracts Requires Meticulous Attention to Many Details", Communications News, vol. 24, No. 12, p. 46, Dec. 1987.
Hirning, J., "Standing up to the Standards Strain", Quality, vol. 34, No. 2, p. 96, Feb. 1995.
Feder, B.J., "True Grit in the Gritty Inner City; Some Dreams Come True, but Company Fights for Life", New York Times, Late Edition—Final Edition, Jul. 10, 1998, p. 1, col. 2.
Anon, "Cephren Launches MarketNet Bidding Service, Providing the Construction Industry With an Efficient Way to Procure Goods and Services Online", Business Wire, May 30, 2000, 3 pages.

* cited by examiner

| "ABC" Company | Buyer Company "ABC" Create General Profile |
|---|---|
| Home Page | Geographic Preferences: (Optional) |
| | Country: Select Country(s) |
| Instructional Guide | Region: Select Region(s) (Country Selections Driven) |
| CompanyProfile | Cities: Select Population Center(s) (Region Selection Driven) |
| Company Users | Business Requirements: |
| | Business Entity Type: Select Business Entity Type(s) |
| | Minority Business: Select Minority Business Type(s) |
| Company General Profile | Prevoius Year Sales: Specify minimum amount of previous year sales required |
| | Previous Year Profit: Check if Previous Year Profitability is Required — 240 |
| | Net Worth: Specify Minimum Net Worth in Currency |
| | Audited Statements: Check if audited financial statements is required |
| Company SIC Industry Profiles | Tax Filing Verified: Check if previous year tax filing verification is required |
| | Years in Business: Specify minimum number of years in business required |
| | Number of FTEs: Specify minmum number of Full Time Employees |
| Contact Procure Staff | EFT Enabled: Check if Electronic Funds Trnasfer Enablement is required |
| | EDI Enabled: Check if Electronic Data Interchange Enablement is required |
| | D & B Listed: Check if Dun & Bradstreet Rating is required |
| Approvals Pending | JD Power Listed: Check if JD Power Rating is required |
| | Union Employer Check if Union Employer is required |
| System Updates | Publicly Traded: Check if Pubicly Traded is required |
| | Previous Bankruptcy: Check if previous bankruptcy filing disqualifies supplier |
| | Insurance Requirements: |
| | Auto: Select $s   Errors & Omissions: Select $s |
| | Employee Dishonesty: Select $s   Fire/Marine: Select $s |
| | Flood: Select $s   General Liability/PO: Select $s |
| | General Liability/Agg Select $s   Hazard: Select $s |
| | Life: Select $s   Surety: Select $s |
| | Workman's Comp: Check for Statutory Requirement |

Accept Settings | Request New General Qualifier | Back

"ABC" Company | Buyer Company "ABC" General Vendor Criteria for: "ABC U.S. General Profile"

Sidebar:
- Home Page
- Instructional Guide
- CompanyProfile
- Company Users
- Company General Profile
- Company SIC Industry Profiles
- Contact Procure Staff
- Approvals Pending
- System Updates Geographic Preferences: (Optional)
Country: United States
Region: All
Cities: All Business Requirements:
Business Entity Type: "S" Corp, "C" Corp, LLC< Professional Business Formation
Minority Business: None Selected
Prevaious Year Sales: Not Specified
Previous Year Profit: Must have been profitable
Net Worth: Must be worth => $500,000
Audited Statements: Not Specified
Tax Filing Verified: Must have filed previous year Tax Return
Years in Business: Minimum 3 years in business
Number of FTEs: Not Specified
EFT Enabled: Not Specified
EDI Enabled: Not Specified
D & B Listed: Not Specified
JD Power Listed: Not Specified
Union Employer: Not Specified
Publicly Traded: Not Specified
Previous Bankruptcy: Previous Bankruptcy Filing Disqualifed Supplier Insurance Requirements:
| | | | |
|---|---|---|---|
| Auto: | Not Specified | Errors & Omissions: | $1,000,000 |
| Employee Dishonesty: | $500,000 | Fire/Marine: | Not Specified |
| Flood: | Not Specified | General Liability/PO | $500,000 |
| General Liability/Agg | 2,000,000 | Hazard: | Not Specified |
| Life: | Not Specified | Surety: | Not Specified |
| Workman's Comp: | Must carry Statutory Workmans' Comp Limits | | |

[Edit Settings] [Accept Edited Settings] [Back]

(255)

| "ABC" Company | Buyer Profile for MWBE Roofing Contractors – New Jersey |
|---|---|
| Home Page | Geographic Preferences: |
| | Country: United States |
| Instructional Guide | Region: New Jersey |
| CompanyProfile | Cities: Camden, Clifton, Elizabeth, Newark, Trenton |
| Company Users | Business Requirements: |
| | Business Entity Type: "S" Corp, "C" Corp, LLC, Professional Business Formation |
| Company General Profile | Incorporation State: New Jersey |
| | Minority Business: Hispanic MAle, Hispanic Female |
| | Net Worth: => $500,000 |
| | Tax Filing Verified: Must have filed previous year Tax Return — 255 |
| Company SIC Industry Profiles | Insurance Requirements: |
| | General Liability/Agg: $2,000,000 |
| Contact Procure Staff | Employee Dishonesty: $500,000 |
| | Errors & Omisssions: $1,000,000 |
| Approvals Pending | Hazard: $500,000 |
| | Workmans' Comp: Must carry Statutory Workmans' Comp Limits |
| System Updates | Certification Requirements: |
| | US-SBA, HUBZone Contractor |
| | Miscellaneous Qualifiers |
| | Perferred Union: United Union of Roofers, Waterproofers and Allied Workers |

[ Edit Profile ]  [ Delete Profile ]  [ View Vendor List ]  [ Back ]

[ Standard Industry Qualifications ]

*FIG. 12B*

SIC Industry Vendor Criteria Recommendations

| | |
|---|---|
| SIC Country | Value From Profile |
| SIC Region | Value From Profile |
| SIC City | Null if Multiple (User Input-1 Only) |
| Total Vendor Population | Vendor Count from System Query |

Business Qualifier Review

| | | | |
|---|---|---|---|
| Require Audited Statements | Yes or No | | |
| Require Verified Tax Filing | Yes or No | | |
| Require EFT Enabled | Yes or No | | |
| Require EDI Enabled | Yes or No | | |
| Require D&B Listed | Yes or No | | |
| Require JD Power Listed | Yes or No | | |
| Require Publicly Traded | Yes or No | | |
| Require Union Shop | Yes or No | | |
| Previous Year Sales | Recommended Range(Low-High) | | |
| Previous Year Profit | Recommended Range(Low-High) | | |
| Net Worth | Recommended Range(Low-High) | | |
| Years in Business | Recommended Range(Low-High) | | |
| Number of FTEs | Recommended Range(Low-High) | | |
| Provide Standard Service Warranty | Yes or No | Recommended Terms | Recommended Duration |
| Provide Standard Goods Warranty | Yes or No | Recommended Terms | Recommended Duration |

Insurance Review

| | | |
|---|---|---|
| *List of all Insurance Types | Recommended Coverage(Yes or No) | Recommended Coverage Amount (Low-High) |

Certification Review

| | |
|---|---|
| *List of all Certification Types | Recommended Certification(Low-High) |

[ View Buyer Preferences ] [ View Vendor Information ] [ Edit Criteria ] [ Save Criteria ] [ Back ]

*FIG. 15B*

| Data Field | Vendor Qualification Information | Vendor Criteria Information | Compliance |
|---|---|---|---|
| Vendor_ID | XXX | | |
| Company_Name | ABC | | |
| Country_Name | U.S. | | |
| Business_Entity_Type_ID | 1 | 1,3,6,7,8 | Yes or No |
| Net_Worth | $1,000,000 | >=$1,000,000 | Yes or No |
| Currency_Type | U.S. Dollar | U.S. Dollar | Yes or No |
| Full_Time_Employee_Count | 200 | >15 | Yes or No |
| EDI_Capability | Y | Y | Yes or No |
| ISO_Certified | Y | Y | Yes or No |
| Contracted | N | N | Yes or No |
| Data_Renewal_Date | dd/mm/yyyy | dd/mm/yyyy | Yes or No |
| General_Liability_Per_Occurrence_$ | $500,000 | >=$500,000 | Yes or No |
| General_Liability_Aggregate_$ | $1,000,000 | >=$1,000,000 | Yes or No |
| Error_&_Omissions_$ | $2,000,000 | >=$2,000,000 | Yes or No |
| Automobile_$ | $500,000 | >=$500,000 | Yes or No |
| Employee_Dishonesty_$ | $1,000,000 | >=$1,000,000 | Yes or No |
| Employer_Liability/Workman's_Comp_$ | $1,000,000 | >=$1,000,000 | Yes or No |

FIG. 17

SIC Industry Vendor Qualification Data

| | |
|---|---|
| SIC Country | Value From Profile |
| SIC Region | Value From Profile |
| SIC City | Null if Multiple (User Input-1 Only) |
| Total Vendor Population | Vendor Count from System Query |

Business Qualifier Review

| | | |
|---|---|---|
| *List of all Business Entity Types | Vendor Count | % to total Vendor Count |
| *List of all Minority Business Types | Vendor Count | % to total Vendor Count |
| Percent with Audited Statements | Vendor Count | % to total Vendor Count |
| Percent with Verified Tax Filing | Vendor Count | % to total Vendor Count |
| Percent EFT Enabled | Vendor Count | % to total Vendor Count |
| Percent EDI Enabled | Vendor Count | % to total Vendor Count |
| Percent D&B Listed | Vendor Count | % to total Vendor Count |
| Percent JD Power Listed | Vendor Count | % to total Vendor Count |
| Percent Publicly Traded | Vendor Count | % to total Vendor Count |
| Percent Union Shop | Vendor Count | % to total Vendor Count |

| | | | | | |
|---|---|---|---|---|---|
| Previous Year Sales | Range(Low-High) | Median | Average | Std Deviation | Vendor Count within Std Dev |
| Previous Year Profit | Range(Low-High) | Median | Average | Std Deviation | Vendor Count within Std Dev |
| Net Worth | Range(Low-High) | Median | Average | Std Deviation | Vendor Count within Std Dev |
| Years in Business | Range(Low-High) | Median | Average | Std Deviation | Vendor Count within Std Dev |
| Number of FTEs | Range(Low-High) | Median | Average | Std Deviation | Vendor Count within Std Dev |
| Provide Standard Service Warranty | Range(Low-High) | Median | Average | Std Deviation | Vendor Count within Std Dev |
| Provide Standard Goods Warranty | Range(Low-High) | Median | Average | Std Deviation | Vendor Count within Std Dev |

Insurance Review

| | | | | | |
|---|---|---|---|---|---|
| *List of all Insurance Types | Range(Low-High) | Median | Average | Std Deviation | Vendor Count within Std Dev |

Certification Review

| | | |
|---|---|---|
| *List of all Certification Types | Vendor Count | % to total Vendor Count |

[View Buyer Preferences] [Qualification Recommendations] [Edit Criteria] [Save Criteria] [Save Data] [Back]

*FIG. 20A*

SIC Industry Buyer Qualification Data

| | |
|---|---|
| SIC Country | Value From Profile |
| SIC Region | Value From Profile |
| SIC City | Null if Multiple (User Input-1 Only) |
| Total Buyer Population | Buyer Count from System Query |

Business Qualifier Review

| | | |
|---|---|---|
| *List of all Business Entity Types Desired | Buyer Count | % to total Buyer Count |
| *List of all Minority Business Types | Buyer Count | % to total Buyer Count |
| Percent Requesting Audited Statements | Buyer Count | % to total Buyer Count |
| Percent Requesting Verified Tax Filing | Buyer Count | % to total Buyer Count |
| Percent Requesting EFT Enabled | Buyer Count | % to total Buyer Count |
| Percent Requesting EDI Enabled | Buyer Count | % to total Buyer Count |
| Percent Requesting D&B Listed | Buyer Count | % to total Buyer Count |
| Percent Requesting JD Power Listed | Buyer Count | % to total Buyer Count |
| Percent Requesting Publicly Traded | Buyer Count | % to total Buyer Count |
| Percent Requesting Union Shop | Buyer Count | % to total Buyer Count |

| | | | | | |
|---|---|---|---|---|---|
| Previous Year Sales Desired | Range(Low-High) | Median | Average | Std Deviation | Buyer Count within Std Dev |
| Previous Year Profit Desired | Range(Low-High) | Median | Average | Std Deviation | Buyer Count within Std Dev |
| Net Worth Desired | Range(Low-High) | Median | Average | Std Deviation | Buyer Count within Std Dev |
| Years in Business Desired | Range(Low-High) | Median | Average | Std Deviation | Buyer Count within Std Dev |
| Number of FTEs Desired | Range(Low-High) | Median | Average | Std Deviation | Buyer Count within Std Dev |
| Provide Standard Service Warranty | Range(Low-High) | Median | Average | Std Deviation | Buyer Count within Std Dev |
| Provide Standard Goods Warranty | Range(Low-High) | Median | Average | Std Deviation | Buyer Count within Std Dev |

Insurance Review

| | | | | | |
|---|---|---|---|---|---|
| *List of all Insurance Types Desired | Range(Low-High) | Median | Average | Std Deviation | Buyer Count within Std Dev |

Certification Review

| | | |
|---|---|---|
| *List of all Certification Types Desired | Buyer Count | % to total Buyer Count |

[View Vendor Information] [Qualification Recommendations] [Edit Criteria] [Save Criteria] [Save Data] [Back]

*FIG. 20B*

SYSTEM AND METHOD FOR ENABLING AND MAINTAINING VENDOR QUALIFICATION

CROSS-REFERENCE TO RELATED APPLICATIONS

This patent application is a continuation application of, and incorporates by reference the entire disclosure of, U.S. patent application Ser. No. 10/141,801, filed on May 9, 2002 now abandoned.

BACKGROUND OF THE INVENTION

1. Field of the Invention

The present invention relates generally to a computer system and method for qualifying vendors, and specifically to a computer system and method for collecting and maintaining vendor qualification information to qualify vendors on a per industry basis and a per buyer basis.

2. Description of Related Art

Each industry has different requirements for the goods and services used in the industry. In addition, each buyer within the industry may have additional requirements for the goods and services used by the buyer. These goods and services can range from manufacturing components to labor resources (e.g., contractors, temporary employees and permanent employees). Although the amount and type varies, buyers typically perform some sort of due diligence prior to purchasing these goods and services in order to justify their purchasing decisions. For example, a buyer may require capabilities (qualification) information of the vendor providing the good and/or service before making their purchasing decision. In many cases, the qualification information is solicited from the vendor in the form of a Request for Proposal (RFP) or a Request for Quotation (RFQ).

In the past, the vendor qualification process has been labor intensive and restricted to a limited number of known vendors. However, with the advent of the digital age, buyers now have access to a various mediums to obtain vendor qualification information faster, cheaper and more efficiently. In addition, the pool of vendors to select from has increased due to new digital sources of vendor information. For example, buyers and vendors now have access to Internet computer networks that provide a forum for buyers to send RFQ's to qualified vendors registered with the computer network. Vendor information for each registered vendor can be centrally stored and compared to filter parameters in a submitted RFQ to select the appropriate vendors to receive the RFQ.

Although such a network provides a potentially larger pool of vendors to receive the RFQ, the buyer must enter the filter parameters for each RFQ submitted. The process of entering the filter parameters places an additional burden on the buyer, resulting in a more time-consuming and expensive RFQ submittal. In addition, if the filter parameters are not tailored appropriately, the buyer may receive RFQ responses from vendors that are not qualified, thereby requiring the buyer to review unwanted responses, and possibly re-submit a new RFQ with different filter parameters. Likewise, the network must compare the filter parameters to stored vendor information for each RFQ received. The extensive processing required to perform comparisons for each RFQ may degrade network performance and increase the associated costs of providing a vendor information service. Therefore, what is needed is a vendor qualification system that provides access to a large pool of vendors with minimal network processing and reduced buyer requirements.

SUMMARY OF THE INVENTION

To overcome the deficiencies of the prior art, embodiments of the present invention provide a computer system and method for pre-qualifying vendors using vendor criteria information associated with buyers and/or industries and vendor qualification information associated with vendors. A database maintains the vendor criteria information and vendor qualification information. In one embodiment, vendors and buyers enter the vendor qualification information and vendor criteria information, respectively, into vendor records and buyer records, respectively, in the database in a hierarchical and relational manner. A web-based interface to the computer system provides web pages to the vendors and buyers to solicit particular vendor qualification/criteria information. Subsequent web pages are selected based upon the vendor and buyer responses entered in previous web pages. A vendor qualification tool compares entered vendor qualification information to stored vendor criteria information to pre-qualify vendors for buyers.

According to further embodiments of the present invention, vendors can be pre-qualified or compared on a per industry basis using industry-related vendor criteria information. In one embodiment, the industry-related vendor criteria information is pre-configured based on industry standards and requirements and vendors are pre-qualified based upon the industry requirements. In another embodiment, the industry-related vendor criteria information includes statistical data collected from vendor records and/or buyer records within the database, and vendors can be compared to the statistical data. This statistical data can further serve as a benchmarking tool for buyers and vendors when entering the vendor criteria information and vendor qualification information, respectively. The database can further maintain the industry-related vendor criteria information within industry records.

In still further embodiments of the present invention, the computer system monitors the stored vendor qualification information and requests updated vendor qualification information from the vendors to maintain vendor qualification on a per industry and per buyer basis. A vendor maintenance tool periodically reviews the stored vendor qualification information in the database to ascertain whether updated vendor qualification information is required and requests updated vendor qualification information from the vendors. The vendor maintenance tool is further capable of selectively removing vendors from one or more lists of pre-qualified vendors on a per industry or per buyer basis when updated vendor qualification information is not received.

Embodiments of the present invention provide buyers with one or more lists of pre-qualified vendors to select from. Buyers can submit RFP/RFQ's to all pre-qualified vendors on the list or to only a select number of the pre-qualified vendors, depending upon the buyer's preference. The list of pre-qualified vendors is created from a large pool of vendors to allow buyers access to a wide variety of vendors. However, the RFP/RFQ's are sent to only those vendors on the pre-qualified list, which reduces system processing complexity by performing the qualification one-time only per industry or per buyer prior to creation and submission of the RFP/RFQ's. In addition, buyer time and cost for creating and submitting the RFP/RFQ is reduced by qualifying vendors prior to creation of the RFP/RFQ.

BRIEF DESCRIPTION OF THE DRAWINGS

The disclosed invention will be described with reference to the accompanying drawings, which show important sample embodiments of the invention and which are incorporated in the specification hereof by reference, wherein:

FIGS. 10A and 10B are screen shots of exemplary web pages illustrating a sample user interface for configuring general vendor criteria information;

FIGS. 12A and 12B are screen shots of exemplary web pages illustrating a sample user interface for configuring industry-specific vendor criteria information;

FIG. 15B is a screen shot of an exemplary web page displaying industry-related vendor criteria information;

FIG. 17 is a table illustrating the comparison of vendor qualification information and vendor criteria information to qualify a vendor per industry or per buyer;

FIGS. 20A and 20B are screen shots illustrating exemplary web pages displaying statistical industry data related to vendors and buyers;

DETAILED DESCRIPTION

The numerous innovative teachings of the present application will be described with particular reference to exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

In accordance with embodiments of the present invention, a vendor is any provider of goods and/or services, and a buyer is any purchaser of goods and/or services. Each buyer has specific requirements for the goods and services used by the buyer. These goods and services can range from manufacturing components to labor resources (e.g., contractors, temporary employees and permanent employees). Likewise, each industry has specific requirements for the goods and services used in the industry. Qualifying a vendor to do business in a particular industry or with a particular buyer is accomplished using embodiments of the present invention.

Figure 1:
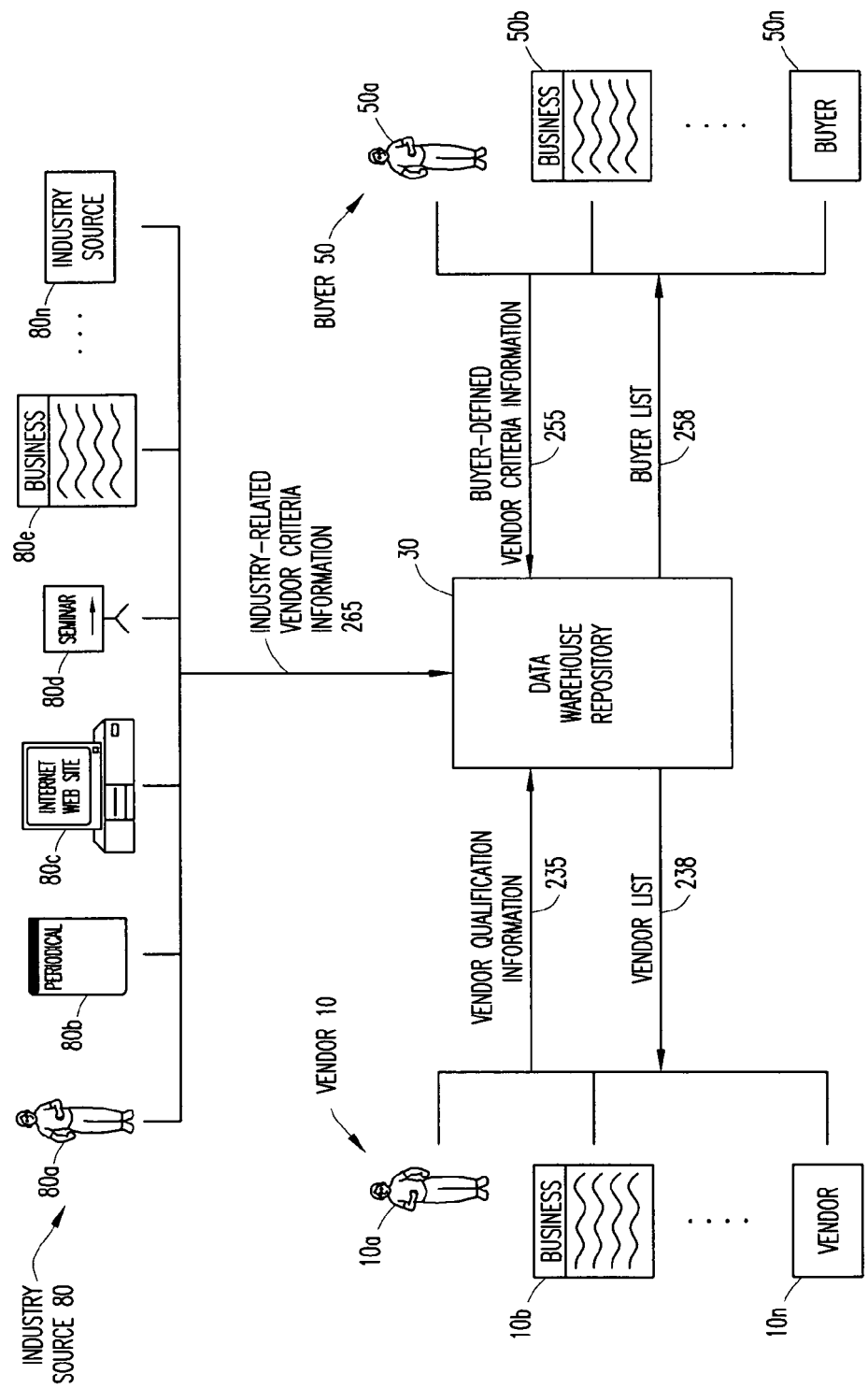
FIG. 1 is a high-level functional view of the vendor qualification process involved in the present invention.

FIG. 1 is a high-level functional view of the vendor qualification process involved in the present invention. Vendor qualification information 235 is collected by a data warehouse repository 30 from multiple vendors $10a \ldots 10n$. For example, the vendor qualification information can be collected from an individual $10a$, business entity $10b$ or any other vendor $10n$ that provide goods and/or services. In addition, buyer-defined vendor criteria information 255 is collected by the data warehouse repository 30 from one or more buyers $50a \ldots 50n$. For example, the buyer 50 can be an individual $50a$, business entity $50b$ or any other buyer $50n$ that has a need to qualify vendors.

Furthermore, industry-related vendor criteria information 265 is collected by the data warehouse repository 30 from one or more industry sources $80a \ldots 80n$. For example, the industry-related vendor criteria information 265 can be collected from an individual $80a$ having expertise in a particular industry, periodicals $80b$ (e.g., newspapers, magazines, etc.) related to the industry, Internet web sites $80c$ having industry-related information, industry seminars $80d$, business entities in the industry $80e$ and any other source $80n$ of industry-related vendor criteria information 265. In one embodiment, business entity industry sources $80e$ can include multiple buyers 50 and/or vendors 10, and the industry-related vendor criteria information 265 can include statistical data pertaining to the vendor criteria information 255 provided by buyers 50 and/or statistical data pertaining to the vendor qualification information 235 provided by vendors 10.

The vendor qualification information 235, buyer-defined vendor criteria information 255 and industry-related vendor criteria information 265 collected by the data warehouse repository 30 are all organized in mirroring hierarchical and relational structures to facilitate efficient and effective comparison of the vendor qualification information 235 to the vendor criteria information 255 and/or 265. For example, the vendor qualification information 235 and vendor criteria information 255 and 265 can be categorized based upon industry criteria (e.g., certification and insurance requirements), location and business type.

To qualify vendors for particular industries and/or particular buyers, the data warehouse repository 30 can further compare the collected vendor qualification information 235 to the collected vendor criteria information 255/265. All of the qualified vendors for a particular buyer can be output to the particular buyer in the form of a buyer list 258. In addition, all of the buyers and/or industries that a particular vendor is qualified for can be output to the particular vendor in the form of a vendor list 238.

Figure 2:
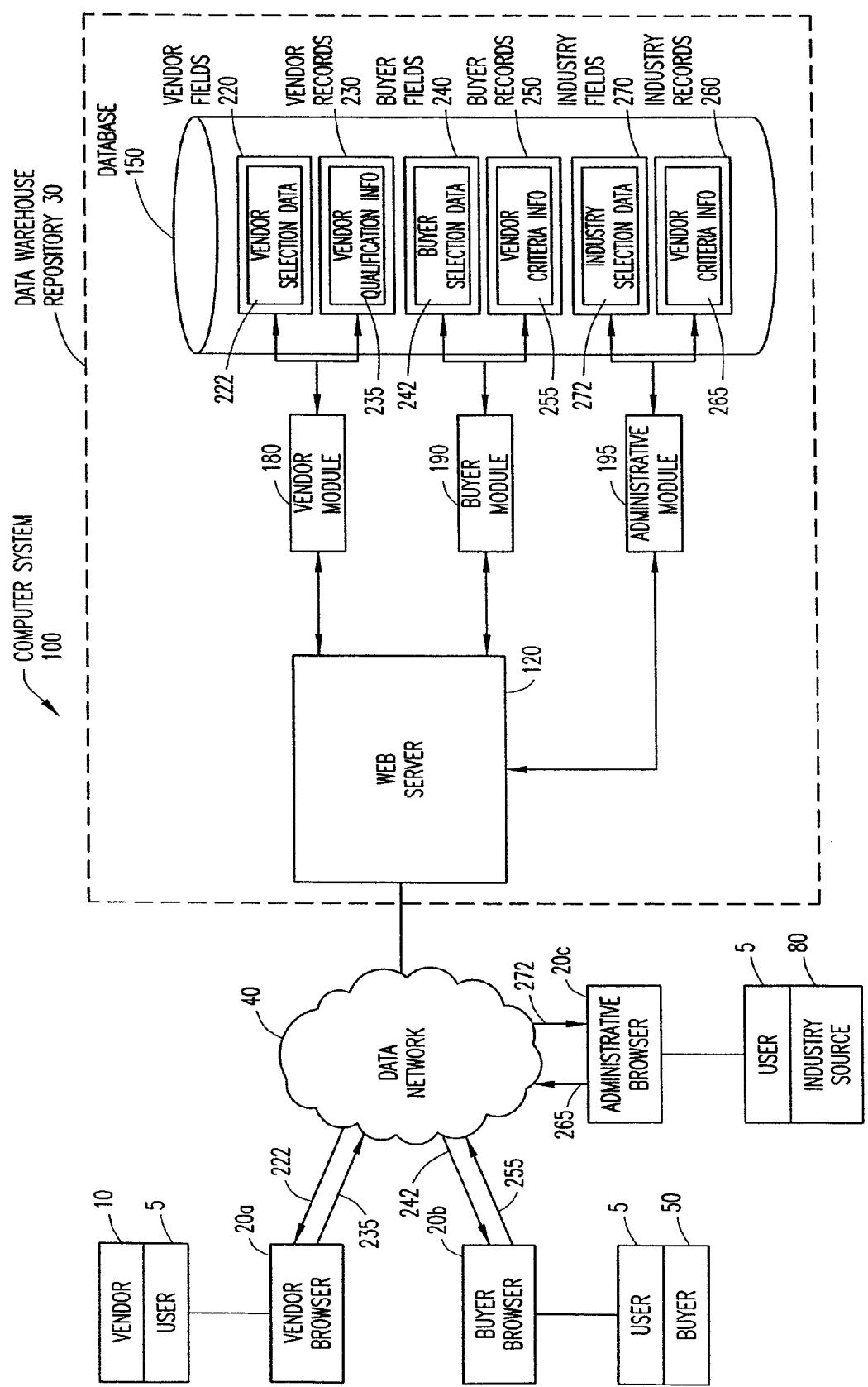
FIG. 2 is a network diagram of the computer system of the present invention.

In accordance with embodiments of the present invention, the data warehouse repository 30 can be implemented within a computer system 100, as is shown FIG. 2. A user 5 can enter the computer system 100 through a data network 40 via a web browser 20. A user 5 includes any person associated with a vendor 10 any person associated with a buyer 50 or any administrative person associated with the computer system 100 and providing information from an industry source 80. By way of example, but not limitation, the data network 40 can be the Internet or an Intranet, and the web browser 20 can be any available web browser or any type of Internet Service Provider (ISP) connection that provides access to the data network 40. Vendor users 5 access the computer system through a vendor browser 20a, buyer users 5 access the computer system via a buyer browser 20b and administrative users 5 access the computer system through an administrative browser 20c. The users 5 access the computer system 100 through a web server 120 capable of pushing web pages to the vendor browser 20a and buyer browser 20b, respectively. The web server 120 can be, for example, a Microsoft Internet Information Services (IIS) server.

The web server 120 enables vendors 10 and buyers 50 to interface to a database 150 maintaining vendor qualification information 235 within vendor records 220, buyer-defined vendor criteria information 255 within buyer records 250 and industry-related vendor criteria information 265 within industry records 260. The database 150 can be, for example, a SQL server. The database 150 further stores vendor fields 220 including vendor selection data 222 used for soliciting the vendor qualification information 235 from the vendors 10, buyer fields 240 including buyer selection data 242 used for soliciting the buyer-defined vendor criteria information 255 from the buyers 50 and industry fields 270 used for soliciting industry-related vendor criteria information 265 from industry sources 80.

The database 150 interface to the vendor users 5 is provided by the web server 120 through a vendor module 180. For example, the vendor module 180 can populate web pages pushed to the vendor browser 20a using the vendor selection data 222 within the vendor fields 220 stored in the database 150. In addition, the vendor module 180 can store the vendor qualification information 235 entered by the vendor user 5 at the vendor browser 20a into the vendor records 230 stored in the database 150.

The database 150 interface to the buyer users 5 is provided by the web server 120 through a buyer module 190. For example, the buyer module 190 can populate web pages pushed to the buyer browser 20b using the buyer selection data 242 within the buyer fields 240 stored in the database 150. In addition, the buyer module 190 can store the buyer-defined vendor criteria information 255 entered by the buyer user 5 at the buyer browser 20b into the buyer records 250 stored in the database 150.

The database 150 interface to the industry source users 5 is provided by the web server 120 through an administrative module 195. For example, the administrative module 195 can populate web pages pushed to the administrative browser 20c using the industry selection data 272 within the industry fields 270 stored in the database 150. In addition, the administrative module 195 can store the industry-related vendor criteria information 265 entered by the industry source user 5 at the administrative browser 20c into the industry records 260 stored in the database 150. In one embodiment, the industry-related vendor criteria information 265 indicates industry-defined requirements for a vendor 10 to do business in a particular industry. In another embodiment, the industry-related vendor criteria information 265 can include, in addition to the industry-defined requirements or in place of the industry-defined requirements, statistical data collected from buyer records 250 and/or vendor records 230 related to a particular industry.

The vendor module 180, buyer module 190 and administrative module 195 all serve as user interfaces to the computer system 100. The modules 180, 190 and 195 each present similar hierarchical and table-driven user interfaces to users 5 in order to enable a user to enter information 235, 255 or 265 into the database 150. It should be noted that the vendor module 180, buyer module 190 and administrative module 195 can each include any hardware, software and/or firmware required to perform the functions of the vendor module 180, buyer module 190 and administrative module 195, and can be implemented as part of the web server 120, or within an additional server (not shown).

The computer system 100 uses the vendor qualification information 235 stored in the vendor records 230 and the buyer-defined vendor criteria information 255 stored in the buyer records 250 to qualify each of the vendors 10 to do business with each of the buyers 50. In addition, the computer system 100 can further use the industry-related vendor criteria information 265 stored in the industry records 260 to qualify each of the vendors 10 to do business in specific industries in addition to or in place of qualifying each of the vendors 10 for each of the buyers 50. Industries and buyers are hereinafter referred to collectively as qualifiers. In other embodiments, the industry-related vendor criteria information 265 can be used to compare vendors 10 to industry standards (static or dynamic) or as a benchmarking tool for buyers when entering buyer-defined vendor criteria information 255 or for vendors when entering vendor qualification information 235.

Figure 3:
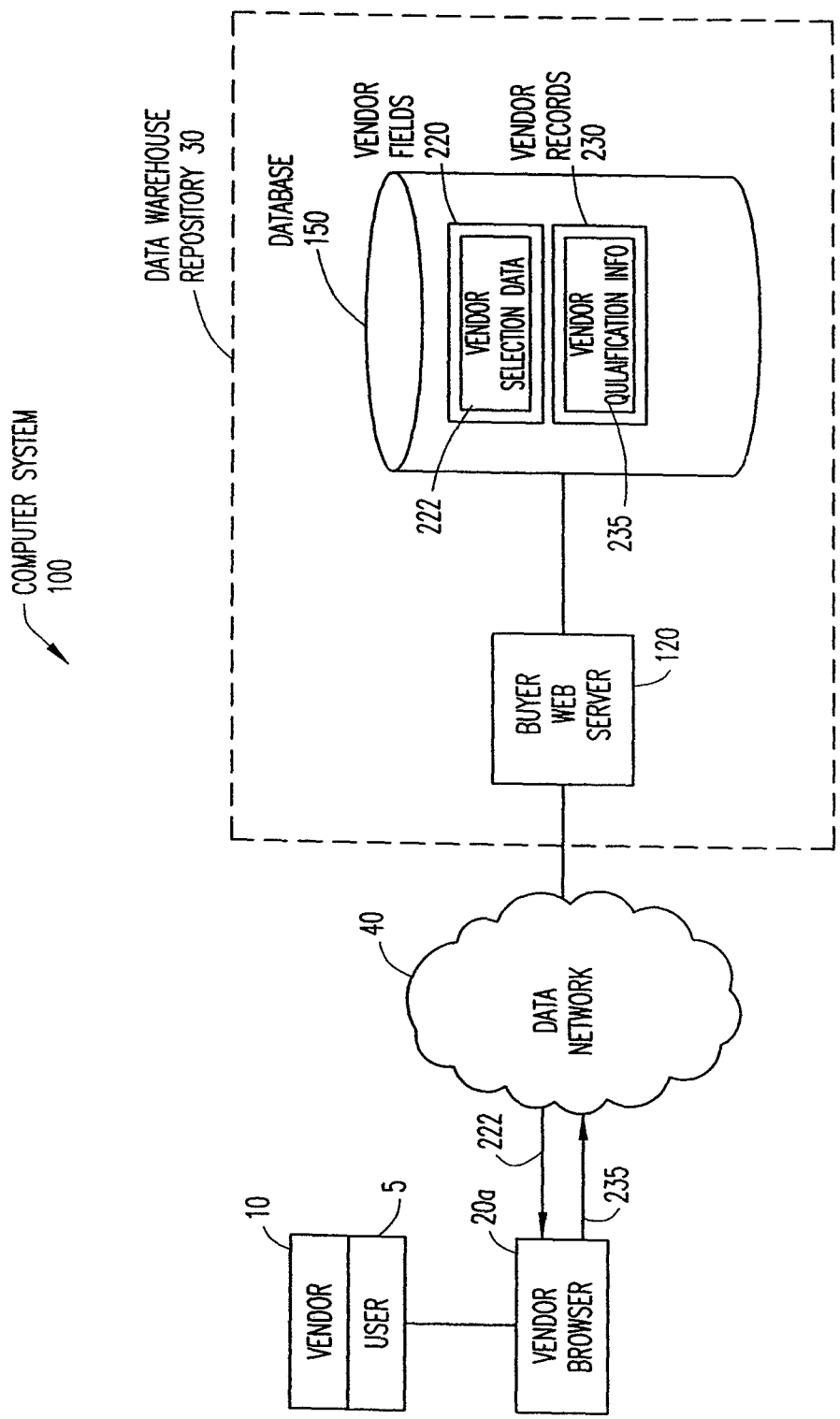
FIG. 3 is an alternate network diagram of the computer system of the present invention implemented at the buyer network.

In another embodiment, as shown in FIG. 3, instead of qualifying vendors for a plurality of buyers, the computer system 100 can be implemented solely at the buyer network to enable a particular buyer to qualify vendors 10 for only that buyer. In FIG. 2, vendor users 5 enter the computer system 100 via a data network 40 through a vendor browser 20a, as in FIG. 1. However, the web server 120 in FIG. 3 is a buyer web server controlled and operated by a single buyer. The database 150 stores the vendor fields 220 shown in FIG. 2 and can further store vendor records 230 for only the vendors 10 that are qualified by the buyer, or vendor records 230 for all vendors 10 that enter vendor qualification information 235 into the computer system 100, depending upon the buyer constraints. However, only those vendors 10 that qualify to do business with the buyer based upon a comparison between the entered vendor qualification information 235 and buyer-defined vendor criteria information (that may or may not be stored in the database 150) are used by the buyer in selecting a particular vendor 10 to provide a good and/or service to the buyer. For example, the buyer can send RFP/RFQ's to qualified vendors 10 or select a particular qualified vendor 10 based on the vendor qualification information 235 entered by the vendor 10.

Figure 4:
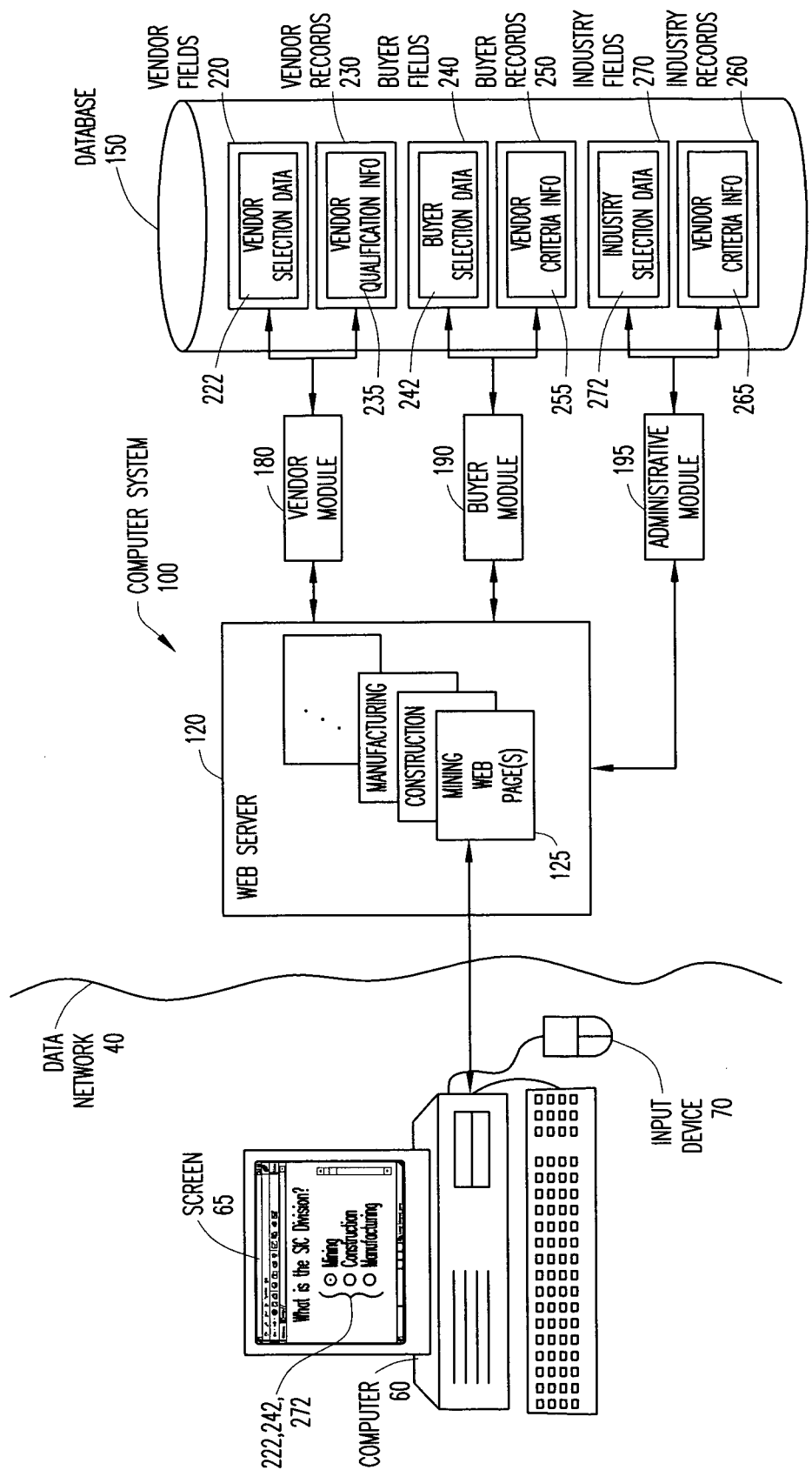
FIG. 4 is an exemplary functional view illustrating the vendor and buyer record creation process, in accordance with embodiments of the present invention.

Referring now to FIG. 4, an exemplary functional view of the vendor, buyer and industry record creation process is shown. A vendor user, a buyer user or an administrative user accesses the web server 120 of the computer system 100 by connecting a computer 60 to a data network 40. The computer 60 can be, for example, a personal computer, a laptop computer, a computer connected to a wireless device for remote access to the data network, a handheld wireless device providing a web browser capable of accessing the data network or other type of machine implementing a web browser.

Upon entering the Uniform Resource Locator (URL) of the web server 120, a connection between the computer 60 and the web server 120 is created. The web server 120 pushes web pages 125 to the computer 60 for viewing by the user on a user interface device 65. In one embodiment, the user interface device 65 can be, for example, a computer screen 15 connected to the computer 60. For example, once a user has been validated (i.e., by entering a user name and password), the user can view one or more web pages 125 on the computer screen 65, each containing prompts for the user to enter various information into the computer system 100. The user can enter the information into the computer 60 for transmission via the data network 40 to the web server 120 via any type of input device 70, such as, for example, a mouse (as illustrated), keyboard, touch screen, voice recognition software or light pen. The subsequent web pages 125 that are pushed to the computer 60 are based upon the information entered by the user in response to the prompts. In addition, the web pages 125 can be pushed to the computer 10 one-at-a-time or in bulk, depending upon the type of information being solicited by the computer system 100 and the settings of the computer system 100.

For example, as can be seen in FIG. 4, the web page 125 displayed on the computer screen 65 asks the user "What is the SIC Division?" The web page 125 further prompts the user to select from several SIC Division choices (only three of which are displayed). The user selects one of the SIC Division choices, using the input device 70, and the selected vendor qualification information 235 or vendor criteria information 255 or 265 is transmitted from the computer 60 to the web server 120 via the data network 40. Based upon the selected vendor qualification information 235 or vendor criteria information 255 or 265, the web server 120 selects and provides subsequent web pages 125 to the computer 60 to solicit additional information. As shown in FIG. 4, the user selected the choice "Mining," and in response, the web server 120 can push one or more "Mining Web Pages" 125 to the computer 60.

Each web page 125 pushed to the computer 60 is populated with data retrieved by the vendor module 180, buyer module 190 or administrative module 195 from the vendor fields 220, buyer fields 240 or industry fields 270, respectively, stored within the database 150. The web server 120 uses the vendor module 180, the buyer module 190 or administrative module 195 based upon the log-in of the user. The vendor fields 220 include vendor selection data 222, such as the vendor selections or prompts to be displayed on the web pages 125 to the vendor user, the buyer fields 240 include buyer selection data 242, such as the buyer selections or prompts to be displayed on the web pages 125 to the buyer, and the industry fields 270 include industry selection data 272, such as the industry selections or prompts to be displayed on the web pages 125 to the administrative user. For example, if the user is a vendor user, the vendor module 180 receives the vendor qualification information 235 entered by the vendor user from the web server 120 and accesses the vendor fields 220 to retrieve the vendor selection data 222 to be populated in subsequent web pages 125 (e.g., "Mining" web pages 125).

The vendor fields 220, buyer fields 240 and industry fields 270 are organized in a hierarchical relationship to enable the vendor module 180, buyer module 190 and industry module 195, respectively, to determine the appropriate fields to use for populating subsequent web pages 125. For example, the vendor module 180 can include a pointer (not shown) that points to a particular vendor field 220 in the database 150. When the vendor module 180 receives new vendor qualification information 235 from the web server 120, the vendor module 180 uses the pointer to locate the current vendor field 220 associated with the previous vendor qualification information 235 and moves the pointer to the next vendor field 220 associated with the new vendor qualification information 235. The buyer module and administrative module can be similarly configured.

The vendor fields 220, buyer fields 240 and industry fields 270 are scalable and configurable per buyer and/or per industry to meet the needs of each particular industry and each particular buyer within the industry. Thus, new vendor fields 220, buyer fields 240 and industry fields 270 and new data 222, 242 or 272 within the vendor fields 220, buyer fields 240 and industry fields 270, respectively, can be easily added to the database 150 at any time. In addition, vendors, buyers and administrative users can update their records 230, 250 and 260, respectively, at any time with the new data and/or fields 220, 240 and 270, respectively. For example, the computer system 100 can send update messages (e.g., via electronic mail messages or dashboard posting) to the vendors, buyers and industry source users with the new data and/or fields 220, 240 and 270 available. The update message can be sent to all vendors, buyers and industry source users registered with the computer system 100 or to only those vendors, buyers and industry source users who have a need to update their records 230, 250 or 260, respectively, based on the new data and/or field 220, 240 or 270 (e.g., all vendors and buyers in a particular industry related to the new data and/or field 220 or 240, all vendors pre-qualified for a particular buyer, etc.).

Examples of vendor fields 220, buyer fields 240 and industry fields 270 stored within the database 150 are illustrated in Tables 1-4 below. The fields 220, 240 and 270 are illustrated for simplicity as being organized in a table format, with each table including all of the fields 220, 240 and 270 necessary for displaying vendor selection data 222, buyer selection data 242 or industry selection data 272 on a particular web page. The tables are related in a hierarchical manner, such that the tables are accessed in a particular order.

TABLE 1 tblSICDivisions

| ASP_Display_Order | SIC_Division_Name | SIC_Division_Code_ID |
|---|---|---|
| 10 | Agriculture, Forestry, and Fishing | 1 |
| 9 | Mining | 2 |
| 8 | Construction | 3 |
| 7 | Manufacturing | 4 |
| 6 | Transportation, Communications, Electric, Gas and Sanitary Services | 5 |
| 5 | Wholesale Trade | 6 |
| 4 | Retail Trade | 7 |
| 3 | Finance, Insurance, and Real Estate | 8 |
| 2 | Services | 9 |
| 1 | Public Administration | 10 |

TABLE 2 tblSICMajorGroup

| ASP_Display_Order | SIC_MajorGroup_Name | SIC_MajorGroup_Code_ID | SIC_Division_Code_ID |
|---|---|---|---|
| 2 | Wholesale Trade - Durable Goods | 50 | 6 |
| 1 | Whole Trade - Non-Durable Goods | 51 | 6 |

TABLE 3 tblSICIndustryGroup

| ASP_Display_Order | SIC_IndustryGroup_Name | SIC_IndustryGroup_Code_ID | SIC_MajorGroup_Code_ID |
|---|---|---|---|
| 9 | Motor Vehicles and Motor Vehicle Parts | 501 | 50 |
| 8 | Furniture and Home Furnishings | 502 | 50 |
| 7 | Lumber and Other Construction Material | 503 | 50 |
| 6 | Professional and Commercial Equipment | 504 | 50 |
| 5 | Metals and Minerals | 505 | 50 |
| 4 | Electrical Goods | 506 | 50 |
| 3 | Hardware, Plumbing and Heating | 507 | 50 |
| 2 | Machinery Equipment and Supplies | 508 | 50 |
| 1 | Miscellaneous Durable Goods | 509 | 50 |

TABLE 4 tblSICIndustries

| ASP_Display_Order | SIC_Industry_Name | SIC_Industry_Code_ID | SIC_IndustryGroup_Code_ID |
|---|---|---|---|
| 2 | Furniture | 5021 | 502 |
| 1 | Home Furnishings | 5023 | 502 |

The fields shown in Tables 1-4 above contain selection data for soliciting profiling information from the vendors, buyers or industry source to categorize the type of good and/or service the vendor provides, the buyer desires or the industry is associated with. The selection data shown in Tables 1-4 above is based upon the Standard Industrial Classification (SIC) system provided by the Occupational Safety and Health Administration (OSHA) of the U.S. Department of Labor. However, it should be understood that any classification system can be used instead of the SIC system described herein.

For example, as shown in Table 1, the computer system 100 can define the type of good and/or service by enabling the vendor module 180, buyer module 190 or administrative module 195 to retrieve a "SIC Divisions" table from the database 150 and populate the next web page 125 with selection data 222, 242 or 272, respectively, containing the ten SIC division types: Agriculture, Forestry and Fishing; Mining; Construction; Manufacturing; Transportation, Communications, Electric, Gas and Sanitary Services; Wholesale Trade; Retail Trade; Finance, Insurance and Real Estate Services; Services; and Public Administration. The "SIC Divisions" table in Table 1 includes a SIC_Division_Code_ID field listing the SIC identification numbers of each of the SIC divisions, a SIC_Division_Name field listing the names of the SIC divisions to be displayed on the web page and an ASP_Display_Order field listing the display order for the SIC divisions on the web page.

Assuming the user selects "Wholesale Trade" as the SIC Division, the computer system can further define the type of wholesale trade by accesses a "SIC Major Group" table within the database and populating the next web page with wholesale trade major groups for the user to choose from, as shown in Table 2. The "Wholesale Trade" table in Table 2 includes a SIC_MajorGroup_Code_ID field listing the SIC identification numbers of each of the major groups and the SIC_Division_Code_ID field listing the SIC division code for each of the major groups. However, for simplicity, only the major groups associated with one particular SIC division are shown in Table 2 (e.g., Wholesale Trade—Durable Goods and Wholesale Trade—Non-Durable Goods). In addition, the "Wholesale Trade" table above further includes a SIC_MajorGroup_Name field listing the names of the Wholesale Trade major groups and an ASP_Display_Order field listing the display order for the major groups on the web page. It should be understood that the major groups for each of the SIC divisions can be can be subdivided into separate tables.

Assuming the user selects "Wholesale Trade—Durable Goods" as the SIC Major Group, the computer system can further define the type of wholesale durable goods that the vendor provides by accessing a "SIC Industry Group Wholesale Trade—Durable Goods" table above within the database and populating the next web page with appropriate industry groups for the user to select from, as shown in Table 3. Various exemplary industry groups for only the wholesale trade—durable goods major group are illustrated in Table 3 (for simplicity), with each SIC_IndustryGroup_Name field having a particular SIC_IndustryGroup_Code_ID field associated therewith for determining which the SIC identification numbers of each of the industry groups, an SIC_MajorGroup_Code_ID field associated therewith for determining the industry groups associated with the selected major group and an ASP_Display_Order field associated therewith for determining the display order of the SIC industry groups.

Assuming the user selects "Furniture and Home Furnishings" as the SIC Industry Group, the computer system can further define the type of industry associated with the vendor by accessing a "SIC Industries Furniture" table within the database 150 and populating the next web page with appropriate industries for the user to select from, as shown in Table 4. Various exemplary industries for only the "Furniture and Home Furnishings" industry group are illustrated in Table 4 (for simplicity), with each SIC_Industry_Name field having a particular SIC_Industry_Code_ID field associated therewith for determining which the SIC identification numbers of each of the industry groups, an SIC_IndustryGroup_Code_ID field associated therewith for determining the industries associated with the selected industry group and an ASP_Display_Order field associated therewith for determining the display order of the SIC industries.

The type of good and/or service can be further defined by the user, and information specific to a particular type of good and/or service can be solicited from the user using subsequent tables, not shown. In addition, it should be understood that the computer system does not limit each vendor or buyer to only one good and/or service. Therefore, each vendor or buyer can enter multiple goods and/or services. In general, the computer system does not limit each vendor, buyer or administrator to only one data entry for each field or only one data entry for each table, so that vendors, buyers and administrators can adequately describe all of the goods and/or services associated therewith and all of the relevant qualification information associated with the goods and/or services.

Turning again to FIG. 4, all of the information entered by the user (i.e., vendor qualification information 235 or vendor criteria information 255 or 265) and received at the web server 120 is stored in a vendor record 230, a buyer record 250 or an industry record 260 within the database 150 (as described above in connection with FIG. 2) via the vendor module 180, buyer module 190 and administrative module 195, respectively. The vendor qualification information 235 and the vendor criteria information 255 or 265 in the vendor record 230, buyer record 250 and industry record 260, respectively, are organized in the same hierarchical and relational manner as the vendor fields 220, buyer fields 240 and industry fields 270, respectively.

For example, referring now to Tables 5-7 hereinbelow, examples of the type of vendor qualification information 235 stored in a vendor record 230 are illustrated.

TABLE 5 tblVendorMaster

| Column Name | Data Type | Length | Vendor Qualification Information |
|---|---|---|---|
| Vendor_ID | int | 4 | XXX |
| vCompany_Name | nvarchar | 100 | ABC |
| v_Parent_Company_Name | nvarchar | 100 | |
| vCountry_ID | int | 4 | 1 |
| vYear_Corp | int | 4 | 10 |
| vBusiness_Entity_Type_ID | int | 4 | 1 |
| vDiversified_Business_Entity | char | 1 | Y |
| vDBE_Type_ID | int | 4 | 1, 2, 3, 4, 7, 8, 9 |
| vDBE_Certificate_Number | varchar | 50 | C57Z |
| vDBE_Certifying_Body | varchar | 100 | XYZ |
| vDBE_Certifying_State_ID | int | 4 | 3 |
| vFederal_Tax_ID | nvarchar | 50 | 2F22 |
| vFull_Time_Employee_Count | numeric | 9 | 500 |
| vW_2_Employee_Count | numeric | 9 | 1,000 |
| vNet_Worth | money | 8 | 1,000,000 |

TABLE 5-continued tblVendorMaster

| Column Name | Data Type | Length | Vendor Qualification Information |
|---|---|---|---|
| vPrior_Year_Revenue | money | 8 | 2,000,000 |
| vPrior_Year_Profit | money | 8 | 750,000 |
| vPrior_Year_Tax_Filing | char | 1 | Y |
| vPrior_Year_Audited_Statement | char | 1 | Y |
| vPrevious_Bankruptcy | char | 1 | N |
| vEDI_Capability | char | 1 | Y |
| vEFT_Capability | char | 1 | Y |
| vDun_Bradstreet_ID | nvarchar | 50 | |
| vDun_Bradstreet_Rating | nvarchar | 50 | |
| vJD_Power_Rating | varchar | 50 | |
| vWeb_Site_URL | varchar | 100 | www.vendorcompany.com |
| vCorporate_Location_Phone | varchar | 50 | 214-555-1212 |
| vCorporate_Location_Fax | varchar | 50 | 214-555-1213 |
| vCorporate_Location_Email | varchar | 50 | vendor@vendorcompany.com |
| vContracted | bit | 1 | 0 |
| vContract_Number | varchar | 50 | |
| vContract_Start_Date | datetime | 8 | |
| vContract_Expiration_Date | datetime | 8 | |
| vApproval_Status_ID | int | 4 | 1 |
| vCurrent_Status_ID | int | 4 | 1 |
| vInformation_Profile_Complete | char | 1 | Y |
| vCreate_Date | datetime | 8 | dd/mm/yyyy |
| vData_Renewal_Date | datetime | 8 | dd/mm/yyyy |

TABLE 6

Business Entity Types

| 1 | 'S' Corporation |
| 2 | General Partnership |
| 3 | Limited Liability Company |
| 4 | Sole Proprietorship |
| 5 | Other |
| 6 | 'C' Corporation |
| 7 | Limited Partnership |
| 8 | Limited Liability Partnership |
| 9 | Close Corporation |
| 10 | Professional Business Formation |
| 11 | PLC |
| 12 | Franchise |

TABLE 7

Diversified Supplier Types

| African_American_Male | 1 |
| African_American_Female | 2 |
| Hispanic_Male | 3 |
| Hispanic_Female | 4 |
| Hasidic_Male | 5 |
| Hasidic_Female | 6 |
| White_Female | 7 |
| Oriental_Male | 8 |
| Oriental_Female | 9 |
| Island_Pacific_Male | 10 |
| Island_Pacific_Female | 11 |
| Indian_Male | 12 |
| Indian_Female | 13 |
| Disabled_American_War_Veteran | 14 |

Table 5 shows a "Vendor Master" table that contains a number of vendor fields 220 and associated data entries 235 that provide basic vendor identification information, such as the vendor ID within the computer system, the company name, the company phone number and other basic identification information. Each vendor field 220 within the "Vendor Master" table is capable of supporting different data types (e.g., int, nvarchar, char, varchar, bit and datetime) of different data lengths. For example, the field 220 "vBusiness_Entity_Type_ID" is capable of supporting an intermittent number of numeric values, depending upon how the vendor's business is classified. Table 6 illustrates examples of the various business entity types and lists exemplary numeric identities assigned to each business entity type for that vendor field 220. The numeric identity of each business entity type that applies to the vendor can be stored in the "vBusiness_Entity_Type_ID" field 220. As another example, the field 220 "vDiversified_Business_Entity" is capable of supporting a single character (Y or N), depending upon whether the vendor has been certified as a diversified business. Table 7 illustrates examples of the various diversified vendor types, and the field 220 "vDBE_Type_ID" includes each diversified type ID that the vendor has been certified for.

Referring now to Tables 8-11 hereinbelow, additional vendor qualification information 235 provided by vendors are illustrated. Tables 8-10 illustrate insurance information, while Table 11 illustrates certification information.

TABLE 8 tblVendorInsurance (db structure view)

| Column Name | Data Type | Length |
|---|---|---|
| Vendor_Insurance_ID | int | 4 |
| viVendor_ID | int | 4 |
| viCarrier_Name | varchar | 50 |
| viCarrier_ID | int | 4 |
| viPolicy_Number | varchar | 50 |
| viPolicy_Exp_Date | dateline | 8 |
| vi_Policy_Amount_ID | int | 4 |
| vi_Policy_Currency_ID | int | 4 |
| viPStaff_Insured | char | 1 |
| viBuyer_Insured | char | 1 |
| viType_ID | int | 4 |
| Insurance_Coverage_Type_ID | int | 4 |
| viApproval_Status_ID | int | 4 |
| viCurrent_Status | int | 4 |
| viApproval_Date | datetime | 8 |

TABLE 9

Data from tblluInsuranceType

| | |
|---|---|
| General_Liability | 1 |
| Errors_&_Omissions | 2 |
| Automobile | 3 |
| Employee_Dishonesty | 4 |
| Employer_Liability-Workman's_Comp | 5 |
| Hazard_Insurance | 6 |
| Flood_Insurance | 7 |
| Fire_Marine_Casualty_Insurance | 8 |
| Surety_Insurance | 9 |
| Life_Insurance | 10 |

TABLE 10

Data from tblluInsuranceCoverageType

| | |
|---|---|
| Per_Occurrence | 1 |
| Aggregate | 2 |

TABLE 11 tblVendorCertification

| Column Name | Data Type | Length |
|---|---|---|
| Vendor_ID | int | 4 |
| SIC_Code_ID | int | 4 |
| Certification_Type_ID | int | 4 |
| Certificate_# | varchar | 100 |
| Certifying_Body | varchar | 100 |
| Certificate_Expiration_Date | datetime | 8 |
| GEO_Country_ID | int | 4 |
| GEO_Region_ID | int | 4 |
| GEO_City_ID | int | 4 |
| Record_Date | datetime | 8 |
| Approval_Status_ID | int | 4 |
| Current_Status_ID | int | 4 |

As shown in Tables 8-10 above, the vendor record can further include one or more tables under the "Vendor Master" table that include data (not shown) indicating the various carriers and types of insurance coverage the vendor maintains. Table 8 illustrates a sample "Vendor Insurance" table and exemplary vendor fields included within the "Vendor Insurance" table, each having a different data type. It should be noted that each "Vendor Insurance" table can include multiple records if the vendor has multiple insurance carriers. Table 9 illustrates examples of the various types of insurance that the vendor can provide and the associated data (i.e., numeric values for each insurance type) that can be populated in the "viType_ID" field of the "Vendor Insurance" table. Table 10 illustrates examples of the various insurance coverage types and the associated data (i.e., numeric values for each insurance coverage type) that can be populated in the "Insurance_Coverage_Type_ID" field of the "Vendor Insurance" table.

Table 11 illustrates a sample "Vendor Certification" table and exemplary vendor fields included within the "Vendor Certification" table, each having a different data type. The "Vendor Certification" table can be used to store certification information for the vendor related to each industry (good and/or service) that the vendor is associated with and each geographical area that the vendor provides the good and/or service. The certification can be required by a national or local regulatory authority (and thus, the geographical area can be defined at the national or local level) or by an industry group that certifies members of the industry (and thus, the geographical area can be undefined). It should be noted that each "Vendor Certification" table can include multiple records if the vendor industry requires multiple certifications and/or provides multiple goods and/or services.

Figure 5A:
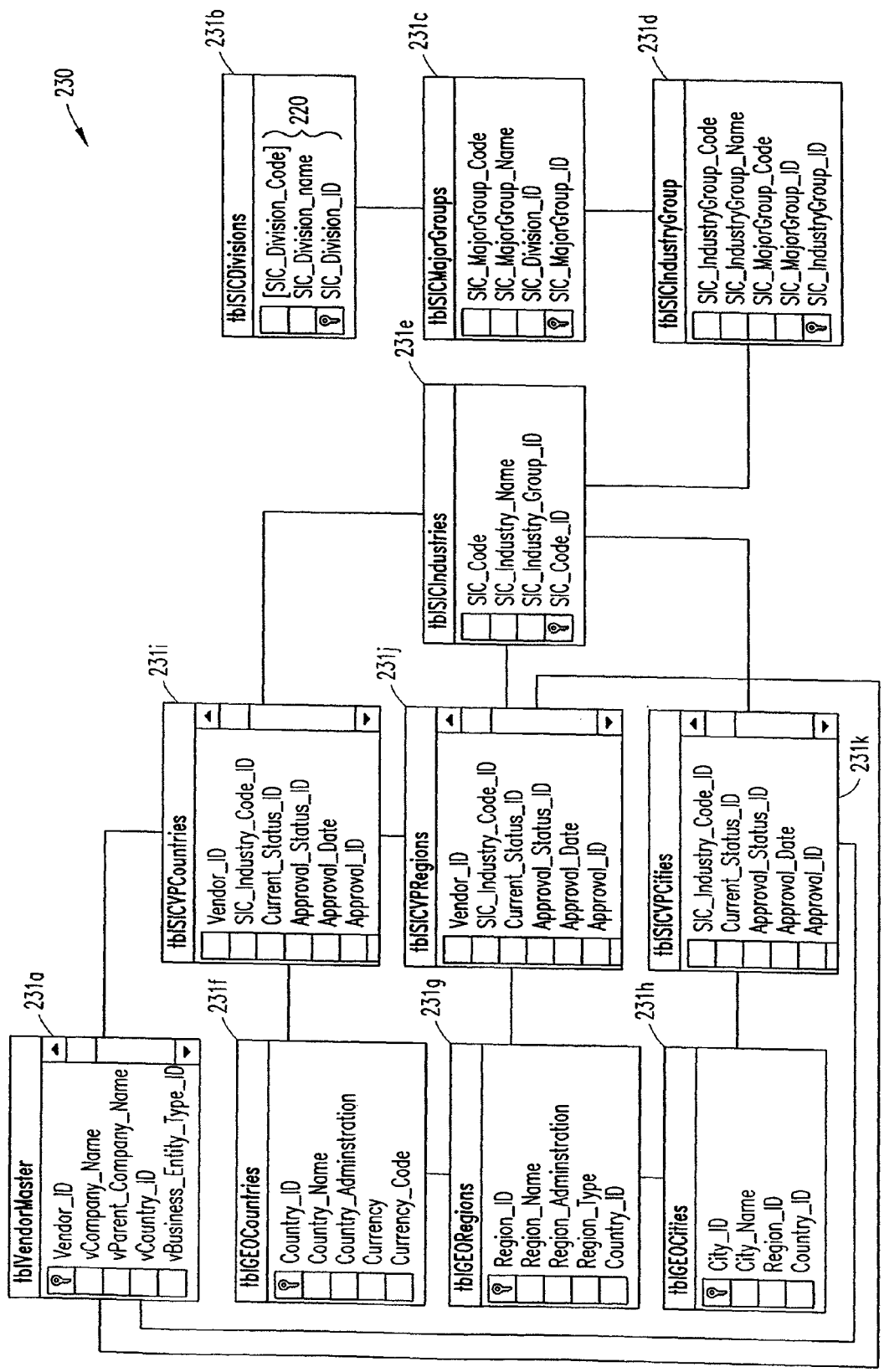
FIGS. 5A and 5B are database table views illustrating the interrelation between the different types of vendor qualification information entered and stored in the vendor records.
Figure 5B:
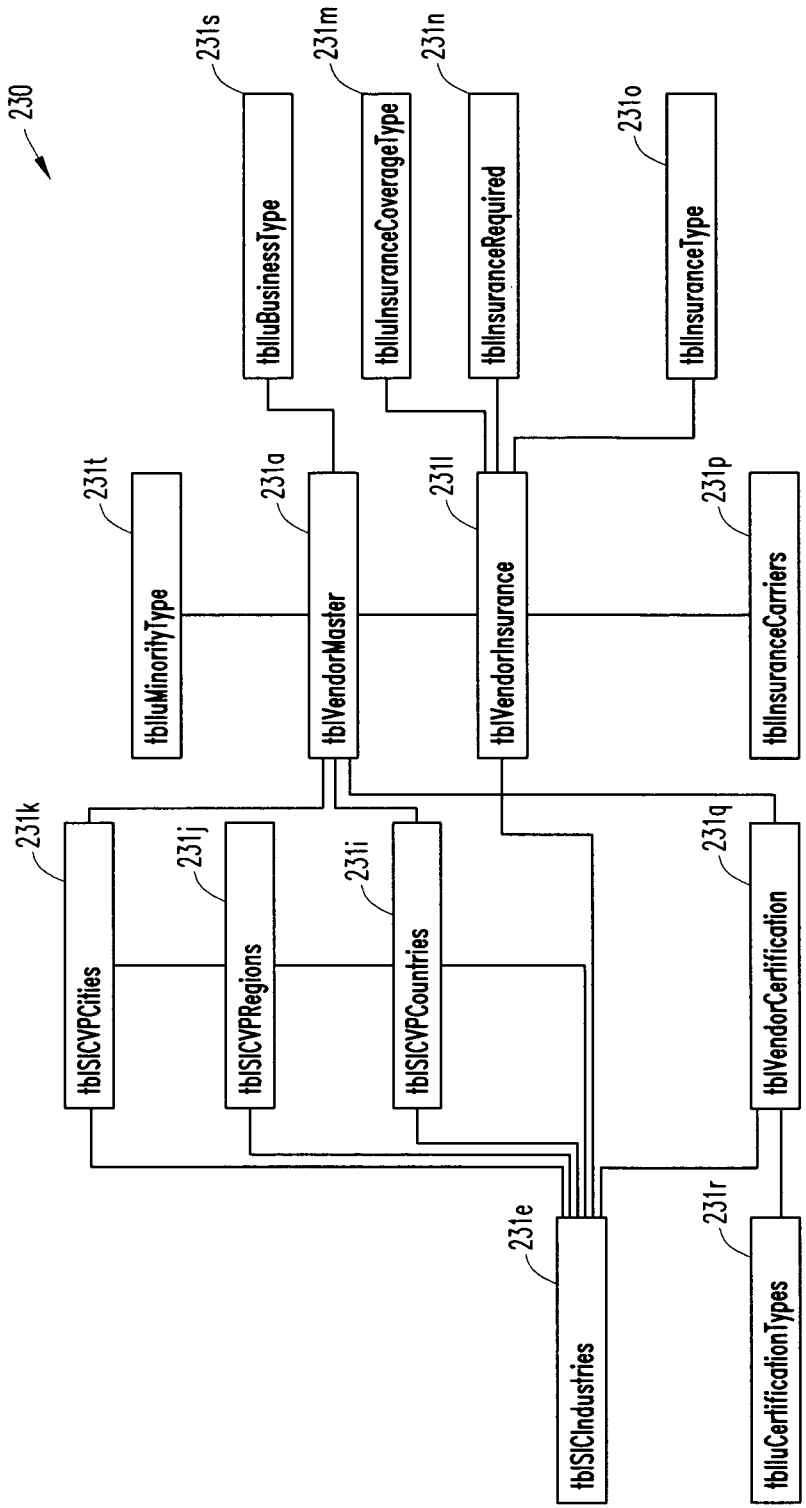

FIGS. 5A and 5B are database table views illustrating the interrelation between various different types of vendor fields 220 containing vendor qualification information (not shown) entered and stored in the vendor records 230. The "Vendor Master" table 231a, shown in Table 5 above, stores all of the general vendor profile information. The "Vendor Master" table 231a is tied to an SIC Industries table 231e that contains industry-specific vendor profile information to identify the specific industries that the vendor provides goods and/or services in. The geographical area(s) associated with the selected industries can be defined using a "SIC Countries" table 231i to identify the country where the vendor provides a certain good and/or service. The geographical area(s) can be further defined using a "SIC Region" table 231j and a "SIC City" table 231k. It should be understood that additional tables can be included to more concisely define the locations where the vendor is capable of providing goods and/or services, such as a "Zip Code" table (not shown), depending upon the needs of the buyer and/or the industry.

The "SIC Country", "SIC Region" and "SIC City" tables 231i-k are populated based upon values stored in master geographical tables "GEO Countries" 231f, "GEO Regions" 231g and "GEO Cities" 231h. The master geographical tables 231f-h constrain the data stored in the SIC geographical tables 231i-k based upon available geographical selections (e.g., the SIC region stored is based upon the GEO Regions associated with the stored SIC country, the SIC region and SIC city selections can be set to "all" to cover all SIC regions and SIC cities within the GEO Regions and GEO Cities tables if the vendor provides goods and/or services throughout a particular country, etc.). The "SIC Industries" table 231e is populated based upon the selected SIC division, SIC major group and SIC industry group and SIC industry, shown as SIC tables 231b-d. The SIC tables 231b-e are associated in a hierarchical and relational structure. For example, the "Major Group" table 231c is a second tier table to the "SIC Division" table 231b in that the "Major Group" table 231c lists the SIC identification of the major group and the SIC identification of the division associated with the major group. Other tables 231l-t, shown in FIG. 5B, can also be included in the vendor record 230 to further define other aspects of the vendor, such as the insurance information (tables 231l-p), certification information (tables 231q-r), business information (table 231s) and minority information (table 231t).

Many of the tables shown in FIG. 5A include an approval field 220 that indicates whether or not the vendor qualification information entered by the vendor has been approved by the computer system. For example, the vendor location tables 231i-k each include the field 220 "vApproval_Status_ID." Initially, the data (not shown) within the "vApproval_Status_ID" field 220 is set by the computer system to "approval waiting" while the computer system verifies the location information entered by the vendor. Once the location information has been verified, the data within the "vApproval_Status_ID" field 220 is changed to "approved." However, if the location information is incorrect or not able to be verified, the data within the "vApproval_Status_ID" field 220 is set to "declined" and the vendor is notified (e.g., via e-mail) that the vendor is not able to be qualified by any buyer and/or industry due to unverifiable location information. The computer system enables the vendor to correct the location information stored in the vendor record 230 or to provide verification of the location information to the operator of the computer system (e.g., by e-mailing or mailing the verification information to an employee of the company operating the computer system).

Figure 6:
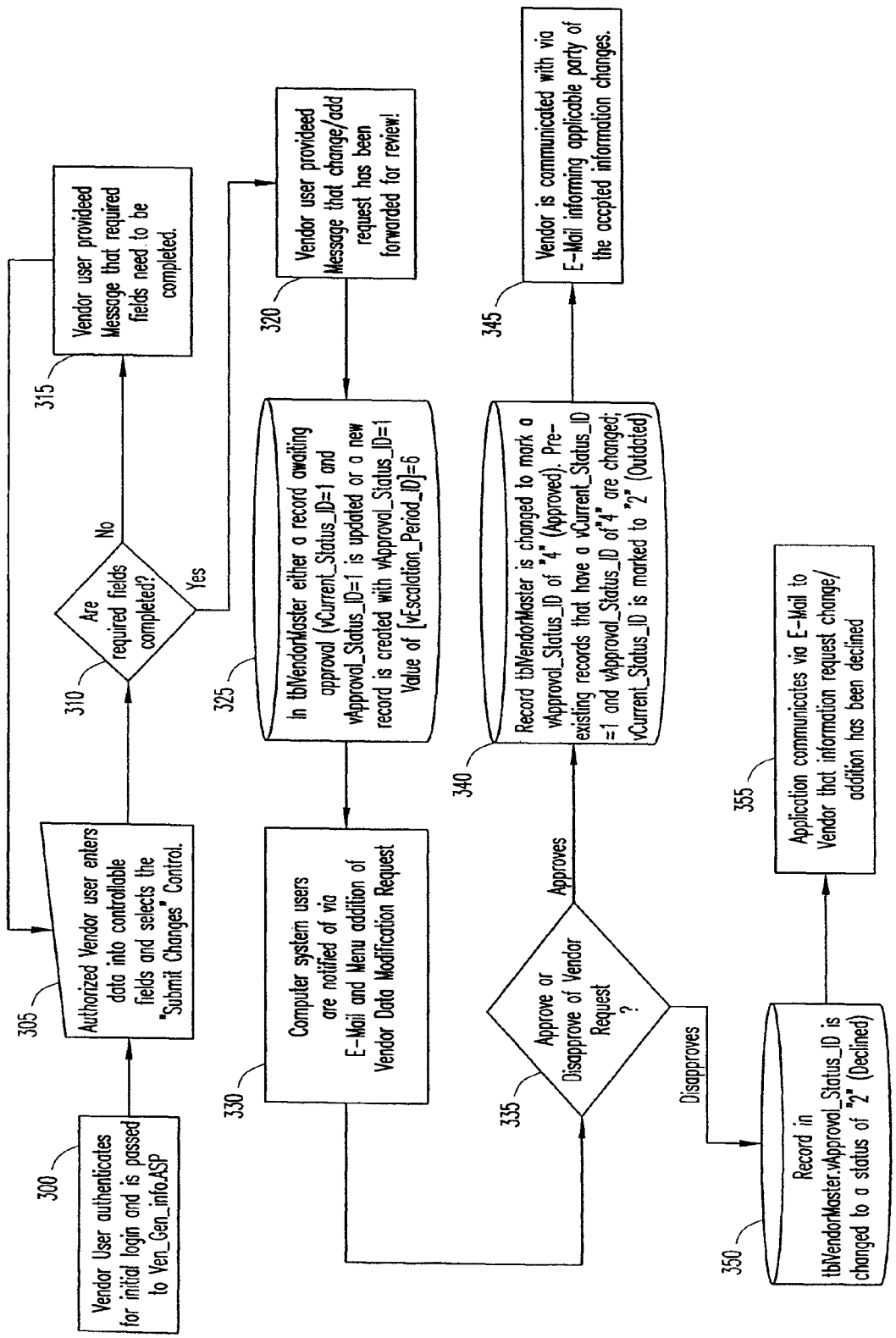
FIG. 6 is a flowchart illustrating exemplary steps for entering and confirming vendor qualification information, in accordance with embodiments of the present invention.

FIG. 6 is a flowchart illustrating exemplary steps for entering and confirming vendor qualification information, in accordance with embodiments of the present invention. Initially, a vendor user accesses the computer system and logs-in using, for example, a user name and password, to authenticate the vendor user to the computer system (step 300). The user name and/or password can be unique to each user at a particular vendor (e.g., to enable vendors to control the types of information that a particular user can modify or add), or one user name and password can be associated with all users at a particular vendor. Once the vendor user has been authenticated, the vendor user can enter vendor qualification information into the computer system (step 305), as described above. For example, the vendor user can be prompted to enter vendor qualification information in the hierarchical and relational manner described above by pushing web pages populated with vendor fields and vendor selection data to the vendor user and storing received vendor qualification information into fields within a vendor record associated with the vendor. Alternatively, if the vendor user is updating existing vendor qualification information, the vendor user can be prompted to indicate the type of information the vendor user would like to update, and in response, the computer system can push web pages to the vendor user having vendor selection data associated with only the vendor qualification information that the vendor user would like to update.

There are certain vendor fields that the computer system may require all vendors to fill out, such as the vendor name, and depending upon the type of good and/or service the vendor provides, there may be certain vendor fields that the computer system requires vendors providing that good and/or service to fill out, such as insurance information for particular services. If the vendor user does not fill out one or more of the required fields (step 310), the computer system prompts the vendor user to fill out those required fields (step 315). Once all of the required fields are complete (step 310), the computer system provides the vendor user with a message indicating that the vendor qualification information (new or changed) has been received and forwarded to the computer system for review (step 320).

All of the entered vendor qualification information is stored in a vendor record for the vendor in a database, and all "approval" fields associated with particular entered vendor qualification information are automatically set to "approval waiting" (step 325). Operators of the computer system are notified of the "approval waiting" status for particular vendor qualification information, and attempt to verify the entered vendor qualification information (step 330). For example, if the vendor user entered vendor qualification information indicating that the vendor provides tax solutions in a specific geographical area, the computer system operator could be prompted to verify that the vendor employs staff capable of providing tax solutions in that particular geographical area.

As another example, if the vendor user entered certification or insurance information, the computer system operator could be prompted to verify that the vendor is certified or has the insurance that the vendor user entered by requesting hard copies of documentation or other type of verifiable proof that the vendor is actually certified or has the insurance that the vendor user entered.

If the entered vendor qualification information is verified (step 335), the "approval" field in the vendor record is changed to "approved" (step 340). If the entered vendor qualification information is updated vendor qualification information intended by the vendor to replace previously entered vendor qualification information, the "current status" field of any previously stored vendor qualification information in the vendor record is set to "outdated" to indicate that there is new vendor qualification information that replaces the previously entered vendor qualification information. In other embodiments, the new vendor qualification information can simply replace the previously entered vendor qualification information, thereby effectively deleting the previously entered vendor qualification information from the database. Thereafter, the vendor user is notified via e-mail or via a dashboard accessible to the vendor user via the vendor browser that the updated or newly entered vendor qualification information has been approved by the computer system (step 345). It should be understood that if the vendor user entered vendor qualification information that did not require approval of the computer system, the vendor user would simply be notified via e-mail or dashboard display that the updated or newly entered vendor qualification information was received and recorded.

However, if the entered vendor qualification information cannot be verified (step 335), the operator changes the "approval" field in the vendor record to "declined" (e.g., via the input device shown in FIG. 3) (step 350), and the vendor user is notified via e-mail or via a dashboard that the vendor qualification information was not able to be verified (step 355).

Figure 7:
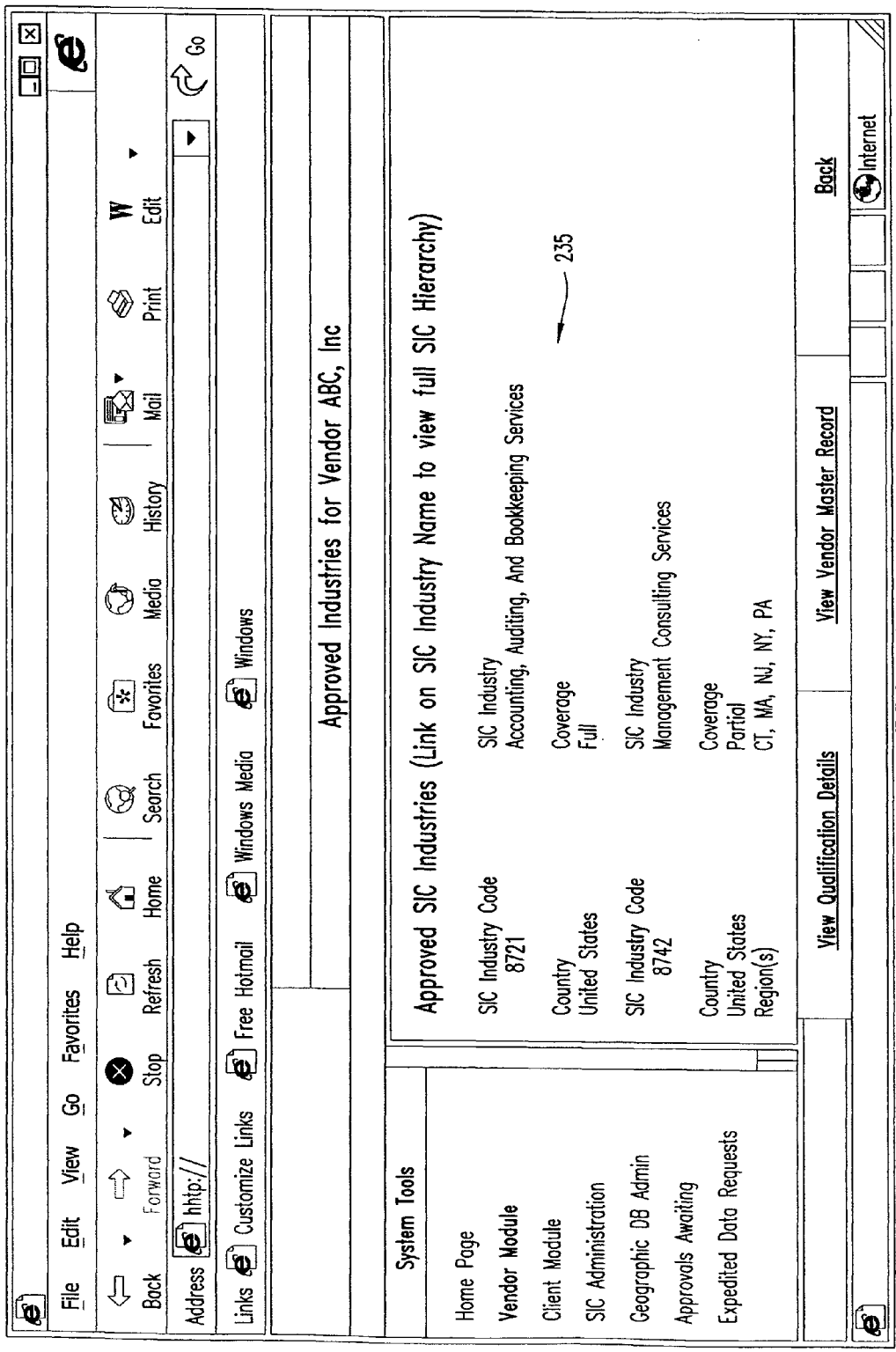
FIG. 7 is a screen shot of an exemplary web page illustrating sample approved vendor qualification information.

FIG. 7 is a screen shot of an exemplary web page that could be displayed on a dashboard to an administrative user to provide vendor approval information. (A similar view could be displayed to vendor users). As can be seen in FIG. 7, the user can be provided summary information concerning each SIC industry and associated geographical area that a particular vendor is approved for. From this web page, the user can view more detailed information and modify existing information. Although not shown, the dashboard can further provide summary information for each SIC industry and associated geographical area that the vendor is not approved for, or that has approval waiting.

Examples of the type of buyer-defined vendor criteria information 255 stored in a buyer record 250 are illustrated hereinbelow in Tables 12-15. The buyer-defined vendor criteria information 255 can be stored in the same hierarchical manner as the vendor qualification information 235, mirroring the buyer fields 240 stored in the database 150.

TABLE 12 tblBuyerMaster

| Column Name | Data Type | Length | Vendor Criteria Information |
|---|---|---|---|
| Buyer_ID | int | 4 | XXX |
| bCompany_Name | nvarchar | 100 | ABC |
| bParent_Company_Name | nvarchar | 100 | |
| bCountry_ID | int | 4 | 1 |

TABLE 12-continued tblBuyerMaster

| Column Name | Data Type | Length | Vendor Criteria Information |
|---|---|---|---|
| bYear_Corp | int | 4 | 10 |
| bBusiness_Entity_Type_ID | int | 4 | 1 |
| bDiversified_Business_Entity | char | 10 | Y |
| bDBE_Type_ID | int | 50 | 1, 2, 3, 4, 7, 8, 9 |
| bDBE_Certificate_Number | varchar | 50 | C57Z |
| bDBE_Certifying_Body | varchar | 50 | XYZ |
| bDBE_Certifying_State_ID | int | 4 | 3 |
| bFederal_Tax_ID | nvarchar | 50 | 2F22 |
| bFull_Time_Employee_Count | numeric | 9 | 500 |
| bW_2_Employee_Count | numeric | 9 | 1,000 |
| bNet_Worth | money | 8 | 1,000,000 |
| bPrior_Year_Revenue | money | 8 | 2,000,000 |
| bPrior_Year_Profit | money | 8 | 750,000 |
| bPrior_Year_Tax_Filing | char | 1 | Y |
| bPrior_Year_Audited_Statement | char | 1 | Y |
| bPrevious_Bankruptcy | char | 1 | N |
| bEDI_Capability | char | 1 | Y |
| bEFT_Capability | char | 1 | Y |
| bDun_Bradstreet_ID | nvarchar | 50 | |
| bDun_Bradstreet_Rating | nvarchar | 50 | |
| bCorporate_Location_Phone | varchar | 50 | 214-555-1214 |
| bCorporate_Location_Fax | varchar | 50 | 214-555-1215 |
| bCorporate_Location_Email | varchar | 50 | buyer@buyercompany.com |
| bCurrent_Status_ID | int | 4 | 1 |
| bInformation_Profile_Complete | char | 1 | Y |
| bCreate_Date | datetime | 8 | dd/mm/yyyy |

TABLE 13 tblBuyerInsurance

| Column Name | Data Type | Length |
|---|---|---|
| Buyer_ID | int | 4 |
| SIC_Code_ID | int | 4 |
| Country_ID | int | 4 |
| Region_ID | int | 4 |
| City_ID | int | 4 |
| Insurance_Type_ID | int | 4 |
| Insurance_Coverage_Type | int | 4 |
| Coverage_Amount | money | 8 |
| Currency_ID | int | 4 |
| Create_Date | datetime | 8 |
| Record_ID | int | 4 |

TABLE 14 tblBuyerCertification

| Column Name | Data Type | Length |
|---|---|---|
| Buyer_ID | int | 4 |
| SIC_Code_ID | int | 4 |
| Country_ID | int | 4 |
| Region_ID | int | 4 |
| City_ID | int | 4 |
| Certification_Type_ID | int | 4 |
| Create_Date | datetime | 8 |
| Record_ID | int | 4 |

TABLE 15 tblBuyerMiscQualifiers

| Column Name | Data Type | Length |
|---|---|---|
| Buyer_ID | int | 4 |
| SIC_Code_ID | int | 4 |
| Vendor_Country_ID | int | 4 |
| Vendor_Region_ID | int | 4 |
| Vendor_City_ID | int | 4 |
| Contracted | char | 1 |
| Preferred_Union | varchar | 255 |
| Previous_Business_Relationship | char | 1 |
| Vendor_Net_Worth | money | 8 |
| Vendor_Prior_Year_Revenue | money | 8 |
| Vendor_Prior_Year_Profit | money | 8 |
| Vendor_Prior_Year_Tax_Filing | char | 1 |
| Vendor_Prior_Year_Audit | char | 1 |
| Vendor_Previous_Bankruptcy | char | 1 |
| Vendor_Year_Corp | int | 4 |
| Vendor_Business_Entity_Type_ID | int | 4 |
| Vendor_Diversified_Business_Entity | char | 10 |
| Vendor_DBE_Type_ID | int | 50 |
| Vendor_FTE_Count | numeric | 9 |
| Vendor_W_2_Employee_Count | numeric | 9 |
| Vendor_EDI_Capability | char | 1 |
| Vendor_EFT_Capability | char | 1 |
| Vendor_Dun_Bradstreet_Rating | nvarchar | 50 |
| Create_Date | datetime | 8 |
| Record_ID | int | 4 |

Table 12 shows a "Buyer Master" table that contains a number of buyer fields 240 and associated data entries 255 that provide basic buyer identification information, such as the buyer ID within the computer system, the company name, the company phone number and other basic identification information. Each buyer field 240 within the "Buyer Master" table is capable of supporting different data types (e.g., int, nvarchar, char, varchar, bit and datetime) of different data lengths. As shown in Tables 13-15 above, the buyer record 250 can further include one or more tables under the "Buyer Master" table that include data (not shown) indicating additional buyer-defined vendor criteria information 255. For example, Table 13 illustrates insurance information, Table 14 illustrates certification information and Table 15 illustrates miscellaneous buyer-defined vendor criteria information 255.

Figure 8:
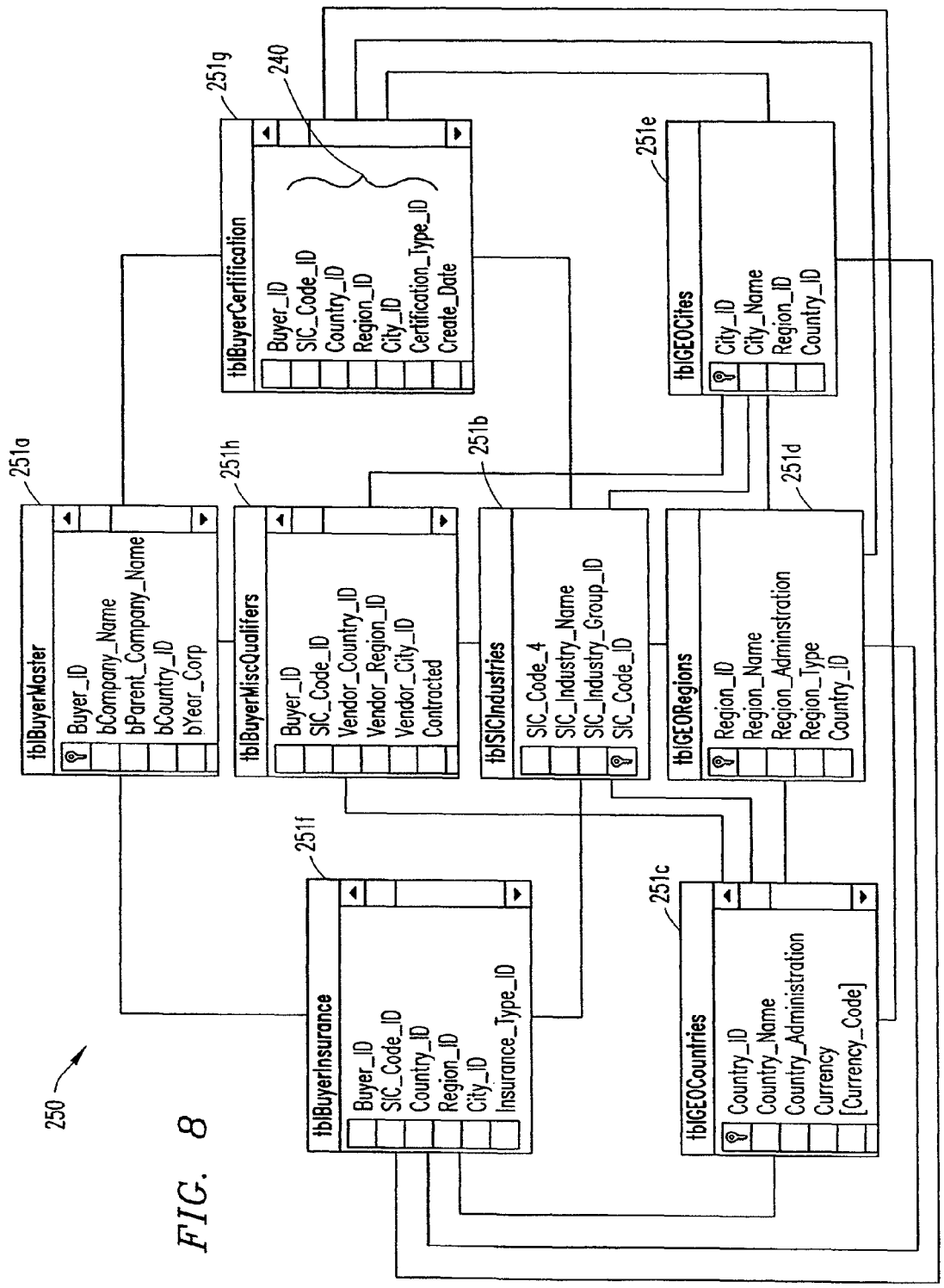
FIG. 8 is a database table view illustrating the storage of vendor criteria information in the buyer records.

FIG. 8 is a database table view illustrating the storage of vendor criteria information in the buyer records 250. The "Buyer Master" table 251a, shown in Table 12 above, stores all of the general buyer profile information. The "Buyer Master" table 251a is tied to an SIC Industries table 251b that contains industry-specific buyer profile information to identify the specific industries that the buyer has a need for vendors in. The geographical area(s) associated with the selected industries can be defined using a "GEO Countries" table 251c to identify the country where the buyer has a need for a certain good and/or service. The geographical area(s) can be further defined using a "GEO Regions" table 251d and a "GEO Cities" table 251e (if a buyer only has a need in one or more regions and/or cities of a particular country). It should be understood that the geographical area(s) associated with a particular industry can be stored in SIC geographical tables, as shown in FIGS. 5A and 5B, but for simplicity, only the GEO geographical tables are shown in FIG. 8. It should further be understood that additional tables can be included to more concisely define the locations where the buyer has a need for goods and/or services, such as a "Zip Code" table (not shown), depending upon the needs of the buyer. Other qualifier tables, such as the insurance information table 251f, certification information table 251g and miscellaneous information table 251h, can be tied to the "Buyer Master" table 251a, "SIC Industries" table 251b and geographical tables 251c-e to further define the buyer requirements for vendors.

Figure 9:
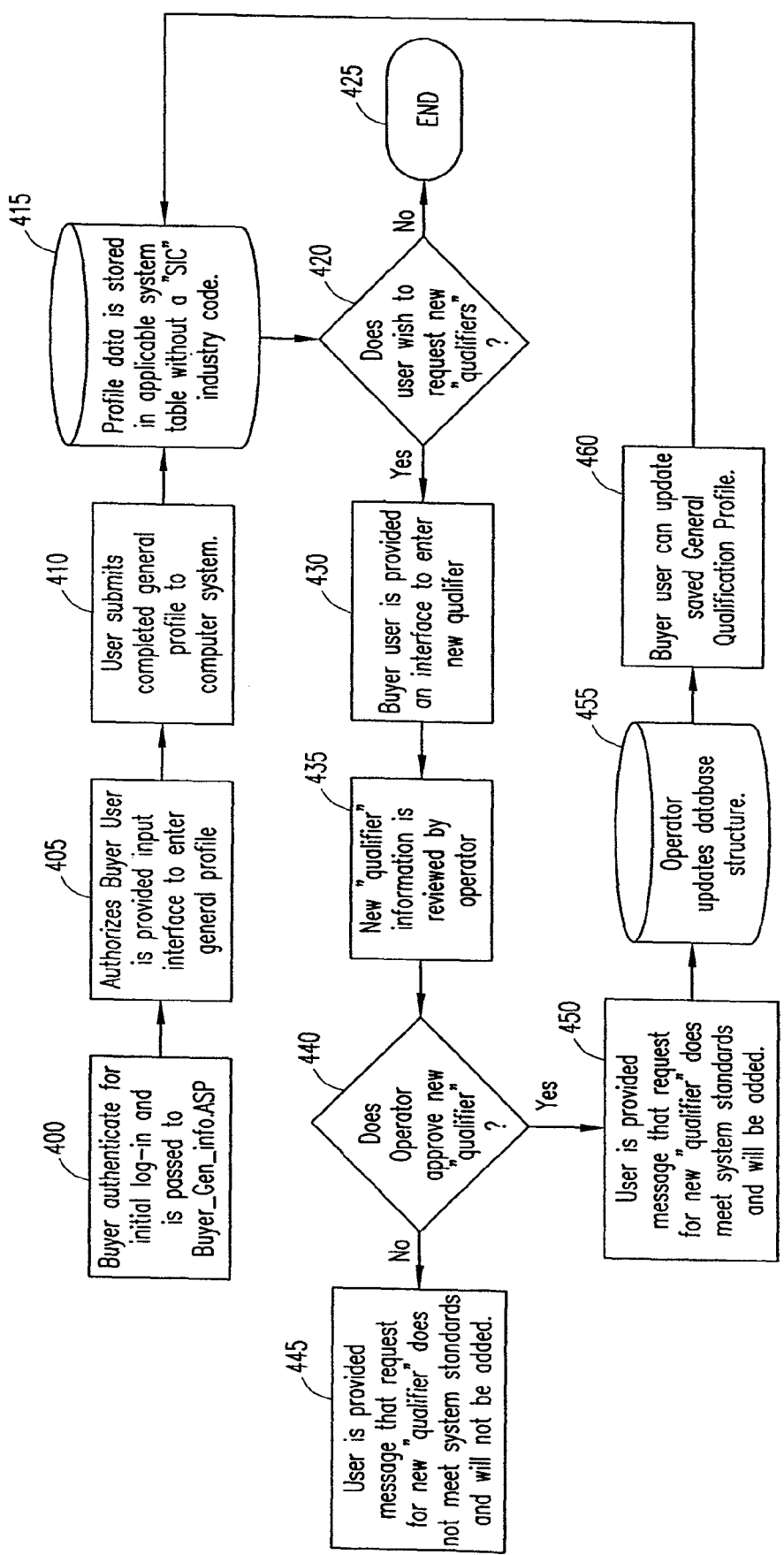
FIG. 9 is a flowchart illustrating exemplary steps for entering and configuring general buyer-defined vendor criteria information, in accordance with embodiments of the present invention.

FIG. 9 is a flowchart illustrating exemplary steps for entering and configuring general buyer-defined vendor criteria information, in accordance with embodiments of the present invention. General buyer-defined vendor criteria information is any data unrelated to a specific industry. For example, general buyer-defined vendor criteria information can include the type of data stored in the "Buyer Master" table, insurance information unrelated to a specific industry or any other miscellaneous information unrelated to a specific industry. General buyer-defined vendor criteria information will be referred to hereinafter as general profile information.

Initially, a buyer user accesses the computer system and logs-in using, for example, a user name and password, to authenticate the buyer user to the computer system (step 400). The user name and/or password can be unique to each user at a particular buyer (e.g., to enable buyers to control the types of information that a particular user can modify or add), or one user name and password can be associated with all users at a particular buyer. Once the buyer user has been authenticated, the buyer user is provided an input user interface to enter general profile information into the computer system (step 405), as described above. For example, the buyer user can be prompted to enter the general profile information in the hierarchical and relational manner described above by pushing web pages populated with buyer fields and buyer selection data to the buyer user. Alternatively, if the buyer user is updating existing general profile information, the buyer user can be prompted to indicate the type of information the buyer user would like to update, and in response, the computer system can push web pages to the buyer user having buyer selection data associated with only the general profile information that the buyer user would like to update.

Once the buyer user has completed entering the general profile information (step 410), the computer system stores the received general profile information in fields within a buyer record associated with the buyer (step 415). It should be understood that there may be certain general buyer fields that the computer system may require all buyers to fill out, such as the buyer name and phone number. In addition, if the entered general profile information is updated general profile information intended by the buyer to replace previously entered general profile information, the "current status" field of any previously stored general profile information in the buyer record is set to "outdated" to indicate that there is new general profile information that replaces the previously entered general profile information. In other embodiments, the new general profile information can simply replace the previously entered general profile information, thereby effectively deleting the previously entered general profile information from the database.

If the entered general profile information is sufficient to meet all of the buyer's requirements (step 420), the process ends (step 425). However, if the buyer user requires additional vendor qualifications that the computer system does not provide, the buyer user can further submit a request for a new qualifier (e.g., a request for a new buyer fields and/or buyer selection data within a buyer field) to the computer system (step 420). Thereafter, the buyer user is provided an input user interface to allow the buyer user to enter the new qualifier(s) into the computer system (step 430). For example, the buyer user can select one or more existing buyer fields related to the desired new qualifier(s) and enter the new qualifier(s) under that buyer field, or, if no existing buyer fields are related to the new qualifier, the buyer user can be provided a blank form to fill out the buyer field(s) and buyer selection data desired within the buyer field(s).

The new general qualifier information entered by the buyer user is submitted to the computer system for review (step 435). One or more operators of the computer system are notified of the new qualifier(s) for a particular buyer user, and after reviewing the new qualifier information, the computer system operator determines whether or not the new qualifier information is approved as a new buyer field and/or buyer selection data in the computer system (step 440). If the new general qualifier information is not approved, the buyer user is notified via e-mail or via a dashboard accessible to the buyer user via the buyer browser that the new qualifier information does not meet the computer system standards and will not be added (step 445). However, if the new general qualifier information is approved, the buyer user is notified via e-mail or via the dashboard that the new qualifier information has been approved by the computer system (step 450).

Once the new qualifier information has been approved, the computer system updates the database to include new buyer fields and/or buyer selection data within the buyer fields with the new general qualifier information (step 455). Thereafter, the buyer user can access the computer system to enter updated general profile information using the newly added buyer fields and/or buyer selection data (step 460). The updated general profile information is further stored in the buyer record associated with the buyer user (step 465). It should be understood that, although not discussed above, if the vendor foresees additional vendor qualifications that the computer system does not provide, the vendor can create a new vendor field and/or vendor selection data (with approval from the network operator), which can be mirrored in the buyer and/or industry fields to allow a vendor to stay current with (or improve upon) industry qualifications. It should also be understood that, although not shown in FIG. 9, the general profile information entered by the buyer user may require approval by the network operator to ensure that all buyers are submitting correct information.

FIGS. 10A and 10B are screen shots of exemplary web pages 125 illustrating a sample user interface for configuring general profile information. FIG. 10A shows an example of various general buyer fields 240 that can be displayed to a buyer user. For example, the buyer fields 240 can include geographical fields, such as a country field, a region field and a city field. The buyer user can select the particular country, region and city by clicking on links to country selection data, region selection data and city selection data. The user interface provided by the buyer module can further display additional general buyer fields and provide additional buyer selection data to the buyer user, depending upon the requirements of the buyer. For example, the buyer user can select various business requirements and insurance requirements that are general to the buyer. In addition, the buyer user can be provided a link to enter new general qualifier(s) into the computer system, as discussed above in connection with FIG. 9. It should be noted that buyers have the capability of creating multiple "General Qualification Profiles" based upon business needs and business locations.

FIG. 10B shows an example of general profile information 255 entered by a buyer user using the user interface shown in FIG. 10A. The general profile information 255 can be displayed to the buyer user as the buyer user is entering the general profile information, and can also be accessed by the buyer user at a later time on a dashboard accessible to a buyer user upon authentication and log-on to view and/or edit the general profile information.

Figure 11:
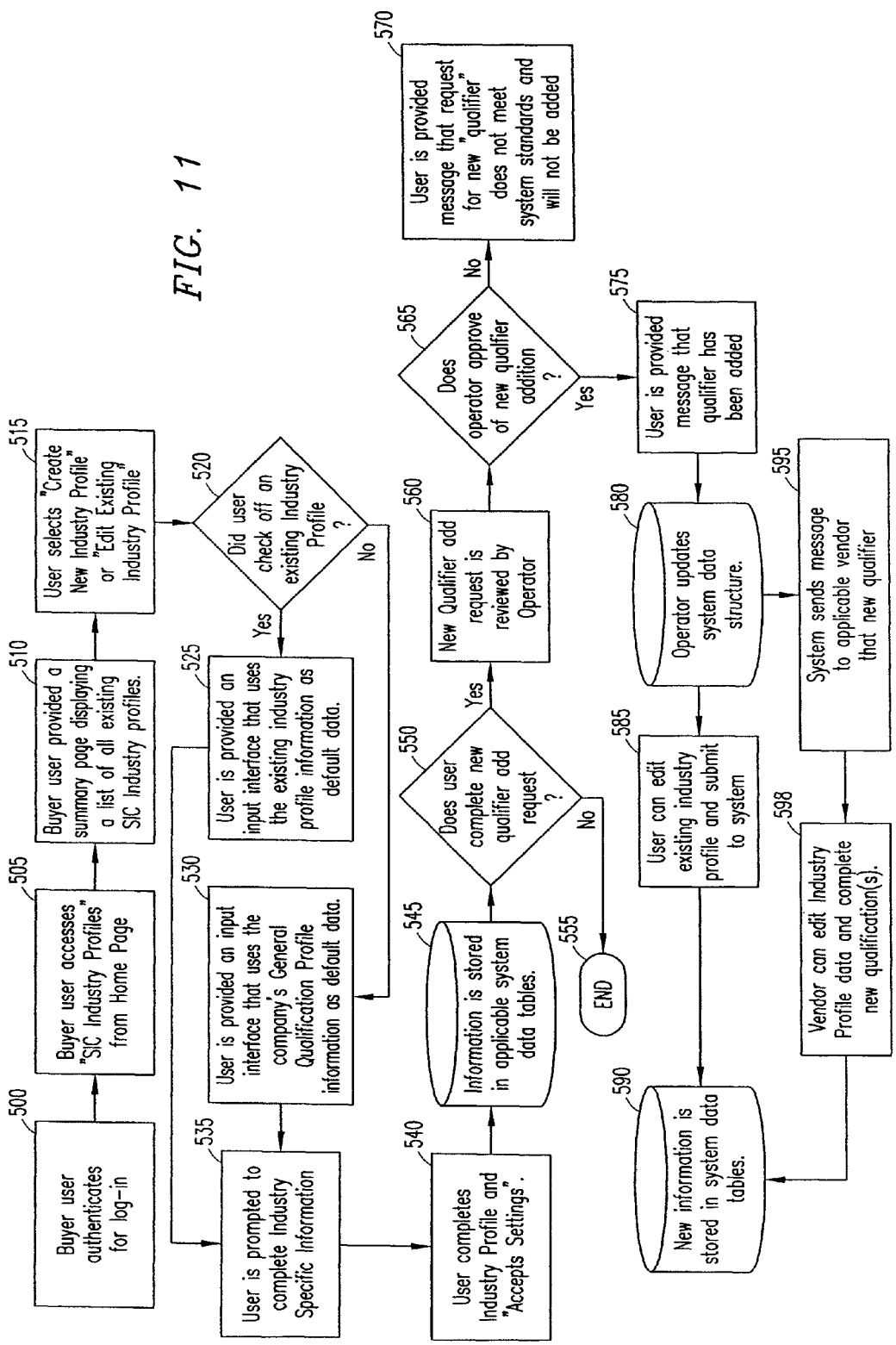
FIG. 11 is a flowchart illustrating exemplary steps for entering and configuring industry-specific buyer-defined vendor criteria information, in accordance with embodiments of the present invention.

FIG. 11 is a flowchart illustrating exemplary steps for entering and configuring industry-specific buyer-defined vendor criteria information, in accordance with embodiments of the present invention. Industry-specific buyer-defined vendor criteria information is any data that is related to a specific industry that the buyer has a need for vendors in. For example, industry-specific buyer-defined vendor criteria information can include the industry information stored in an "Industry" table, insurance information related to a specific industry, certification information related to a specific industry, geographical information related to a specific industry or any other miscellaneous information related to a specific industry. Industry-specific buyer-defined vendor criteria information is hereinafter referred to as industry profile information.

Initially, a buyer user accesses the computer system and logs-in using, for example, a user name and password, to authenticate the buyer user to the computer system (step 500), as discussed above in connection with FIG. 9. Once the buyer user has been authenticated, the buyer user can access an "Industry Profile" link from the home page to enter the industry profile information (step 505). Alternatively, once the buyer user has entered the general profile information, the buyer user can link directly to an "Industry Profile" web page to enter the industry profile information. Each industry that the buyer user has entered criteria for is stored as a separate industry profile within the buyer record to distinguish the criteria applicable to each industry (e.g., the industry table can include several records, each being associated with separate insurance table records, certification table records, miscellaneous table records and geographical table records). All previously entered industry profiles associated with the buyer can be displayed to the buyer (step 510) to allow the buyer to either create a new industry profile or edit an existing industry profile (step 515).

If the buyer user selects to edit an existing industry profile (step 520), the buyer user is provided an input user interface that contains the existing (previously entered and stored) industry profile information as default data (step 525). However, if the buyer user selects to create a new industry profile, the buyer user is provided an input user interface that contains industry-specific buyer fields to select from and general profile information entered in accordance with FIG. 9 above as default data (step 530). In some embodiments, the buyer user may be able to modify the general profile information as it relates to a specific industry. In other embodiments, the buyer user may be prevented from modifying some or all of the general profile information for one or more industries. For example, the buyer user may be prevented from modifying geographical information, insurance information, general business qualification information and other miscellaneous information, depending upon the buyer's business rules/requirements.

Thereafter, the buyer user is prompted to either edit or enter for the first time the industry profile information into the computer system (step 535), as described above. For example, the buyer user can be prompted to enter industry profile information in the hierarchical and relational manner described above by pushing web pages populated with buyer fields and buyer selection data to the buyer user. Alternatively, if the buyer is updating existing industry profile information, the buyer can be prompted to indicate the type of information the buyer would like to update, and in response, the computer system can push web pages to the buyer user having buyer selection data associated with only the industry profile information that the buyer would like to update.

Once the buyer user has completed entering the industry profile information (step 540), the computer system stores the received industry profile information in fields within a buyer record associated with the buyer (step 545). It should be understood that there may be certain industry-specific buyer fields that the computer system may require all buyers to fill out, such as insurance information for particular services. In addition, if the entered industry profile information is updated industry profile information intended by the buyer to replace previously entered industry profile information, the "current status" field of any previously stored industry profile information in the buyer record is set to "outdated" to indicate that there is new industry profile information that replaces the previously entered industry profile information. In other embodiments, the new industry profile information can simply replace the previously entered industry profile information, thereby effectively deleting the previously entered industry profile information from the database.

If the entered industry profile information is sufficient to meet all of the buyer's requirements (step 550), the process ends (step 555). However, if the buyer user requires additional industry-specific qualifications that the computer system does not provide, the buyer user can further submit a request for a new industry-specific qualifier (e.g., a request for a new buyer fields and/or buyer selection data within a buyer field) to the computer system, which is reviewed by an operator of the computer system (step 560), in a similar manner as described above in connection with FIG. 9. If the new industry-specific qualifier information is not approved (step 565), the buyer user is notified via e-mail or via a dashboard accessible to the buyer user via the buyer browser that the new industry-specific qualifier information does not meet the computer system standards and will not be added (step 570). However, if the new industry-specific qualifier information is approved, the buyer user is notified via e-mail or via the dashboard that the new industry-specific qualifier information has been approved by the computer system (step 575).

Once the new industry-specific qualifier information has been approved, the computer system updates the database to include new buyer fields and/or buyer selection data within the buyer fields with the new industry-specific qualifier information (step 580). Thereafter, the buyer user can access the computer system to enter updated industry profile information using the newly added buyer fields and/or buyer selection data (step 585). The updated industry profile information is further stored in the buyer record associated with the buyer user (step 590). It should also be understood that, although not shown in FIG. 11, the industry profile information entered by the buyer user may require approval by the network operator to ensure that all buyers are submitting correct information.

In addition, the computer system can further update the database to include new vendor fields and/or vendor selection data within the vendor fields with the new industry-specific qualifier information and notify all applicable vendors of the newly added vendor field and/or vendor selection data (step 595). For example, the computer system can notify all vendors that were previously qualified for the buyer, all vendors within the specific industry or all vendors having a vendor record stored within the database. Thereafter, a vendor user can access the computer system to enter updated vendor qualification information using the newly added vendor fields and/or vendor selection data (step 598). The updated vendor qualification information is further stored in the vendor record associated with the vendor user (step 590).

Figure 12A:

FIGS. 12A and 12B are screen shots of exemplary web pages 125 illustrating a sample user interface for configuring industry profile information. FIG. 12A shows an example of various industry-specific buyer fields 240 that can be displayed to a buyer user. For example, the buyer fields 240 can include industry-defining fields, such as an SIC Division field, an SIC Major Group field, an SIC Industry Group field and an SIC Industry field. The buyer user can select the particular SIC Division, Major Group, Industry Group and Industry by clicking on links to SIC Division selection data, SIC Major Group selection data, SIC Industry Group selection data and SIC Industry selection data. In addition, the buyer fields 240 can further include geographical fields, insurance fields, certification fields, miscellaneous fields and a profile name field (to differentiate the various industries that the buyer has qualifications for). Furthermore, the buyer user can be provided a link to enter new general qualifier(s) into the computer system, as discussed above in connection with FIG. 11.

As discussed above, some of the buyer fields 240 displayed are also general buyer fields that the buyer may have previously filled out with general profile information. If general profile information has been entered and stored for any of the buyer fields displayed, that general profile information is listed as default information. The buyer user may or may not be able to modify the general profile information, depending upon the settings of the buyer. For example, as seen in FIG. 12A, the geographical preferences and insurance requirements include several buyer fields that have previously been filled out during the general profile information entering process. One or more of these fields may not be modifiable by the buyer user for the specific industry.

FIG. 12B shows an example of industry profile information 255 entered by a buyer user using the user interface shown in FIG. 12A. The industry profile information 255 includes the general profile information not modified by the buyer user (e.g., geographic preferences, business requirements and insurance requirements) and the newly entered industry-specific information entered by the buyer user (e.g., certification requirements and miscellaneous qualifiers). The industry profile information 255 can be displayed to the buyer user as the buyer user is entering the general profile information, and can also be accessed by the buyer user at a later time on a dashboard accessible to a buyer user upon authentication and log-on to view and/or edit the general profile information.

Vendors are qualified for buyers based upon the general profile information and the industry profile information. Each industry profile is qualified separately (for both the vendor and the buyer), and therefore, each industry profile has a separate vendor list of qualified vendors associated therewith. Therefore, when viewing the industry profile information 255 for a specific industry profile after the industry profile information 255 has been entered and stored, the buyer user may be provided the option of viewing the qualified vendor list for this specific industry profile. In addition, the buyer user may also be provided the option of viewing standard industry qualifications retrieved from an industry record for the specific industry profile as a benchmarking tool.

Examples of the type of industry-related vendor criteria information 265 stored in an industry record 260 are illustrated hereinbelow in Tables 16-19. The industry-related vendor criteria information 265 can be stored in the same hierarchical manner as the buyer-defined vendor criteria information 255, mirroring the industry fields 270 stored in the database 150.

TABLE 16 tblIndustryMaster

| Column Name | Data Type | Length | Vendor Criteria Information |
|---|---|---|---|
| Industry_Profile_Name | nvarchar | 100 | Furniture in NY |
| Industry_ID | int | 4 | 20 |
| SIC_Code_ID | int | 4 | 5021 |
| Country_ID | int | 4 | 1 |
| Recom_Year_Corp_Low | int | 4 | 10 |
| Recom_Year_Corp_High | int | 4 | 50 |
| Recom_FTE_Count_Low | numeric | 9 | 500 |
| Recom_FTE_Count_High | numeric | 9 | 2,000 |
| Req_Verified_Tax_Filing | char | 1 | Y |
| Req_Audited_Statement | char | 1 | Y |
| Req_EDI_Capability | char | 1 | N |
| Req_EFT_Capability | char | 1 | N |
| Req_D&B_Listed | char | 1 | Y |
| Req_JDPower_Listed | char | 1 | Y |
| Recom_Sales_Low | money | 10 | $    500,000 |
| Recom_Sales_High | money | 10 | $10,000,000 |
| Recom_Profit_Low | money | 10 | $    200,000 |
| Recom_Profit_High | money | 10 | $ 7,500,000 |
| Recom_NetWorth_High | money | 10 | $ 1,000,000 |
| Recom_NetWorth_Low | money | 10 | $ 5,000,000 |
| Create_Date | datetime | 8 | dd/mm/yyyy |
| Edit_Date | datetime | 8 | dd/mm/yyyy |
| Expiration_Date | datetime | 8 | dd/mm/yyyy |
| MSP_User_ID | int | 4 | 10 |
| Source_ID | int | 4 | 2 |
| Source_Name | nvarchar | 100 | Wall Street Journal |
| Current_Status_ID | int | 4 | 1 |

TABLE 17 tblIndustryInsurance

| Column Name | Data Type | Length |
|---|---|---|
| Industry_ID | int | 4 |
| SIC_Code_ID | int | 4 |
| Country_ID | int | 4 |
| Region_ID | int | 4 |
| City_ID | int | 4 |
| Insurance_Type_ID | int | 4 |
| Insurance_Coverage_Type | int | 4 |
| Coverage_Amount_High | money | 10 |
| Coverage_Amount_Low | money | 10 |
| Coverage_Amount_Average | money | 10 |
| Coverage_Amount_Median | money | 10 |
| Coverage_Amount_StandardDeviation | money | 10 |
| Total_Record_Number | int | 10 |
| Total_VendorRecord_Number | int | 10 |
| Total_BuyerRecord_Number | int | 10 |

TABLE 17-continued tblIndustryInsurance

| Column Name | Data Type | Length |
| --- | --- | --- |
| StandardDeviation_Vendor_Number | int | 10 |
| StandardDeviation_Buyer_Number | int | 10 |
| Coverage_Recommended_ID | int | 4 |
| Coverage_Amount_Recommended_High | money | 10 |
| Coverage_Amount_Recommended_Low | money | 10 |

TABLE 18 tblIndustryCertification

| Column Name | Data Type | Length |
| --- | --- | --- |
| Industry_ID | int | 4 |
| SIC_Code_ID | int | 4 |
| Country_ID | int | 4 |
| Region_ID | int | 4 |
| City_ID | int | 4 |
| Certification_Type_ID | int | 4 |
| Certification_Recommended_ID | int | 4 |
| Total_Record_Number | int | 10 |
| Total_Certified_Record_Number | int | 10 |
| Total_Certified_Record_Percentage | percentage | 10 |
| Vendor_Record_Number | int | 10 |
| Vendor_Certified_Record_Number | int | 10 |
| Vendor_Certified_Record_Percentage | percentage | 10 |
| Buyer_Record_Number | int | 10 |
| Buyer_Certified_Record_Number | int | 10 |
| Buyer_Certified_Record_Percentage | percentage | 10 |

TABLE 19 tblIndustryMiscQualifiers

| Column Name | Data Type | Length |
| --- | --- | --- |
| Industry_ID | int | 4 |
| SIC_Code_ID | int | 4 |
| Country_ID | int | 4 |
| Region_ID | int | 4 |
| City_ID | int | 4 |
| Recom_UnionShop | char | 1 |
| Req_Service_Warranty | char | 1 |
| Req_Goods_Warranty | char | 1 |
| Previous_Business_Relationship | char | 1 |
| Net_Worth | money | 8 |
| Total_Record_Number | int | 10 |
| Total_Buyer_Record_Number | int | 10 |
| Total_Vendor_Record_Number | int | 10 |

Table 16 above shows an "Industry Master" table that contains a number of industry fields 270 and associated data entries 275 that provide general industry information, such as the industry profile name, the industry ID within the computer system, the SIC Industry Code associated with the industry profile name and various recommended and required general industry information, as entered into the industry record 260 from an industry source user or as collected from buyer records and/or vendor records stored in the database 150. The source of the industry-related vendor criteria information 265 can also be stored in the "Industry Master" table to indicate all of the sources of the information. For example, an expert in the industry can provide some or all of the information, while statistical data collected from analyzing vendor records and/or buyer records can provide other information.

As shown in Tables 17-19 above, the industry record 260 can further include one or more tables under the "Industry Master" table that include data (not shown) indicating additional industry-related vendor criteria information 265. For example, Table 17 illustrates insurance information, Table 18 illustrates certification information and Table 19 illustrates miscellaneous industry-related vendor criteria information 265. For example, the industry insurance requirements can include an indication of whether or not a particular type of insurance is recommended or required, an indication of the minimum coverage amounts of insurance for each insurance type that are typically required in the industry, ranges of insurance typically required in the industry, average coverage amounts typically required in the industry, the standard deviations from the average coverage amounts and any other data related to insurance requirements. The industry insurance requirements can be entered by an industry source user and/or collected from vendor records and/or buyer records. If the latter, the industry insurance table can further indicate the total number of vendor and/or buyer records used in the calculation and the number of vendor and/or buyer records within the standard deviation.

Figure 13:
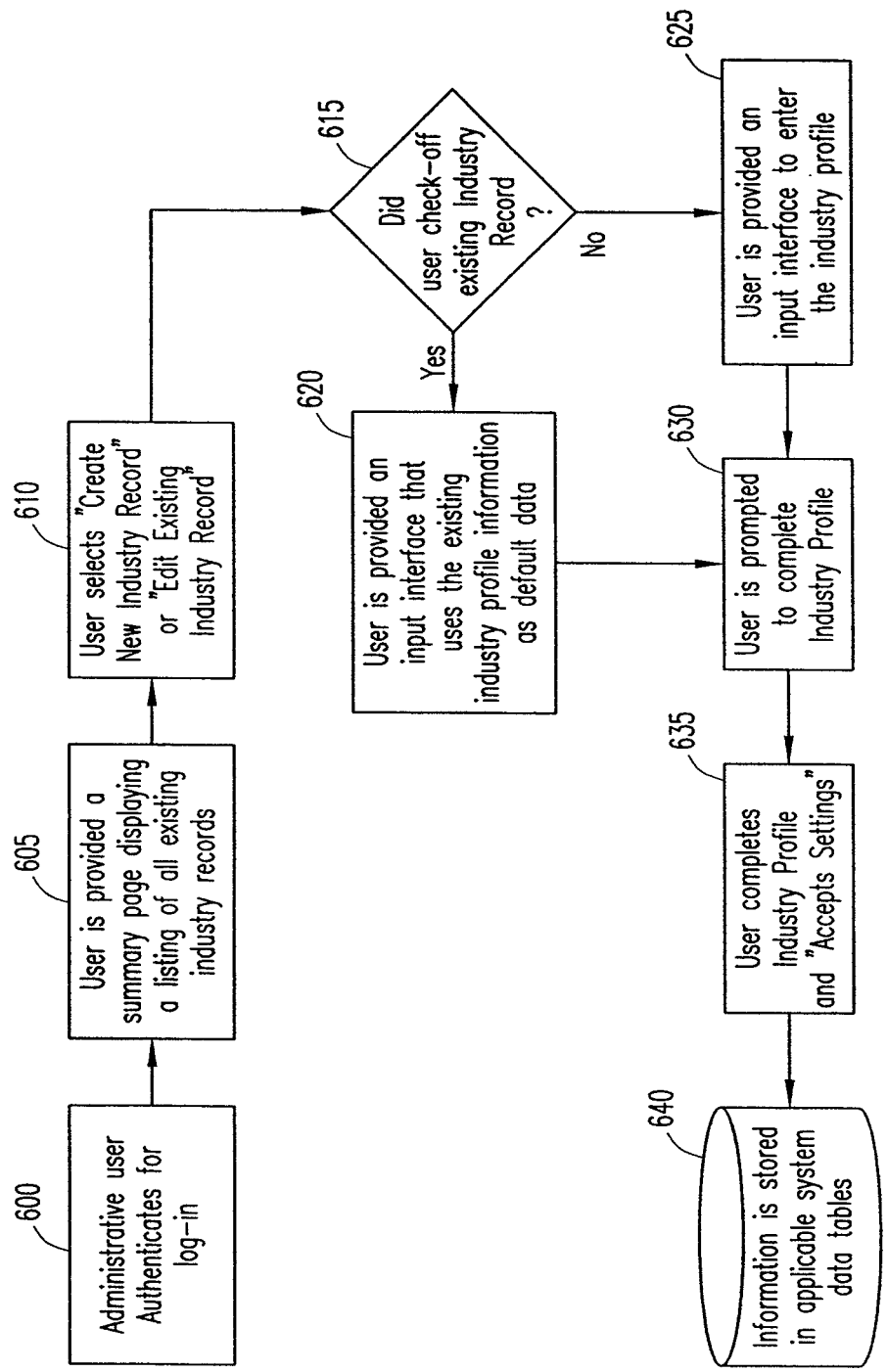
FIG. 13 is a flowchart illustrating exemplary steps for entering industry-related vendor criteria information into an industry record, in accordance with embodiments of the present invention.

FIG. 13 is a flowchart illustrating exemplary steps for entering industry-related vendor criteria information, in accordance with embodiments of the present invention. Initially, an administrative user accesses the computer system and logs-in using, for example, a user name and password, to authenticate the administrative user to the computer system (step 600). Thereafter, the administrative user is provided a summary page listing all existing industry records accessible to the administrative user (step 605) to allow the administrative user to either create a new industry record or edit an existing industry record (step 610).

If the administrative user selects to edit an existing industry record (step 615), the administrative user is provided an input user interface that contains the existing (previously entered and stored) industry information as default data (step 620). However, if the administrative user selects to create a new industry record, the administrative user is provided an input user interface to enable the administrative user to enter the industry-related vendor criteria information into a new industry record (step 625). For example, the administrative user can be prompted to enter the industry-related vendor criteria information in the hierarchical and relational manner described above by pushing web pages populated with industry fields and industry selection data to the administrative user (step 630). Alternatively, if the administrative user is updating an existing industry record, the administrative user can be prompted to indicate the type of information the user would like to update, and in response, the computer system can push web pages to the user having industry selection data associated with only the information that the user would like to update (step 630).

Once the industry user has completed entering the industry-related vendor criteria information (step 635), the computer system stores the received industry-related vendor criteria information in fields within an industry record (step 640). It should be understood that if the entered industry-related vendor criteria information is updated industry-related vendor criteria information intended by the user to replace previously entered industry-related vendor criteria information, the "current status" field of any previously stored industry-related vendor criteria information in the industry record is set to "outdated" to indicate that there is new industry-related vendor criteria information that replaces the previously entered industry-related vendor criteria information. In other embodiments, the new industry-related vendor criteria information can simply replace the previously entered industry-related vendor criteria information, thereby effectively deleting the previously entered industry-related vendor criteria information from the database. It should further be understood that if the user requires additional vendor qualifications that the computer system does not provide, the administrative user can create a new industry field and/or industry selection data (with or without approval from another administrator) and enter information using the newly added industry fields and/or industry selection data.

Figure 14:
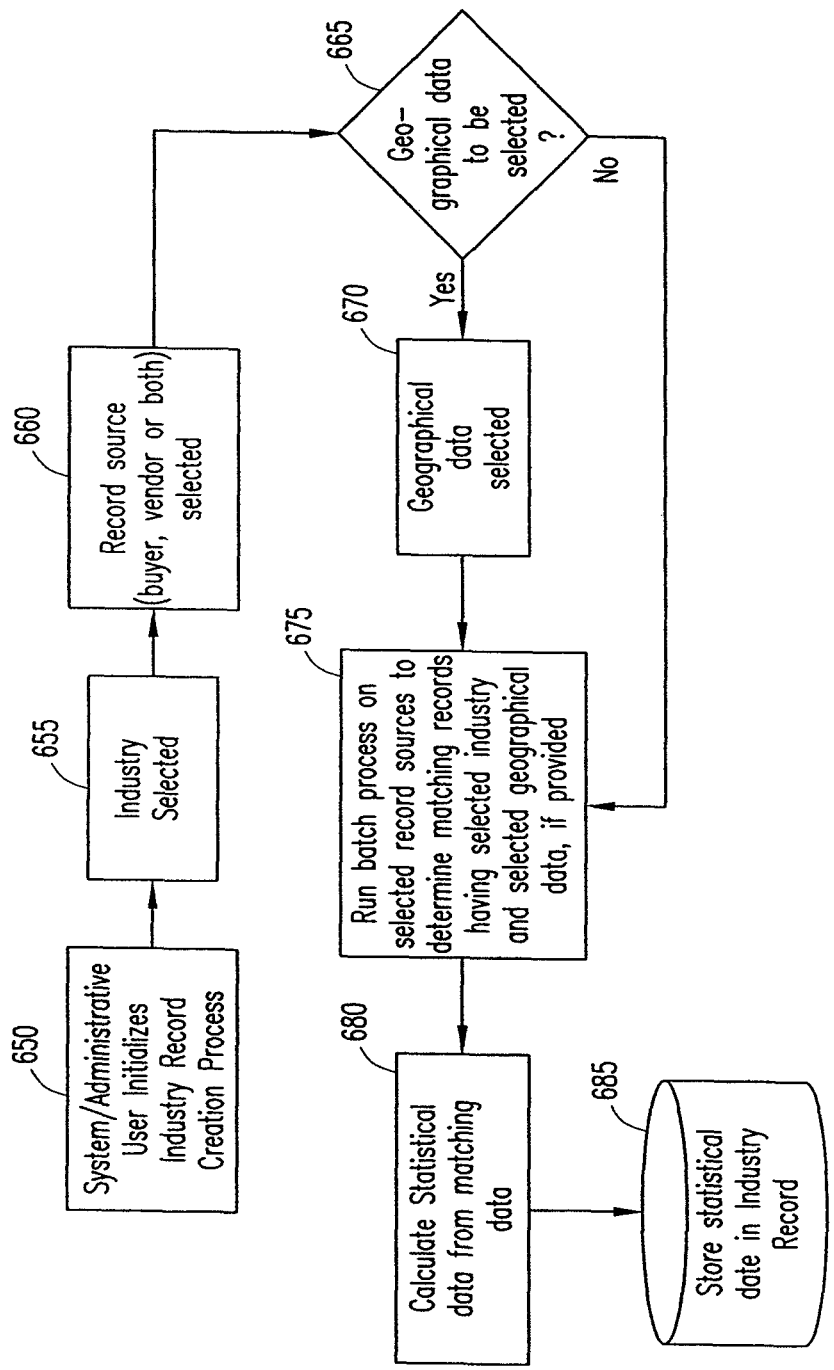
FIG. 14 is a flowchart illustrating exemplary steps for calculating statistical data and storing the statistical data as industry-related vendor criteria information into an industry record, in accordance with embodiments of the present invention.

FIG. 14 is a flowchart illustrating exemplary steps for calculating statistical data and storing the statistical data as industry-related vendor criteria information into an industry record, in accordance with embodiments of the present invention. To create an industry record, either the computer system or an administrative user initializes an industry record creation process (step 650). For example, the computer system can be programmed to automatically create industry records at pre-defined intervals. Alternatively, an administrative user can access the computer system and request initialization of the industry record creation process.

Upon initialization, the search criteria are for determining matching records are selected. For example, the particular industry associated with the industry record (step 655), the record source, such as buyer records, vendor records or both (step 660), and the geographical area for the industry record (steps 665 and 670) can be selected. Once all of the search criteria have been selected (either manually by an administrative user or pre-configured by the computer system), the computer system runs a batch mode matching process on the selected resource records (i.e., vendor, buyer or both) to determine matching records having the selected industry and the selected geographical area (if any) therein. Using all of the matching records, the computer system calculates statistical data related to the industry (step 680) and stores the statistical data in the industry record (step 685). The statistical data can be run on all fields within the vendor and/or buyer records that contain general and/or industry-specific data therein, or only on specified fields (pre-configured by the computer system or entered by the administrative user prior to calculating the statistical data). In addition, the statistical data that is calculated for each specified field can be pre-configured by the computer system (e.g., high-low range, average, median and standard deviation) or set by the administrative user prior to calculating the statistical data.

Figure 15A:
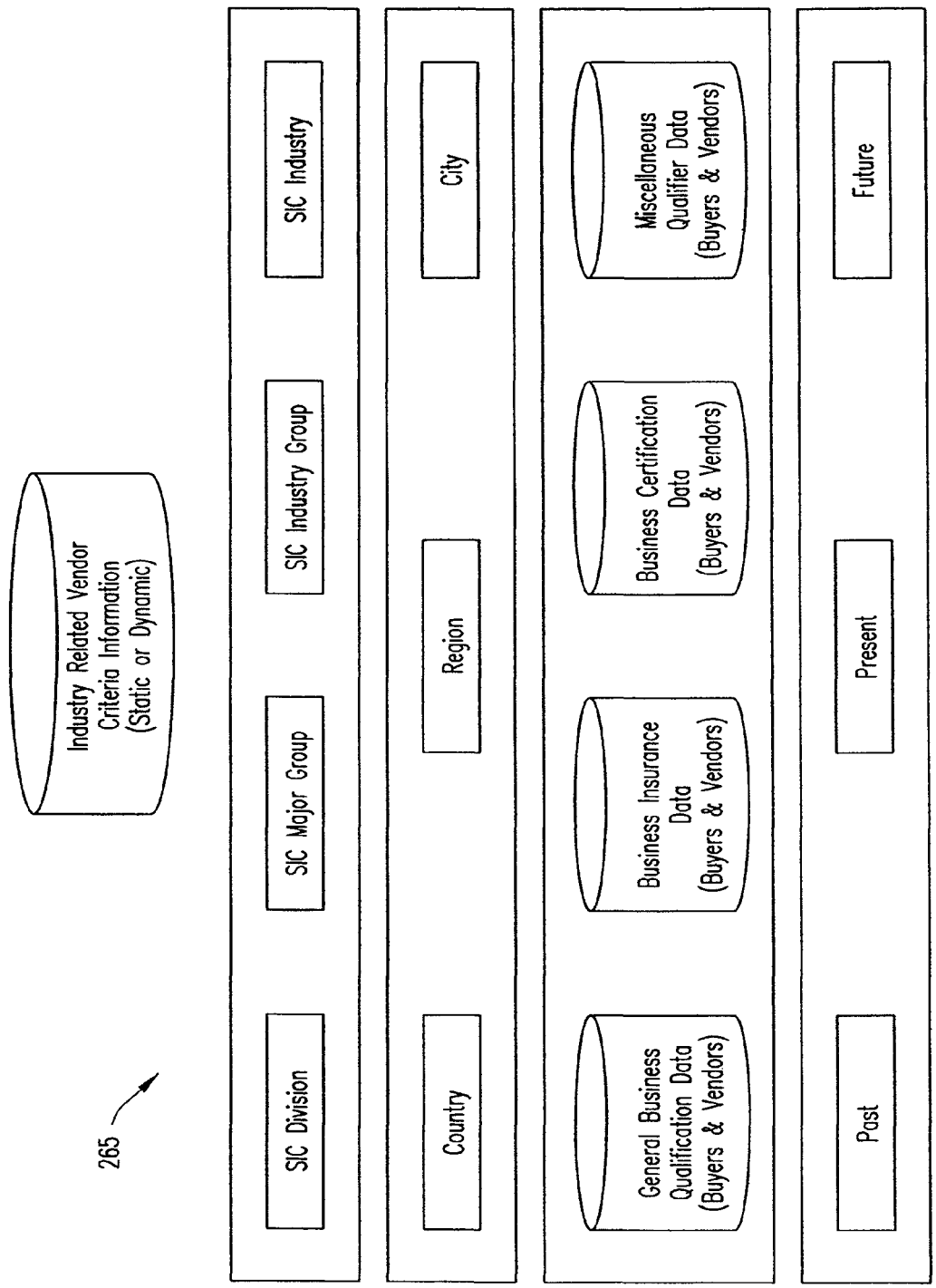
FIG. 15A is a data view illustrating the types of data stored in an industry record.

FIG. 15A is a data view illustrating the types of industry-related vendor criteria information 265 stored in an industry record. The industry-related vendor criteria information 265 can be static (e.g., entered by an administrative user) or dynamic (e.g., including updated calculated statistical data). The industry-related vendor criteria information 265 can further identify the industry (e.g., SIC Division, SIC Major Group, SIC Industry Group and SIC Industry) and the geographical area associated with the information 265. As shown above in Tables 16-19, the industry-related vendor criteria information 265 can further include general business qualification data, business insurance data, business certification data and other miscellaneous qualifier data. In addition, the industry-related vendor criteria information 265 can include multiple records associated with past data, present data and future data (e.g. predicted data).

FIG. 15B is a screen shot of an exemplary web page illustrating an example of industry-related vendor criteria information 265 entered by an administrative user and stored within an industry record. The industry-related vendor criteria information 265 can be used to qualify vendors for industries or displayed to a buyer user or vendor user, as described above, to use as a benchmarking tool when entering industry profile information or to compare a particular vendor with the industry recommendations.

Figure 16:
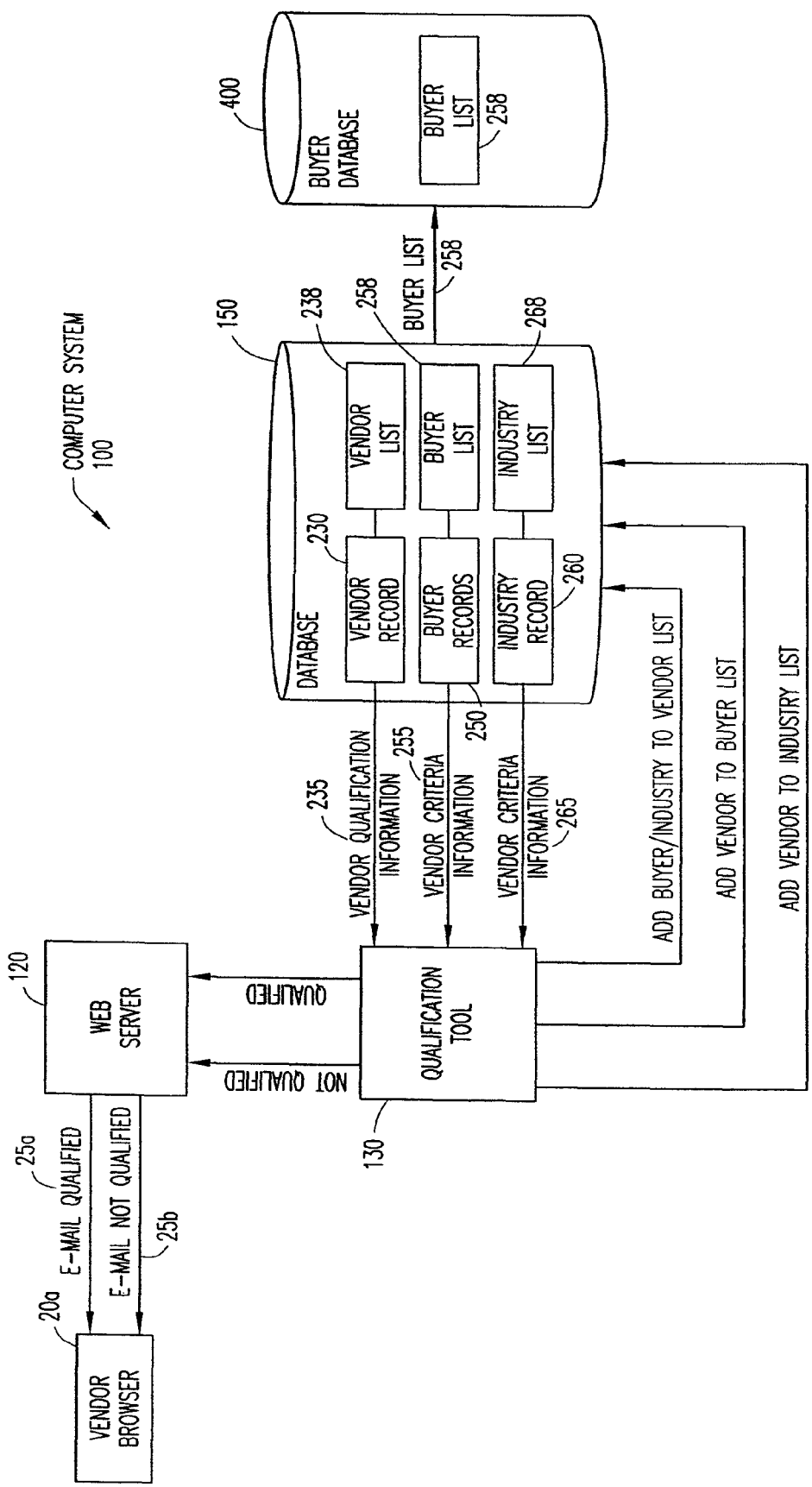
FIG. 16 is a data flow diagram illustrating a vendor qualification tool for comparing vendor qualification information with vendor criteria information, in accordance with embodiments of the present invention.

FIG. 16 is a data flow diagram illustrating a vendor qualification tool 130 for comparing vendor qualification information 235 with vendor criteria information 255 or 265 to qualify vendors to do business with buyers and/or to qualify vendors to do business in particular industries, in accordance with embodiments of the present invention. The qualification tool 130 can include any hardware, software and/or firmware required to perform the functions of the qualification tool, and can be implemented within the web server 120 or an additional server (not shown). Each time a vendor updates a vendor record 230 or creates a new vendor record 230, the qualification tool 130 compares the vendor qualification information 235 entered and stored in the vendor record 230 to vendor criteria information 255 or 265 entered and stored in buyer records 250 and/or industry records 260, respectively.

If a vendor qualifies to do business with a particular buyer, the qualification tool 130 adds the vendor to a buyer list 258 containing all of the vendors that are qualified to do business with the buyer and adds the buyer to a vendor list 238 containing all of the buyers that the vendor is qualified to do business with. If the vendor list 238 is maintained at the computer system 100, and not provided to the vendor, the vendor list 238 may only contain the buyer identities the computer system 100 assigned the buyers (although additional buyer information could be stored). However, if the vendor list 238 is to be downloaded to a vendor database (not shown), the vendor list 238 could include any buyer information that the vendor chooses to include in the list. For example, the vendor list 238 can include all of the buyer-defined vendor criteria information 255 (including basic buyer identification information) stored in the buyer record 250 or just a portion of the buyer-defined vendor criteria information 255. However, there may be some buyer-defined vendor criteria information 255 that the buyer does not want the vendor to have access to. In this case, the buyer can limit access to certain buyer-defined vendor criteria information 255 by restricting access to the information 255 when the buyer enters the information 255. The vendor list 238 can further be subdivided or organized in any manner the vendor and/or computer system 100 chooses. For example, the vendor may provide multiple goods and/or services, and therefore, the vendor list 238 can include multiple lists, each being associated with a particular good or service, or the vendor list 238 can be subdivided into the particular goods or services the vendor provides. As another example, the vendor may provide goods and/or services in multiple geographical areas, and therefore, the vendor list 238 can include multiple lists, each being associated with a particular geographical area.

In addition, the buyer list 258 containing all of the vendors qualified to do business with the buyer can include any vendor qualification information 235 desired by the buyer (unless the vendor limits access to that information 235) and can be subdivided or organized in any manner desired by the buyer. For example, the buyer list 258 may include multiple lists, each containing vendors qualified to do business with the buyer for a particular good or service. These lists can be further subdivided into vendors qualified to provide a particular good or service in a particular geographical area. The vendor qualification information 235 included in the buyer list 258 should be sufficient for the buyer to contact the vendor (e.g., mailing address, e-mail address, telephone number, contact name at the vendor, etc.) and assess whether a particular vendor should be contacted for a particular good or service request (e.g., RFQ/RFP). The buyer can either access the buyer list 258 at the computer system 100 to contact one or more vendors or the buyer list 258 can be downloaded to a buyer database 400 for independent use of the buyer list 258 at the buyer site for selection of vendors to send RFQ/RFP's to. Updates to the buyer list 258 can be downloaded to the buyer database 400 upon receipt or periodically. For example, the computer system database 150 can download the entire buyer list 258 to the buyer database 400 each time a vendor is added or removed from the list 258, download the entire buyer list 258 to the buyer database 400 periodically or download only the changes to the buyer list 258 to the buyer database 400 as they occur or periodically.

If a vendor qualifies to do business in a particular industry, the qualification tool 130 adds the vendor to an industry list 268 containing all of the vendors that are qualified to do business in that industry and adds the industry to the vendor list 238 containing all of the industries that the vendor is qualified to do business in. The qualified industries can be included within the same list 238 that the qualified buyers are in, or can be separated out into a separate list 238. Each industry record 260 has a different industry list associated with it, and each industry list 268 can be subdivided or organized in any manner desired by the computer system operator. The industry list 268 can be accessed by buyers (or vendors or administrators) to determine the vendors that are pre-qualified for a particular industry and to view the "best in class" of the vendors for that industry.

In addition, each time a buyer updates a buyer record 250 or creates a new buyer record 250, the qualification tool 130 compares the buyer-defined vendor criteria information 255 entered and stored in the buyer record 250 to vendor qualification information 235 entered and stored in vendor records 230. If the buyer is simply updating a buyer record 250, the buyer can request that the computer system 100 only re-qualify vendors currently on the buyer list 258 with only the new vendor criteria information 255. Alternatively, the computer system 100 can compare all of the buyer-defined vendor criteria information 255, including the new vendor criteria information 255, with all vendor records 230, especially if the new vendor criteria information 255 significantly changes the buyer-defined vendor criteria information 255. The qualification tool 130 can further be used to solicit new vendor qualification information 235 from vendors if the buyer adds a new vendor criteria (buyer field) not previously supported by the system. For example, after an associated vendor field is created by the computer system 100, the qualification tool 130 can send an e-mail to all vendors in the buyer list 258 or to certain vendors in the buyer list 258 specified by the buyer to provide new vendor qualification information 235 to remain qualified for the buyer.

The qualification tool 130 further interfaces with the web server 120 to provide e-mail notification messages 25a and 25b (or dashboard displays) to the vendor browser 20a, indicating whether the vendor is qualified or not. For example, the qualification tool 130 can request the web server 120 to send an e-mail notification message 25a to the vendor browser 20a each time the vendor is qualified for a particular buyer or industry. Alternatively, the qualification tool 130 can request the web server 120 to send an e-mail notification message 25a to the vendor browser 20a periodically with a list of buyers and/or industries that the vendor is qualified for. The qualification tool 130 can send the entire list of buyers and/or industries stored within the vendor list 238, or only newly added buyers and/or industries.

In most cases, it would not be economical to send the vendor an e-mail notification message including every buyer and/or industry the vendor is not qualified for. Therefore, the qualification tool 130 can send the vendor an e-mail notification message 25b including only those unqualified buyers and/or industries that the vendor was attempting to be qualified for, based on the information entered by the vendor into the vendor qualification information 235. For example, the vendor could specify particular buyers that the vendor would like to do business with, and request notification of whether or not the vendor was qualified for those particular buyers. As another example, if the vendor was previously qualified for a particular buyer or industry, and due to new qualifications associated with the buyer or industry or expired vendor qualification information 235 stored in the vendor record 230, the vendor is no longer qualified for the buyer or industry, the qualification tool 130 can send an e-mail notification message 25b to the vendor browser 20a indicating that the vendor is no longer qualified for that buyer or industry.

An example of the information the qualification tool uses to compare vendor qualification information 235 and vendor criteria information 255/265 to pre-qualify a vendor per industry or per buyer is illustrated in FIG. 17. The qualification tool retrieves pertinent vendor qualification information 235 from vendor fields 220 from the vendor record 230 and vendor criteria information 255/265 from buyer fields 240 within the buyer record 250 or industry fields 263 from the industry record 260 to perform the comparison. For example, the qualification tool can retrieve the vendor ID, vendor company name and other identifying data from the vendor qualification information 235, buyer identifying data (not shown) from the buyer-defined vendor criteria information 255 (if the qualification tool is qualifying a vendor for a buyer) and industry identifying data (not shown) from the industry-related vendor criteria information 265 (if the qualification tool is qualifying a vendor for an industry). The qualification tool further retrieves all of the vendor criteria information 255 or 265 from the buyer record 250 or industry record 260, respectively, and uses the vendor criteria information 255 or 265 to determine the associated vendor qualification information 235 to retrieve from the vendor record 230.

In the example of FIG. 17, the fields (buyer fields 240 or industry fields 263) containing vendor criteria information 255 or 265 included the business entity type of the vendor, the net worth of the vendor, the currency type of the vendor, the full time employee count of the vendor, along with other certification and insurance fields. In addition, the fields 240 or 263 containing vendor criteria information 255 or 265, respectively, also included the data renewal date of the vendor qualification information 235 stored in the vendor records 230. The data renewal date allows the buyer or computer system (for industry records) to effectively put an expiration time on the vendor qualification information 235 to eliminate vendors that have not updated their records 230 within a certain period of time. The qualification tool compares the data within each particular field to ascertain whether the vendor complies with the buyer and/or industry requirements. In FIG. 17, the qualification tool has entered "Yes" in a compliance record 500 for each field, and therefore, the vendor does comply with each buyer or industry requirements. Based on the compliance record 500, the qualification tool would qualify the vendor for the particular buyer or industry and update the associated lists (vendor, buyer and/or industry) accordingly. For exemplary purposes, the specific geographic, SIC industry and industry certification qualifiers were gleaned from the reporting output view in FIG. 17.

Figure 18:
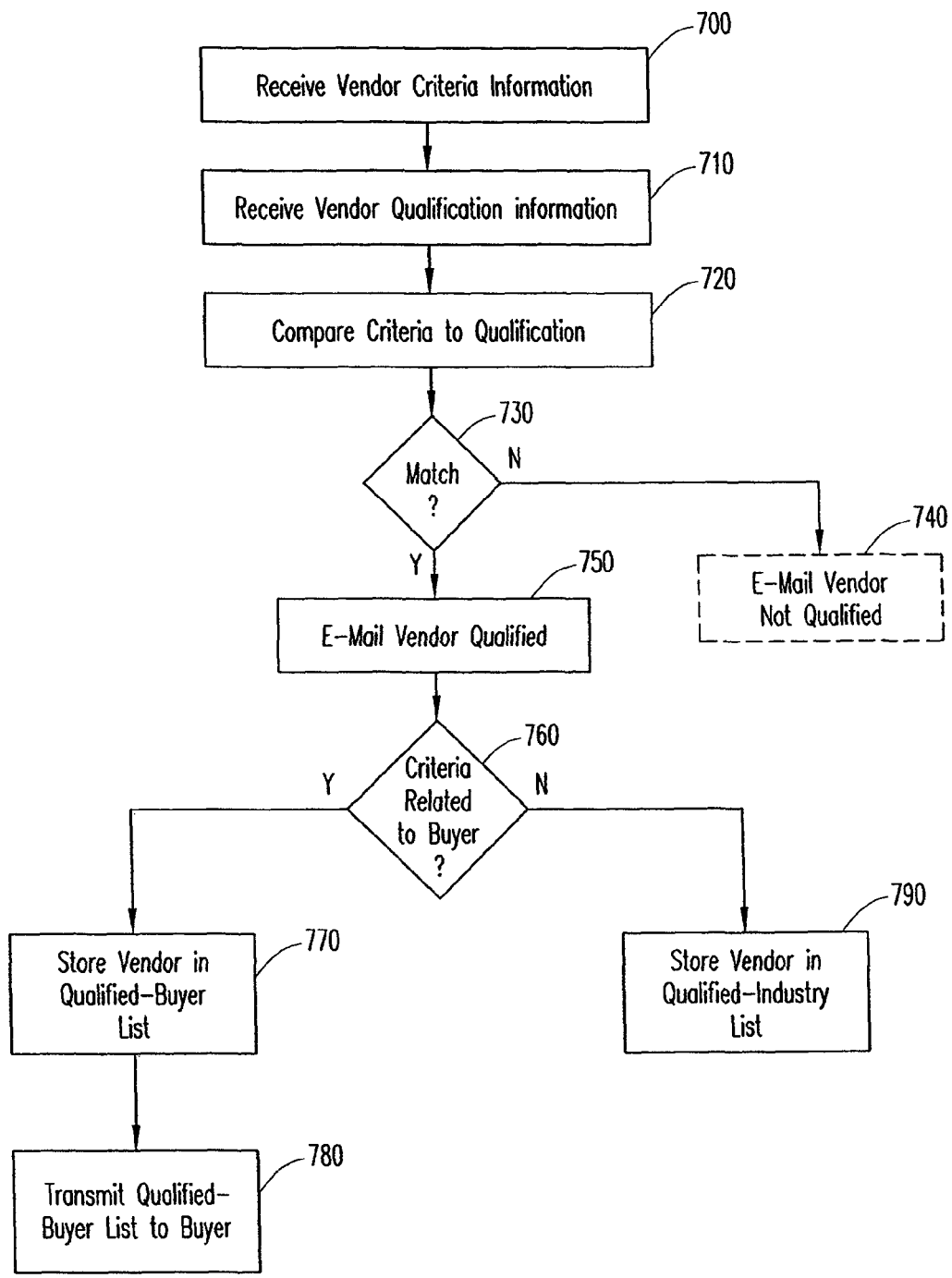
FIG. 18 is a flowchart illustrating exemplary steps for qualifying vendors on a per industry or per client basis, in accordance with embodiments of the present invention.

FIG. 18 is a flowchart illustrating exemplary steps for qualifying vendors on a per industry or per client basis, in accordance with embodiments of the present invention. When the computer system receives both vendor criteria information (step 700) and vendor qualification information (step 710), the computer system compares the vendor criteria information to the vendor qualification information (step 720). If the vendor qualification information does not match the vendor criteria information (step 730), the computer system can optionally send an e-mail notification message to the vendor (step 740), as discussed above in connection with FIG. 16. However, if the vendor qualification information does match the vendor criteria information (step 730), the computer system sends an e-mail notification message to the vendor (step 750). If the vendor criteria information is buyer-defined vendor criteria information (step 760), the computer system adds the vendor to the qualified buyer list (step 770) and sends the updated qualified buyer list to the buyer (step 780). If the vendor criteria information is industry-related vendor criteria information (step 760), the computer system adds the vendor to the qualified industry list (step 790). The buyer and/or industry can also be added to the vendor list, as described above.

Figure 19:
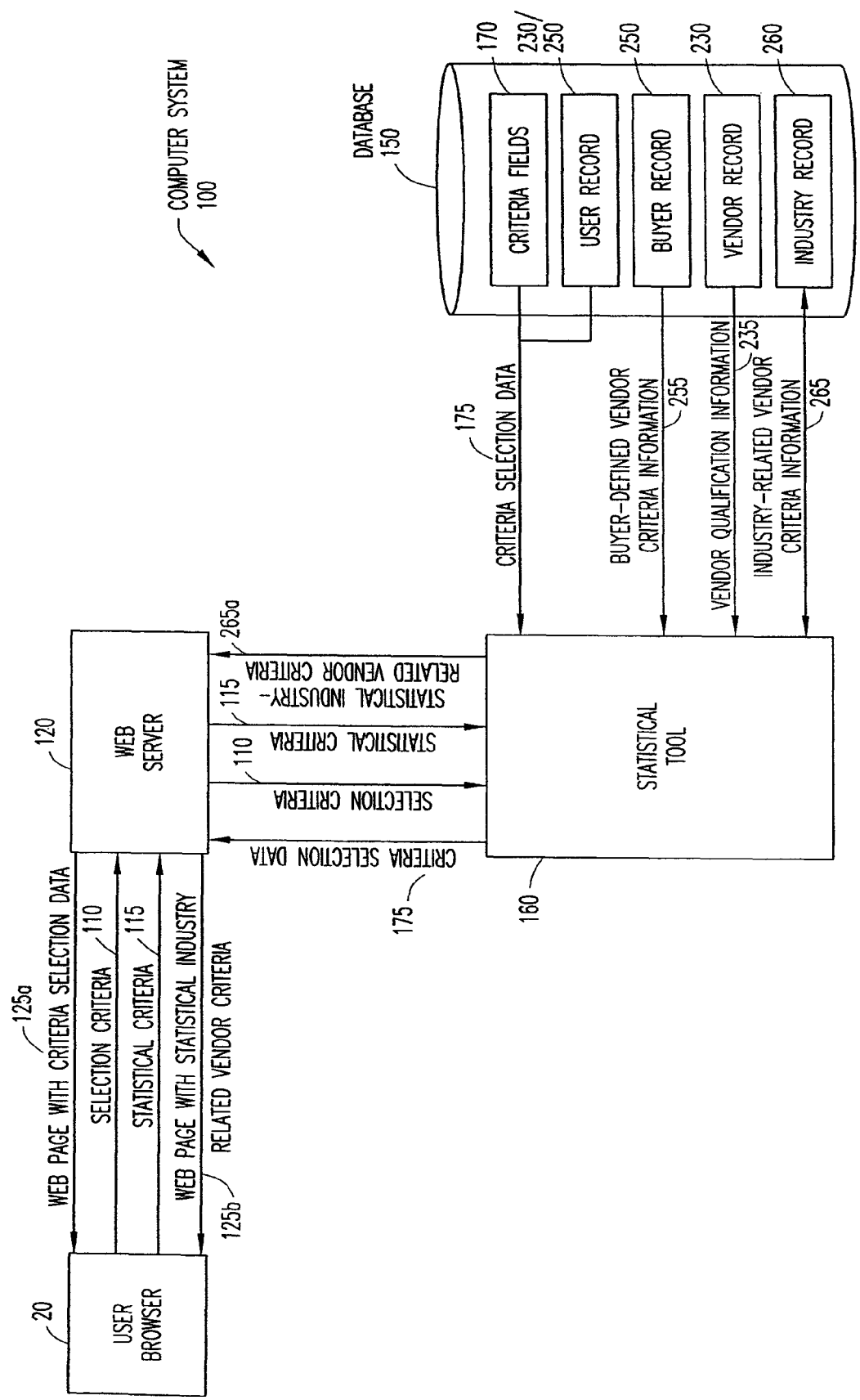
FIG. 19 is a data flow diagram illustrating a statistical tool for calculating and providing industry statistical data related to one or more vendor records and/or buyer records, in accordance with embodiments of the present invention.

FIG. 19 is a data flow diagram illustrating a statistical tool 160 for calculating and providing industry-related statistical data associated with one or more vendor records and/or buyer records, in accordance with embodiments of the present invention. The statistical tool 160 can include any hardware, software and/or firmware required to perform the functions of the statistical tool 160, and can be implemented within the web server 120 or an additional server (not shown). When a user accesses the computer system 100 using a user browser 20, the computer system 100 solicits selection criteria 110 from the user. The user can be an administrative user attempting to create an industry record, as described above in connection with FIG. 14, a buyer user requesting statistical data or standard industry qualifications, as described above in connection with FIG. 12B and shown in FIG. 15B, or a vendor user requesting statistical data or standard industry qualifications. The statistical data can be used to qualify vendors for industries, to compare a vendor to industry standards or to use as a benchmarking tool by a buyer or a vendor when entering data into a buyer record 250 or vendor record 230, respectively.

In one embodiment, the statistical criteria 110 includes information 235 or 255 stored in a vendor or buyer record 230 or 250, respectively, within the database 150. In another embodiment, the statistical criteria 110 can be entered in the same manner as the vendor criteria information 265 stored in the industry records 260 in the database 150. For example, the statistical tool 160 can interface with the database 150 to retrieve criteria fields 170 containing criteria selection data 175 and populate one or more web pages 125a within the web server 120 with the criteria selection data 175 to be passed to the user browser 20, so that the user can enter the specific statistical criteria 110 that the user would like statistical information on. It should be understood that the criteria selection data 175 can include either selection data that can be individually selected (e.g., corresponding to the industry selection data within industry fields discussed above in connection with FIG. 2) and/or one or more pre-configured industry profiles that correspond to pre-configured industry-related vendor criteria information 265 (e.g., industry, geographical area and record source) stored within industry records 260. In addition, if the statistical criteria 110 is selected from one or more pre-configured industry profiles, the statistical criteria 110 provided to the computer system 100 can include only one or more components of a particular pre-configured industry profile.

In some embodiments, the criteria selection data 175 can further include statistical selections that can be populated in web pages 125a and provided to the user browser 20 from the web server 120 for the user to select statistical criteria 115 from. In other embodiments, the statistical criteria 115 can be pre-configured by the computer system 100 based upon existing industry records. The statistical selections 175 provided to the user can be generic regardless of the selection criteria 110 entered by the user, or the statistical selections 175 can be based upon the selection criteria 110 entered by the user. For example, if the user selects a particular industry having unique qualifications, the user can be prompted to enter whether the user would like to have statistical data 265a related to those unique qualifications. The statistical criteria 115 entered by the user can also indicate the types of statistical data 265a required. For example, the statistical criteria 115 can request the average insurance amount across all geographical areas for a specific industry, the average insurance amount for specific geographic areas for the specific industry, the standard deviation, the insurance amount range and any other statistical data 265a that the user desires.

The selection criteria 110 and any statistical criteria 115 are passed from the web server 120 to the statistical tool 160 to determine the statistical data 265a to be presented to the user. If the user has selected a pre-configured industry profile associated with a particular industry record (or one or more components of a pre-configured industry profile), the statistical tool 160 can retrieve the selected industry-related vendor criteria information 265 from the selected industry record 260 and interface with the web server 120 to provide a web page 125b containing the requested statistical data 265a to the user browser 20. If the user has entered individual selection criteria 110 or if the user is using buyer-defined vendor criteria information 255 or vendor qualification data 235 as the selection criteria 110, the statistical tool 160 can either compare the entered/stored selection criteria 110 with industry records 260 stored within the database 150 or compare the entered selection criteria 110 to the vendor records 230 and/or buyer records 250 stored within the database 150. The statistical tool 160 compares the entered selection criteria 110 to industry records 260 in order to determine the closest matching industry record to the entered selection criteria 110 in order to present pre-calculated statistical data 265a to the user.

However, if the user desires specific statistical data 265a not available from existing industry records, the user can request that the statistical tool 160 run a new industry record creation process to create an industry record 260 for the user (that may or may not be stored in the database 150 and may or may not be available to multiple buyers, vendors and administrators). To determine the matching records associated with the entered selection criteria 110, the statistical tool 160 retrieves vendor qualification information 235 from the vendor records 230 and/or buyer-defined vendor criteria information from the buyer records 250 to determine if the vendor criteria 110 match any of the vendor and/or buyer records 250 and/or 260, respectively. The user can designate that all entered selection criteria 110 must match exactly before a particular record 230 or 250 is used in the statistical analysis, or the user can specify a minimal match percentage (e.g., 75% of the selection criteria 110 must match a record 230 or 250 for that record 230 or 250 to be used in the statistical analysis). Alternatively, the computer system 100 can determine a minimal match percentage or other matching criteria before using a record 230 or 250 in the statistical analysis. The computer system 100 can further inform the user of the matching criteria used to enable the user to narrow or broaden the matching criteria accordingly as part of the selection criteria 110.

If the vendor qualification information 235 and/or buyer-defined vendor criteria information 255 within a particular vendor record 230 and/or buyer record 250, respectively, matches the entered selection criteria 110 based upon the matching criteria, the statistical tool 160 uses the information 235 and/or 255 within the record 230 and/or 250, respectively, to calculate statistical data 265a related to the selection criteria 110. The statistical tool 160 interfaces with the web server 120 to provide the web page 125b containing the requested statistical data 265a to the user browser 20. The statistical tool 160 can further interface with the database 150 to store the statistical data 265a within a new industry record 260 as industry-related vendor criteria information, unless the user designates otherwise.

Based upon the statistical data 265a received, the statistical tool 160 can further provide the user the option of modifying the selection criteria 110 and/or the statistical criteria 115 to narrow or broaden the number of records 230 and/or 250 included within the statistical data 265a or modify the type of statistical data 265a provided on the web page 125b displayed to the user via the user browser 20. In addition, if the selection criteria 110 entered by the user are too broad to perform a manageable search, the statistical tool 160 can request the user to modify the selection criteria 110. For example, the statistical tool 160 can suggest that the user narrow the geographical area, industry (e.g., from a Major Group to an Industry Group or Industry) or record source. Furthermore, if the selection criteria 110 are too narrow, such that few or no matches occur, the statistical tool 160 can request the user to modify the selection criteria 110. For example, the statistical tool 160 can suggest that the user broaden the geographical area, industry or record source.

Examples of statistical industry data 265a provided to a user are illustrated in FIGS. 20A and 20B. FIG. 20A is a screen shot of an exemplary web page 125b listing various statistical data 265a based upon vendor records, while FIG. 20B is a screen shot of an exemplary web page 125b listing various statistical data 265a based upon buyer records. For example, the user can be provided a total number of records that matched the vendor criteria entered by the user, along with various statistical data 265a associated with the vendor qualification information or buyer-defined vendor criteria information stored in the matching records. In addition, the user can be provided the option to view buyer preferences (as shown in FIG. 20B), vendor information (as shown in FIG. 20A) or qualification recommendations (as shown in FIG. 15B). Furthermore, the user can be provided the option to edit the selection criteria and/or statistical criteria (shown as an "Edit Criteria" button), save the selection criteria and/or statistical criteria (shown as a "Save Criteria" button) to save the criteria entered for future analysis purposes (e.g., the user may want to run another statistical analysis of vendor records and/or buyer records or both for the same or a different industry, and may want to reduce the amount of input that is required) and/or save the data displayed (shown as a "Save Data" button) as an industry record for later viewing by the user.

Figure 21:
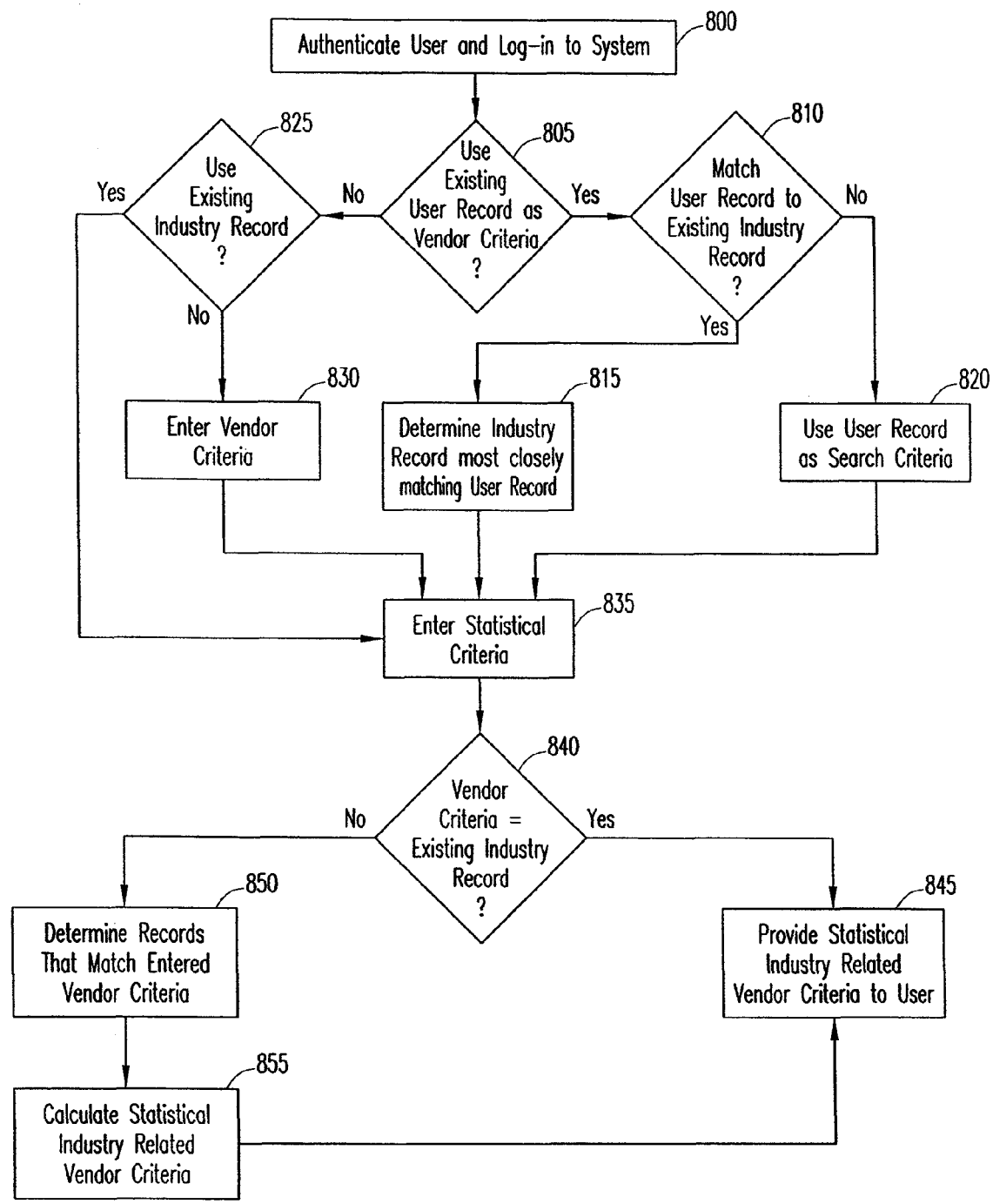
FIG. 21 is a flow chart illustrating exemplary steps for calculating and providing statistical data related to one or more vendor records and/or buyer records, in accordance with embodiments of the present invention.

FIG. 21 is a flow chart illustrating exemplary steps for calculating and providing statistical data related to one or more vendor records and/or buyer records, in accordance with embodiments of the present invention. Initially, a user accesses the computer system and logs-in using, for example, a user name and password, to authenticate the user to the computer system (step 800). The user name and/or password can be unique to each user, or one user name and password can be associated with all users at a particular source (e.g., business entity).

Once the user has been authenticated, if the user has created a record (vendor or buyer), the user can use the previously created record as the selection criteria (step 805). The user can further choose to either determine the closest matching industry record to the previously created user record (steps 810 and 815) or to use the previously created user record as the search criteria to create a new industry record (steps 810 and 820). If the user does not want to use a previously created user record as the selection criteria, the user can select a pre-configured industry profile associated with an existing industry record to view statistical data associated with one or more industry fields stored within that industry record (step 825), or the user can enter the selection criteria individually to create a new industry record (step 830). Thereafter, the user can enter the statistical criteria (step 835) into the computer system, as described above.

Once the selection criteria and statistical criteria have been entered, the computer system determines whether the selection criteria is associated with an existing industry record (e.g., the user has requested the computer system to determine the closest matching industry record to a previously created user record or the user has selected a pre-configured industry profile associated with an existing industry record) (step 840). If so, the computer system retrieves the requested statistical data based upon the statistical criteria from the industry record and displays the statistical data to the user (step 845).

If not, the computer system compares the selection criteria to the information stored in vendor records and/or buyer records to determine matching vendor records and/or buyer records (step 850), in accordance with the matching criteria, as discussed above. Thereafter, the information included within the matching record is used to calculate statistical data in accordance with the statistical criteria entered by the user (step 855). The calculated statistical data is provided to the user for viewing, downloading or printing by the user (step 845). It should be noted that the user can further be provided the option of modifying the selection criteria and/or statistical criteria to broaden or narrow the number of matching records in order to obtain more accurate statistical data or different statistical data.

Figure 22:
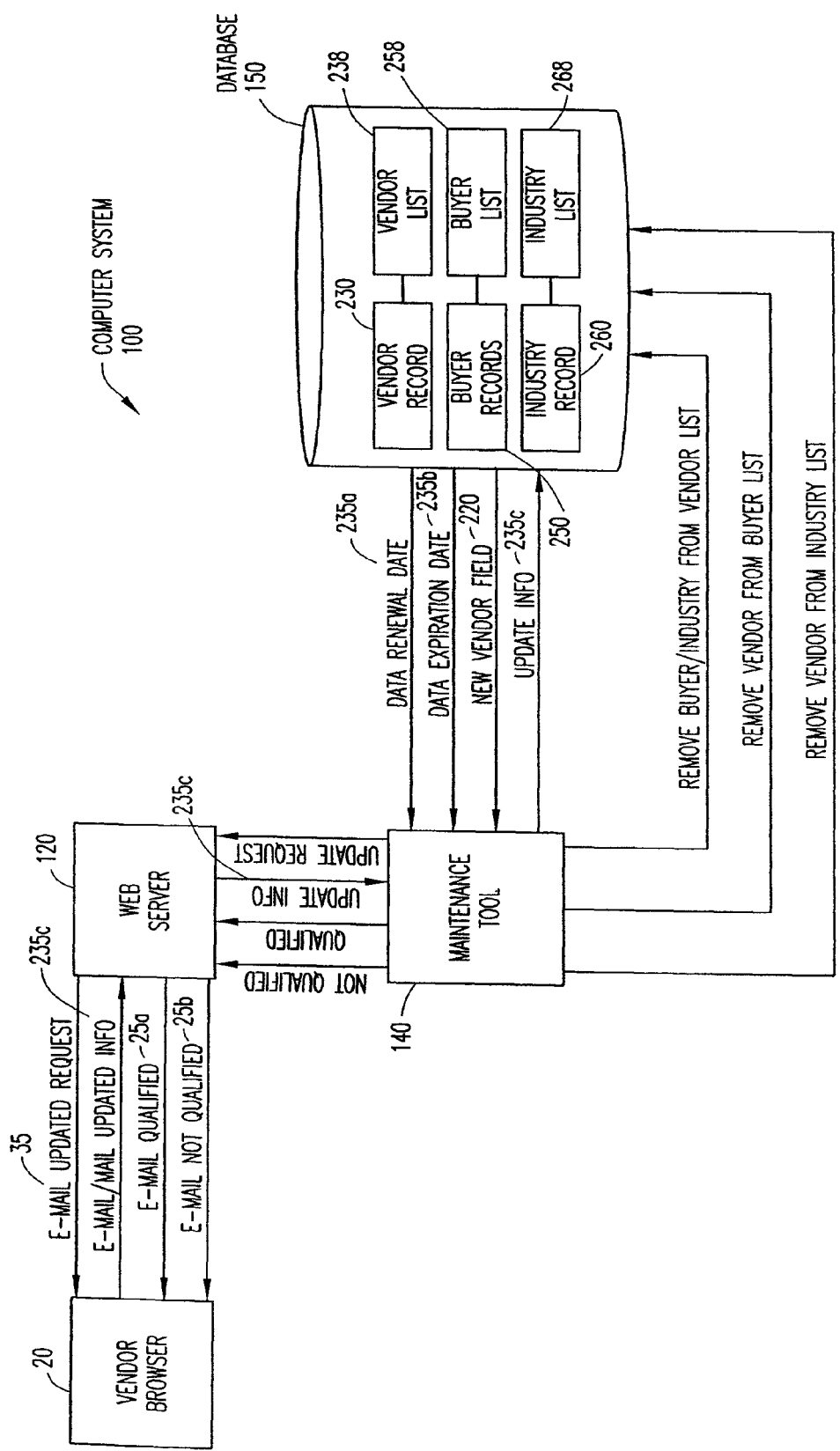
FIG. 22 is a data flow diagram illustrating a vendor maintenance tool for maintaining vendor qualification, in accordance with embodiments of the present invention.

FIG. 22 is a data flow diagram illustrating a vendor maintenance tool 140 for maintaining vendor qualification, in accordance with embodiments of the present invention. Each vendor record 230 has a data review field therein that stores a data renewal date 235a to serve as a reminder to the vendor to review and update the vendor qualification information stored in the vendor record 230. In addition, one or more tables or fields within the vendor record 230 may have an expiry field that stores an expiration date 235b associated with the particular table or field. For example, if a vendor has entered insurance information into the vendor record 230, and one or more of the insurance policies has an expiration date 235b, an expiry field within the vendor record 230 would store the expiration date(s) 235b of the insurance policies.

The vendor maintenance tool 140 within the computer system 100 interfaces with the database 150 to manage the vendor records 230 to ensure that all vendor qualification information stored within the vendor records 230 is current by reviewing all data renewal dates and data expiration dates within the vendor records 230. The maintenance tool 140 includes the hardware, software and/or firmware required to perform the functions of the maintenance tool 140, and can be included within the web server 120 or an additional server (not shown). If a data renewal date 235a or data expiration date 235b indicates that updated vendor qualification information is needed from a vendor, the maintenance tool 140 interfaces with the web server 120 to send an update request message 35 to the vendor browser 20a. For example, the maintenance tool 140 can be programmed to send out update request messages 35 a certain period of time (e.g., one month) in advance of any data renewal date 235a or expiration date 235b. The update request message 35 can be sent as an e-mail message to the vendor browser's 20a e-mail account or as a posted message on a dashboard that a vendor user can view via the vendor browser 20a upon logging-in to the computer system.

The maintenance tool can further retrieve new vendor fields 220 (based on new buyer fields 240 configured by the buyer or new industry fields 263 configured by the computer system 100) not previously available to the vendor or not previously required to be filled out by the vendor. The update request message 35 sent to the vendor browser 20a can inform the vendor that a new vendor field is available or required to be filled out. It should be understood that although not shown, an update request message can also be sent to the buyer browser, informing the buyer of a new buyer field 240 (shown in FIG. 2). The update message can be sent to all vendors and buyers registered with the computer system 100 or to only those vendors and buyers who have a need to update their records 230 or 250 based on the new field 220 or 240 (e.g., all vendors and buyers in a particular industry related to the new field 220 or 240, all vendors pre-qualified for a particular buyer, etc.).

The maintenance tool 140 further coordinates the collection of any updated vendor qualification information 235c provided by the vendor via the vendor module (and also the collection of any updated vendor criteria information provided by the buyer via the buyer module). The updated vendor qualification information 235c can be entered by the vendor via the vendor browser 20a and web server 120 and/or provided to the computer system 100 through traditional mailing or faxing, if hard copies of or documentation supporting the updated vendor qualification information 235c are required for verification purposes (e.g., a new copy of an insurance policy). Therefore, in some embodiments, the maintenance tool 140 further enables an operator of the computer system 100 to enter updated vendor qualification information 235c into the maintenance tool 140. The computer system 100 further incorporates the capability of receiving documents transmitted electronically via file attachment and/or direct technical interface. Upon receipt of the updated vendor qualification information 235c, the maintenance tool 140 is further responsible for storing the updated vendor qualification information 235c in the vendor record 240 and updating the data renewal date 235a and/or data expiration date 235b, as appropriate. If the updated vendor qualification information 235c changes or modifies an existing table or field within the vendor record 240, the maintenance tool can replace any previously stored vendor qualification information with the updated vendor qualification information 235c or store the updated vendor qualification information 235c in addition to the previously stored vendor qualification information within the vendor record 230. If the latter, the current status of the previously stored vendor qualification information would be changed to "outdated."

The maintenance tool 140 is further responsible for interfacing with the qualification tool (shown in FIG. 16) to update vendor lists 238, buyer lists 258 and industry lists 268 if updated vendor qualification information 235c is not entered into the computer system 100 prior to the expiration date or data renewal date. In one embodiment, the maintenance tool 140 removes the vendor from all buyer lists 258 and industry lists 268 and sets the current status of the vendor record 230 to "outdated" if updated vendor qualification information 235c is not entered prior to the expiration or data renewal date (or within a reasonable, pre-configured or negotiated time period after the expiration or data renewal date). In another embodiment, the maintenance tool 140 removes the vendor from all buyer lists 258 and industry lists 268 that required the updated vendor qualification information 235c if updated vendor qualification information 235c is not entered prior to the expiration date. For example, if a particular industry or buyer requires the vendor to have a particular amount of insurance coverage, and the insurance policy providing that coverage lapses without the vendor providing a renewal policy, the maintenance tool 140 can remove the vendor from that particular buyer list 258 or industry list 268. In addition, the maintenance tool 140 can further remove that particular industry or buyer from the vendor list 238. In further embodiments, the maintenance tool 140 can be programmed to make no changes to the vendor list 238, buyer lists 258 or industry lists 268 if updated vendor qualification information 235c is not provided prior to the data renewal date. For example, the data renewal date can be used simply as a reminder to the vendor to check the vendor records 230 and make any changes without invoking any consequences on the vendor if changes are not made.

The maintenance tool 140 further interfaces with the web server 120 to provide e-mail notification messages 25a and 25b to the vendor regarding whether the vendor is qualified or not based upon any updated vendor qualification information 235c the vendor enters or does not enter into the computer system 100. For example, if the updated vendor qualification information 235c re-qualifies the vendor for a particular buyer or industry, the maintenance tool 140 can provide an e-mail notification message 25a to the vendor indicating the vendor is qualified for the buyer or industry. Likewise, if the vendor does not provide any updated vendor qualification information 235c or if the updated vendor qualification information 235c does not meet the vendor criteria information stored within a particular buyer record 250 or industry record 260, the maintenance tool 140 can provide an e-mail notification message 25b to the vendor informing the vendor that the vendor is no longer qualified for that particular buyer or industry. It should be understood that the maintenance tool 140 interfaces with the qualification tool (shown in FIG. 16) to make the determination as to whether any updated vendor qualification information 235c entered by the vendor matches the vendor criteria information for any buyers and/or industries on the vendor list 238.

Figure 23:
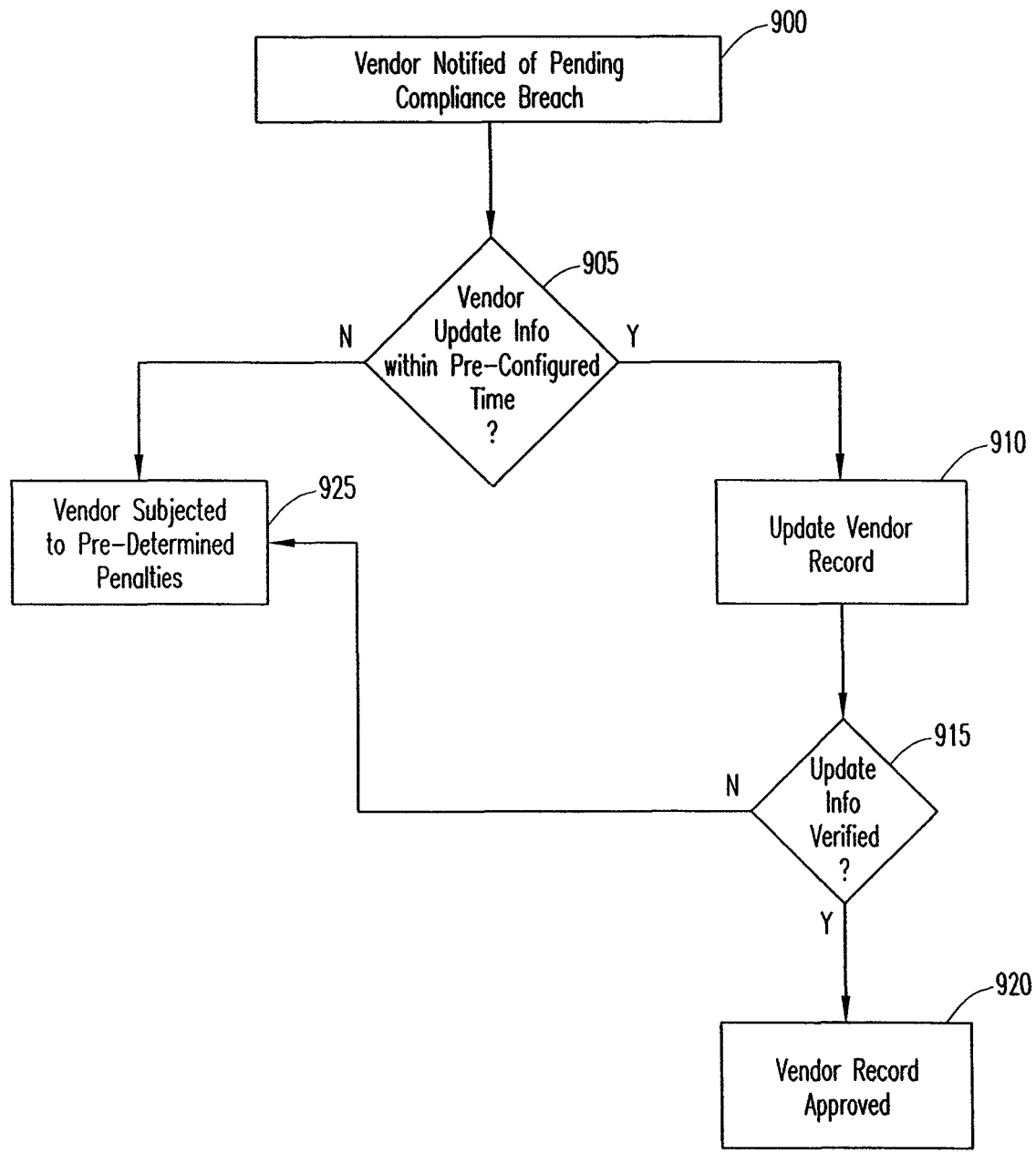
FIG. 23 is a flowchart illustrating exemplary steps for maintaining vendor qualification, in accordance with embodiments of the present invention.

FIG. 23 is a flowchart illustrating exemplary steps for maintaining vendor qualification, in accordance with embodiments of the present invention. When the computer system determines that a vendor is in compliance breach due to changed buyer or industry requirements or to the expiration of a qualification date (such as the data renewal date or data expiration date), the computer system notifies the vendor via e-mail and/or system dashboard of the pending compliance breach (step 900). If the vendor provides updated vendor qualification information within pre-configured time constraints (step 905), the computer system updates the vendor record with the updated vendor qualification information (step 910) and, if necessary, verifies the updated vendor qualification information (step 915). If the updated vendor qualification information is verified as accurate (step 915), the vendor qualification information is marked as approved within the vendor record (step 920). However, if the vendor does not provide updated vendor qualification information within pre-configured time constraints (step 905) or the updated vendor qualification information is not verified as accurate (step 915), the vendor is subjected to pre-determined penalties dependent upon the type of breach (no longer qualified for a particular buyer or industry or stale vendor qualification information) and any rules pertaining to the breach defined by the buyer or industry (step 925).

Figure 24:
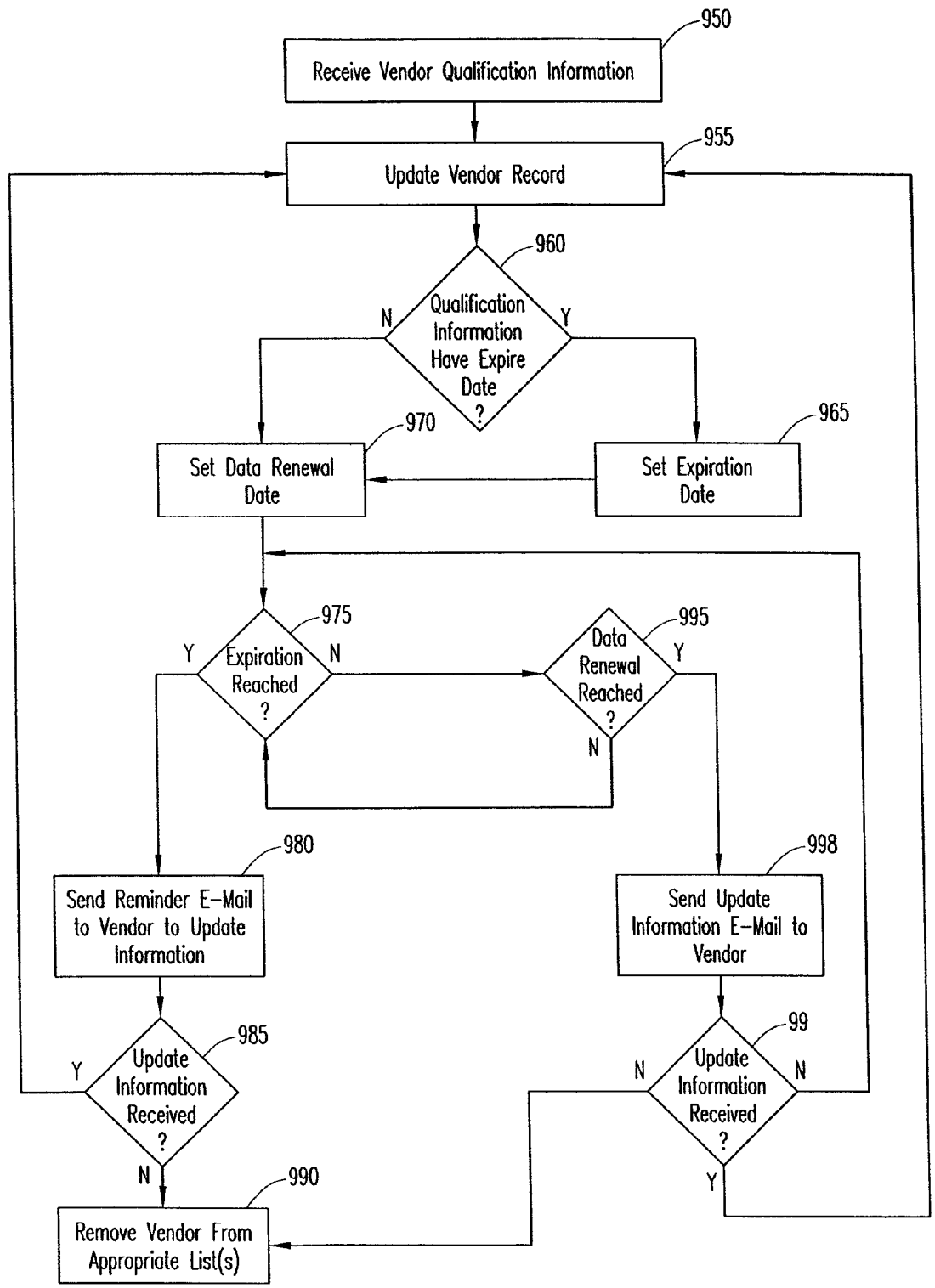
FIG. 24 is a flowchart illustrating exemplary steps for maintaining current vendor qualification information, in accordance with embodiments of the present invention.

FIG. 24 is a flowchart illustrating exemplary steps for maintaining current vendor qualification information, in accordance with embodiments of the present invention. When a vendor enters vendor qualification information for the first time into the computer system or when a vendor provides updated vendor qualification information to the computer system (step 950), the vendor record associated with the vendor is updated with the newly entered or updated vendor qualification information (step 955). If any of the vendor qualification information entered by the vendor has an expiration date (step 960), the computer system sets an expiry field associated with the vendor qualification information with the expiration date (step 965). In addition, the computer system further sets a data review field with a data renewal date to request updated vendor qualification information from the vendor (step 970).

If an expiration date is reached (step 975), the computer system sends an update request e-mail message to the vendor requesting updated vendor qualification information related to the expired data (step 980). If the requested updated vendor qualification information is entered by the vendor into the computer system prior to the expiration date (step 985), the vendor record for the vendor is updated (step 955), and a new expiration date (if any) is set (step 960). However, if the requested updated vendor qualification information is not received by the computer system prior to the expiration date (or within a reasonable, pre-configured or negotiated time after the expiration date) (step 985), the vendor is removed from the appropriate buyer and industry lists, and the vendor list is updated accordingly (step 990).

If the data renewal date is reached (step 995), the computer system sends an update request e-mail message to the vendor requesting updated vendor qualification information to remind the vendor to check the vendor record to ensure the accuracy of the vendor qualification information (step 998). If updated vendor qualification information is entered by the vendor into the computer system prior to the data renewal date (step 999), the vendor record is updated with the updated vendor qualification information (step 955). However, if no updated vendor qualification information is received by the computer system prior to the data renewal date (step 999), in one embodiment, the vendor qualification information is considered outdated and the vendor is removed from any buyer and/or industry lists that the vendor was qualified for (step 990). In another embodiment, if no updated vendor qualification information is received by the computer system prior to the data renewal date (step 999), the data renewal date is updated and no changes are made to the vendor record or any of the buyer, industry or vendor lists (step 975).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

I claim:

1. A computer system for qualifying a vendor, comprising:
   a web server configured to:
   receive vendor criteria information for each of a plurality of qualifiers, the plurality of qualifiers comprising at least one qualifier already existing on the computer system and at least one new qualifier;
   wherein, for each of the plurality of qualifiers, the vendor criteria information comprises a set of requirements for the vendor to do business;
   wherein the plurality of qualifiers comprises at least one qualifier selected from the group consisting of: a buyer-defined qualifier and an industry-specific qualifier; and
   receive vendor qualification information associated with the vendor for each of the plurality of qualifiers;
   wherein the vendor is a business entity selected from the group consisting of corporation, partnership, and company;
   a database configured to store said vendor qualification information and said vendor criteria information for each of the plurality of qualifiers;
   at least one tool configured to:
   for each qualifier of the plurality of qualifiers, each time said vendor qualification information or said vendor criteria information is updated, compare said vendor qualification information to said vendor criteria information to determine for the qualifier whether the vendor is pre-qualified to receive requests for goods or services independent of any specific request for goods or services;
   wherein the at least one tool is utilized to create and maintain, for each of the plurality of qualifiers, a list of pre-qualified vendors to which a request for goods or services may be made;
   for each of the plurality of qualifiers, responsive to a determination that the vendor is pre-qualified, add the vendor to the list of prequalified vendors; and
   for each of the plurality of qualifiers, enable a buyer to select, from the list of pre-qualified vendors, one or more vendors to receive a specific request for goods or services.

2. The computer system of claim 1, wherein said database is further capable of storing additional vendor qualification information associated with an additional vendor.

3. The computer system of claim 1, wherein said at least one qualifier comprises a buyer-defined qualifier for a buyer and said web server is associated with the buyer, said vendor criteria information comprising buyer-defined vendor criteria information established by the buyer.

4. The computer system of claim 1, further comprising:
   wherein said database is further configured to store vendor fields containing vendor selection data for use by the vendor in entering said vendor qualification information;
   a vendor module configured to populate one or more web pages with said vendor selection data from said vendor fields and store said vendor qualification information entered by the vendor within said database; and
   wherein said vendor fields are arranged in a hierarchical and relational structure and said vendor qualification information stored in said database is arranged in a hierarchical and relational structure mirroring select ones of said vendor fields.

5. The computer system of claim 4, wherein said vendor fields are in a table-driven format that is configurable and scalable based upon the vendor and the computer system.

6. The computer system of claim 4, wherein said vendor qualification information includes vendor profiling information to categorize the types of goods and services the vendor provides, said vendor fields including vendor profiling fields to solicit said vendor profiling information from the vendor.

7. The computer system of claim 6, wherein said vendor profiling fields are organized into hierarchical tables, each of said hierarchical tables including vendor selection data having one or more vendor profiling selections, said one or more web pages including said one or more vendor profiling selections of a first one of said hierarchical tables and said one or more additional web pages including said one or more vendor profiling selections of a second one of said hierarchical tables.

8. The computer system of claim 7, wherein said vendor profiling information entered by the vendor in response to said one or more web pages includes a select one of said vendor profiling selections, said second hierarchical table being selected by said vendor module based upon said select vendor profiling selection entered by the vendor.

9. The computer system of claim 1, wherein said web server is further capable of pushing one or more web pages at a time, said one or more web pages including buyer selection data for use by the buyer in entering said vendor criteria information.

10. The computer system of claim 9, wherein said web server uses said vendor criteria information entered in response to said one or more web pages to determine one or more additional web pages to be pushed.

11. The computer system of claim 10, wherein said database is further configured to store buyer fields containing said buyer selection data.

12. The computer system of claim 11, further comprising:
a buyer module configured to populate said one or more web pages with said buyer selection data from said buyer fields and store said vendor criteria information entered by the buyer within said database.

13. The computer system of claim 12, wherein said buyer fields are arranged in a hierarchical and relational structure and said vendor criteria information stored in said database is arranged in a hierarchical and relational structure mirroring select ones of said buyer fields, said vendor qualification information being further arranged in a hierarchical and relational structure to enable comparison of said vendor qualification information and said vendor criteria information by said at least one tool.

14. The computer system of claim 13, wherein said buyer fields are in a table-driven format that is configurable and scalable based on the buyer and the computer system.

15. The computer system of claim 14, wherein said vendor criteria information includes vendor profiling information to categorize the types of goods and services the buyer has a need for, said buyer fields including vendor profiling fields to solicit said vendor profiling information from the buyer.

16. The computer system of claim 1, wherein the at least one qualifier comprises an industry-specific qualifier for an industry and said vendor criteria information comprises industry-related vendor criteria information associated with the industry, said industry-related vendor criteria information indicating industry-defined requirements for the vendor to do business in the industry.

17. The computer system of claim 16, wherein said industry-related vendor criteria information is arranged in a hierarchical and relational structure and said vendor qualification information is arranged in a hierarchical and relational structure to enable comparison of said vendor qualification information and said industry-related vendor criteria information by said at least one tool.

18. The computer system of claim 1, further comprising:
an input device configured to enable a user of the computer system to enter verification information associated with said vendor qualification information into said database; and
a user interface configured to provide the user with verification request information requesting the user verify said vendor qualification information and enter said verification information into said database.

19. The computer system of claim 1, wherein said database is further configured to store a vendor list capable of including one or more qualifiers of the plurality of qualifiers, said at least one tool populating said vendor list with each qualifier when said vendor qualification information matches said vendor criteria information associated with the qualifier.

20. The computer system of claim 1, wherein said list further includes at least a portion of said vendor qualification information associated with the vendor.

21. The computer system of claim 1, further comprising:
a buyer database associated with the buyer, said list being downloaded to said buyer database from said database storing said vendor qualification information and said vendor criteria information.

22. The computer system of claim 1, wherein the at least one qualifier comprises an industry-specific qualifier and said database is further configured to store an industry list capable of including one or more qualified vendors, said at least one tool populating said industry list with the vendor when said vendor qualification information matches said vendor criteria information associated with the industry.

23. The computer system of claim 1, further comprising:
wherein the at least one tool is configured to interface with said database to monitor said vendor qualification information, request updated vendor qualification information from the vendor and store said updated vendor qualification information in the database to maintain qualification of the vendor for the plurality of qualifiers.

24. The computer system of claim 23, wherein said vendor qualification information includes a data renewal date, said at least one tool being configured to request said updated vendor qualification information prior to or on said data renewal date.

25. The computer system of claim 24, wherein said vendor qualification information further includes a data expiration date associated with a particular data entry within said vendor qualification information, said at least one tool being configured to request said updated vendor qualification information prior to or on said data expiration date.

26. The computer system of claim 25, wherein said at least one tool is further configured to remove the vendor from a qualifier list containing one or more qualified vendors associated with each of the plurality of qualifiers when said updated vendor qualification information is not received by the at least one tool by a pre-configured date associated with said data renewal date or said data expiration date.

27. A method for qualifying a vendor comprising:
receiving, on a computer system comprising at least one server computer, vendor criteria information for each of a plurality of qualifiers, the plurality of qualifiers comprising at least one qualifier already existing on the computer system and at least one new qualifier;
wherein, for each of the plurality of qualifiers, the vendor criteria information comprises a set of requirements for the vendor to do business;
wherein the plurality of qualifiers comprises at least one qualifier selected from the group consisting of: a buyer-defined qualifier and an industry-specific qualifier;
receiving, by the computer system, vendor qualification information associated with the vendor for each of the plurality of qualifiers;
wherein the vendor is a business entity selected from the group consisting of corporation, partnership, and company;
the computer system storing, in a database, said vendor qualification information and said vendor criteria information for each of the plurality of qualifiers;

for each qualifier of the plurality of qualifiers, each time said vendor qualification information or said vendor criteria information is updated, the computer system comparing said vendor qualification information stored in said database with said vendor criteria information stored in said database to determine, for the qualifier, whether the vendor is pre-qualified to receive requests for goods or services independent of any specific request for goods or services;

the computer system creating and maintaining, for each of the plurality of qualifiers, a list of pre-qualified vendors from which a buyer selects vendors to receive a specific request for goods or services may be made; and wherein the creating and maintaining comprises, for each of the plurality of qualifiers, adding the vendor to a list of prequalified vendors responsive to a determination that the vendor is pre-qualified.

28. The method of claim 27, wherein said storing comprises:

storing vendor qualification information associated with each of a plurality of vendors.

29. The method of claim 27, further comprising:

selectively providing a notification message to the vendor indicating whether the vendor is qualified for each of the plurality of qualifiers.

\* \* \* \* \*